(12) United States Patent
Kiziuk et al.

(10) Patent No.: US 10,460,361 B2
(45) Date of Patent: Oct. 29, 2019

(54) SYSTEMS FOR REAL-TIME ANALYSIS AND REPORTING OF UTILITY USAGE AND SPEND

(71) Applicant: Mountain Vector Energy, LLC, Corrales, NM (US)

(72) Inventors: Steve R. Kiziuk, Corrales, NM (US); Robert Bruce Pitt, Rio Rancho, NM (US); Paige A. Mankey, Albuquerque, NM (US); Madeline Rae Lamb, Albuquerque, NM (US)

(73) Assignee: Mountain Vector Energy, LLC, Corrales, NM (US)

( * ) Notice: Subject to any disclaimer, the term of this patent is extended or adjusted under 35 U.S.C. 154(b) by 3 days.

(21) Appl. No.: 15/748,591

(22) PCT Filed: Sep. 8, 2017

(86) PCT No.: PCT/US2017/050767
§ 371 (c)(1),
(2) Date: Jan. 29, 2018

(87) PCT Pub. No.: WO2018/063779
PCT Pub. Date: Apr. 5, 2018

(65) Prior Publication Data
US 2018/0247348 A1 Aug. 30, 2018

Related U.S. Application Data
(60) Provisional application No. 62/402,742, filed on Sep. 30, 2016.

(51) Int. Cl.
*G06Q 30/02* (2012.01)
*G06Q 50/06* (2012.01)
(Continued)

(52) U.S. Cl.
CPC ......... *G06Q 30/0283* (2013.01); *G06Q 30/04* (2013.01); *G06Q 50/06* (2013.01); *H04L 12/1414* (2013.01); *H04L 12/1428* (2013.01)

(58) Field of Classification Search
CPC .... G06Q 30/0283; G06Q 30/04; G06Q 50/06; H04L 12/1414; H04L 12/1428
See application file for complete search history.

(56) References Cited

U.S. PATENT DOCUMENTS

| 7,555,365 | B2 | 6/2009 | Bhakta |
| 8,095,243 | B2 | 1/2012 | Bhakta |
| (Continued) | | | |

FOREIGN PATENT DOCUMENTS

KR 1020100015626 10/2012

OTHER PUBLICATIONS

Marshini Chetty, "Getting to Green: Understanding Resource Consumption in the Home", Sep. 2008 (Year: 2008).*
(Continued)

*Primary Examiner* — Kevin H Flynn
*Assistant Examiner* — Ibrahim N El-Bathy
(74) *Attorney, Agent, or Firm* — Santangelo Law Offices, P.C.

(57) ABSTRACT

Presented are methods and systems to universally assess composite utility consumption (1) in which a plurality of real-time and batch sensor readings such as from multiple disparate utility sensor data inputs (3) may be acquired and stored such as into a local device (2) or a central data warehouse (6). A composite utility estimated cost generator (9) can generate missing or uncorrelated data and a collected composite utility data information correlator (11) can correlate the data so it can be applied to determine some type of composite utility cost information. For real-time calculation, a disparate utility rate information accessor (8) can (Continued)

obtain multiple items of disparate rate information and this can use with correlated data to create a composite utility consumption and spend so a user can manage and control utility usage for a home, building, facility, plant, specific equipment, or the like. Cost information, such as a rate of spend or spend amount(s) to date or for a period may be presented to user in a variety of visualizations and reporting formats including specific time usage and spend information, specific time range usage and spend, and "time-of-use" billing information for specific real-time data points. The visualization and reporting may be used to answer a plurality of usage questions along with specific characterizations of utility spend across time of day domains and specific equipment usage domains thus affording more effective utility cost management.

20 Claims, 29 Drawing Sheets

(51) Int. Cl.
*H04L 12/14* (2006.01)
*G06Q 30/04* (2012.01)

(56) References Cited

U.S. PATENT DOCUMENTS

| | | | |
|---|---|---|---|
| 8,843,238 B2 | 9/2014 | Wenzel et al. | |
| 9,172,275 B2 | 10/2015 | Bhakta | |
| 9,569,804 B2 | 2/2017 | Stein et al. | |
| 2004/0024483 A1 | 2/2004 | Holcombe | |
| 2004/0043760 A1* | 3/2004 | Rosenfeld | H04L 67/16 455/414.3 |
| 2009/0287433 A1 | 11/2009 | Houston et al. | |
| 2010/0064001 A1* | 3/2010 | Daily | G06Q 30/02 709/203 |
| 2010/0076613 A1 | 3/2010 | Imes | |
| 2010/0106342 A1 | 4/2010 | Ko et al. | |
| 2010/0283606 A1* | 11/2010 | Tsypin | G06Q 30/02 340/540 |
| 2010/0286937 A1* | 11/2010 | Hedley | G06O 30/02 702/60 |
| 2011/0035073 A1 | 2/2011 | Ozog | |
| 2012/0083930 A1 | 4/2012 | Ilic et al. | |
| 2014/0058572 A1* | 2/2014 | Stein | G06Q 50/06 700/291 |
| 2014/0129160 A1 | 5/2014 | Tran | |
| 2014/0289388 A1 | 9/2014 | Ghosh et al. | |
| 2015/0149122 A1 | 5/2015 | Cipri | |
| 2015/0220099 A1 | 8/2015 | Yoo et al. | |
| 2015/0323948 A1* | 11/2015 | Jeong | G06Q 30/02 |
| 2016/0275629 A1* | 9/2016 | Markey | E03B 1/02 |

OTHER PUBLICATIONS

International Performance Measurement and Verification Protocol (IPMVP), retrieved Jun. 26, 2017. 4 pages. http://evo-world.org/en/products-services-mainmenu-en/protocols/ipmvp.
EVO, International Performance Measurement and Verification Protocol. Concepts and Options for Determining Energy and Water Savings vol. 1. Jan. 2012. 143 pages. http://www.eeperformance.org/uploads/8/6/5/0/8650231/ipmvp_volume_i 2012.pdf.
International Performance Measurement and Verification Protocol. Concepts and Options for Determining Energy and Water Savings vol. 1. Jan. 2012. 4 pages. https://seigrits-public-assets.s3.amazonaws.com/IPMVP_Options_for Measurement_and_Verification.pdf.
Donkelaar, Michael et al., Measurement and verification for energy services, IPMVP and other approaches. Public Report. Concerted Action, Energy Services Directive. Jan. 29, 2013. 37 pages. https://www.google.com/url?sa=t&rct=j&q=&esrc=s&source=web&cd=7&ved=0ahUKEwj5ucWRndTUAhUMzoMKHdTTDJ0QFghIMAY&url=http%3A%2F%2Fwww.esd-ca.eu%2FMedia%2FFiles%2Fmeasurement-and-verification-for-energy-services-ipmvp-and-other-approaches&usg=AFQJCNEstziHCaTTp97B1jTRO6RUBv0wA.
Clean Energy Ministerial, Energy Performance Measurement and Verification, Guidance on Data Quality. Aug. 2014. 14 pages. http://www.cleanenergyministerial.org/Portals/2/EasyDNNNewsDocuments/410/GSEP_EMWG_DQ_Guidance.pdf.
International Performance Measurement and Verification Protocol. Concepts and Options for Determining Energy and Water Savings vol. 1. Mar. 2002. 93 pages.
TransData, Inc., SSR-6000 Demand Recorder & Pulse Totalizer. © 2010 by TransData, Inc. 2 pages.
U.S. Appl. No. 13/830,919, filed Mar. 14, 2013. First Named Inventor: Stein.
U.S. Appl. No. 14/922,978, filed Oct. 26, 2015. First Named Inventor: Minesh Bhakta.
U.S. Appl. No. 62/402,742, filed Sep. 30, 2016. First named Inventor: Kiziuk.
International Application No. PCT/US17/50767, filed Sep. 8, 2017. First Named Inventor: Kiziuk.
International Application No. PCT/US17/50767, filed Sep. 8, 2017. First Named Inventor: Kiziuk. International Search Report dated Nov. 17, 2017. 4 pages.
International Application No. PCT/US17/50767, filed Sep. 8, 2017. First Named Inventor: Kiziuk. Written Opinion of the International Searching Authority. 5 pages.

* cited by examiner

Tabular Display – Amps and Spend

| Item | GMT Sample Time | TimeZone | Date (GMT) | Time (GMT) | DOW (GMT) | S1 AVG | S2 AVG | S3 AVG |
|---|---|---|---|---|---|---|---|---|
| 1 | 1503079207 | -7 | 8/18/2017 | 18:00:07 | Friday | 53.7657 | 43.8315 | 50.8271 |
| 2 | 1503079267 | -7 | 8/18/2017 | 18:01:07 | Friday | 56.0786 | 47.3577 | 54.7136 |
| 3 | 1503079327 | -7 | 8/18/2017 | 18:02:07 | Friday | 58.3156 | 58.2208 | 55.4909 |
| 4 | 1503079387 | -7 | 8/18/2017 | 18:03:07 | Friday | 60.439 | 48.3057 | 52.3817 |
| 5 | 1503079453 | -7 | 8/18/2017 | 18:04:13 | Friday | 59.5858 | 42.3148 | 51.0736 |
| 6 | 1503079513 | -7 | 8/18/2017 | 18:05:13 | Friday | 57.0075 | 40.6276 | 47.8886 |
| 7 | 1503079573 | -7 | 8/18/2017 | 18:06:13 | Friday | 55.9838 | 38.7317 | 46.9286 |
| 8 | 1503079633 | -7 | 8/18/2017 | 18:07:13 | Friday | 56.4388 | 39.6038 | 46.9975 |
| 9 | 1503079693 | -7 | 8/18/2017 | 18:08:13 | Friday | 56.2871 | 42.3527 | 46.8459 |
| 10 | 1503079759 | -7 | 8/18/2017 | 18:09:19 | Friday | 55.0548 | 42.5803 | 46.8269 |
| 11 | 1503079819 | -7 | 8/18/2017 | 18:10:19 | Friday | 55.3392 | 41.5944 | 47.3767 |
| 12 | 1503079879 | -7 | 8/18/2017 | 18:11:19 | Friday | 56.0786 | 39.6228 | 47.1303 |
| 13 | 1503079939 | -7 | 8/18/2017 | 18:12:19 | Friday | 57.7848 | 42.8457 | 48.0592 |
| 14 | 1503079999 | -7 | 8/18/2017 | 18:13:19 | Friday | 59.8513 | 43.8126 | 49.5569 |
| 15 | 1503080067 | -7 | 8/18/2017 | 18:14:27 | Friday | 61.4438 | 45.8411 | 51.6044 |
| 16 | 1503080127 | -7 | 8/18/2017 | 18:15:27 | Friday | 67.3398 | 60.2683 | 58.2398 |
| 17 | 1503080187 | -7 | 8/18/2017 | 18:16:27 | Friday | 67.0175 | 57.9744 | 58.8086 |
| 18 | 1503080247 | -7 | 8/18/2017 | 18:17:27 | Friday | 65.1596 | 51.7181 | 58.164 |
| 19 | 1503080307 | -7 | 8/18/2017 | 18:18:27 | Friday | 65.8989 | 53.8984 | 59.5669 |
| 20 | 1503080371 | -7 | 8/18/2017 | 18:19:31 | Friday | 65.1596 | 50.1067 | 55.0928 |
| 21 | 1503080431 | -7 | 8/18/2017 | 18:20:31 | Friday | 66.1075 | 53.4623 | 55.2823 |
| 22 | 1503080491 | -7 | 8/18/2017 | 18:21:31 | Friday | 66.9417 | 56.4577 | 53.6899 |
| 23 | 1503080551 | -7 | 8/18/2017 | 18:22:31 | Friday | 66.2213 | 52.1352 | 59.0929 |
| 24 | 1503080611 | -7 | 8/18/2017 | 18:23:31 | Friday | 65.2923 | 54.8273 | 53.6899 |
| 25 | 1503080677 | -7 | 8/18/2017 | 18:24:37 | Friday | 64.5529 | 52.4006 | 53.7278 |
| 26 | 1503080737 | -7 | 8/18/2017 | 18:25:37 | Friday | 63.2448 | 50.2204 | 53.7467 |
| 27 | 1503080797 | -7 | 8/18/2017 | 18:26:37 | Friday | 62.8088 | 52.666 | 53.6899 |
| 28 | 1503080857 | -7 | 8/18/2017 | 18:27:37 | Friday | 62.9604 | 49.0261 | 53.6899 |
| 29 | 1503080917 | -7 | 8/18/2017 | 18:28:37 | Friday | 64.2306 | 51.2821 | 56.2492 |
| 30 | 1503080981 | -7 | 8/18/2017 | 18:29:41 | Friday | 63.4533 | 49.1398 | 56.4388 |
| 31 | 1503081041 | -7 | 8/18/2017 | 18:30:41 | Friday | 62.9035 | 49.2157 | 56.0786 |

FIG. 18B

Building 1A - Utility Consumption - 2016

| Resource Type | Utility | Consumed Amount | Units | Cost |
|---|---|---|---|---|
| Electricity | PNM | 23,881,203 | MegaWatts | $1,000,000.29 |
| Water | CABQ | 100,000 | Gallons | $30,290.79 |
| Gas | NMG | 1,000,000 | Therms | $502,907.90 |
| Total | | | | $1,533,198.98 |

Building 1A versus Building 2C - 2016 (Total Resource Cost) Monthly

| | Bulding 1A Spend | Building 2A Spend | Delta 1A v 2C |
|---|---|---|---|
| Jan 16 | $ 1,990,100.25 | $ 2,113,556.25 | $ (123,456.00) |
| Feb 16 | $ 1,990,100.25 | $ 755,533.25 | $ 1,234,567.00 |
| Mar 16 | $ 1,990,100.25 | $ 2,113,556.25 | $ (123,456.00) |
| Apr 16 | $ 1,990,100.25 | $ 755,533.25 | $ 1,234,567.00 |
| May 16 | $ 1,990,100.25 | $ 2,113,556.25 | $ (123,456.00) |
| Jun 16 | $ 1,990,100.25 | $ 755,533.25 | $ 1,234,567.00 |
| Jul 16 | $ 1,990,100.25 | $ 2,113,556.25 | $ (123,456.00) |
| Aug 16 | $ 1,990,100.25 | $ 755,533.25 | $ 1,234,567.00 |
| Sep 16 | $ 1,990,100.25 | $ 2,113,556.25 | $ (123,456.00) |
| Oct 16 | $ 1,990,100.25 | $ 755,533.25 | $ 1,234,567.00 |
| Nov '16 | $ 1,990,100.25 | $ 2,113,556.25 | $ (123,456.00) |
| Dec 16 | $ 1,990,100.25 | $ 755,533.25 | $ 1,234,567.00 |
| Total | $ 23,881,203.00 | $ 17,214,537.00 | $ 6,666,666.00 |

FIG. 20

Building 1A - Cost Per Hour - 2017-08-08

| Hour | Electricity (kWh) | Water (GPH) | Gas (Therms) | Total Cost | | Day |
|---|---|---|---|---|---|---|
| 12am | 13.4 | 5 | 10 | $ | 3.87 | 1 |
| 1am | 13.5 | 5.1 | 10.1 | $ | 3.91 | 2 |
| 2am | 13.6 | 5.2 | 10.2 | $ | 3.95 | 3 |
| 3am | 13.7 | 5.3 | 10.3 | $ | 4.00 | 4 |
| 4am | 13.8 | 5.4 | 10.4 | $ | 4.04 | 5 |
| 5am | 13.9 | 5.5 | 10.5 | $ | 4.08 | 6 |
| 6am | 14 | 5.6 | 10.6 | $ | 4.12 | 7 |
| 7am | 14.1 | 5.7 | 10.7 | $ | 4.16 | 8 |
| 8am | 36.2 | 27.8 | 32.8 | $ | 13.22 | 9 |
| 9am | 36.3 | 27.9 | 32.9 | $ | 13.26 | 10 |
| 10am | 36.4 | 28 | 33 | $ | 13.30 | 11 |
| 11am | 36.5 | 28.1 | 33.1 | $ | 13.34 | 12 |
| 12am | 36.6 | 28.2 | 33.2 | $ | 13.38 | 13 |
| 1pm | 36.7 | 28.3 | 33.3 | $ | 13.43 | 14 |
| 2pm | 36.6 | 28.2 | 33.2 | $ | 13.38 | 15 |
| 3pm | 36.5 | 28.1 | 33.1 | $ | 13.34 | 16 |
| 4pm | 36.4 | 28 | 33 | $ | 13.30 | 17 |
| 5pm | 36.3 | 27.9 | 32.9 | $ | 13.26 | 18 |
| 6pm | 36.2 | 27.8 | 32.8 | $ | 13.22 | 19 |
| 7pm | 18.1 | 13.9 | 16.4 | $ | 6.61 | 20 |
| 8pm | 18 | 13.8 | 16.3 | $ | 6.57 | 21 |
| 9pm | 17.9 | 13.7 | 16.2 | $ | 6.53 | 22 |
| 10pm | 17.8 | 13.6 | 16.1 | $ | 6.49 | 23 |
| 11pm | 13.4 | 5 | 10 | $ | 3.87 | 24 |
| | | | | | | 25 |
| Total | 595.9 | 411.1 | 521.1 | $ | 208.64 | 26 |
| | | | | | | 27 |
| | | | | | | 28 |
| | | | | | | 29 |
| | | | | | | 30 |
| | | | | | | 31 |
| | | | | | | Total |

FIG. 21A

Building 1A - Cost Per Day - 2017-08 [AUG]

| Electricity (kWh) | Water (GPH) | Gas (Therms) | Total Cost |
|---|---|---|---|
| 517.5 | 332.7 | 442.7 | $ 176.49 |
| 528.7 | 343.9 | 453.9 | $ 181.08 |
| 539.9 | 355.1 | 465.1 | $ 185.68 |
| 551.1 | 366.3 | 476.3 | $ 190.27 |
| 562.3 | 377.5 | 487.5 | $ 194.86 |
| 573.5 | 388.7 | 498.7 | $ 199.45 |
| 584.7 | 399.9 | 509.9 | $ 204.04 |
| 595.9 | 411.1 | 521.1 | $ 208.64 |
| 613 | 428.2 | 538.2 | $ 215.65 |
| 630.1 | 445.3 | 555.3 | $ 222.66 |
| 647.2 | 462.4 | 572.4 | $ 229.67 |
| 664.3 | 479.5 | 589.5 | $ 236.68 |
| 681.4 | 496.6 | 606.6 | $ 243.69 |
| 698.5 | 513.7 | 623.7 | $ 250.70 |
| 715.6 | 530.8 | 640.8 | $ 257.71 |
| 732.7 | 547.9 | 657.9 | $ 264.72 |
| 749.8 | 565 | 675 | $ 271.73 |
| 766.9 | 582.1 | 692.1 | $ 278.75 |
| 784 | 599.2 | 709.2 | $ 285.76 |
| 801.1 | 616.3 | 726.3 | $ 292.77 |
| 818.2 | 633.4 | 743.4 | $ 299.78 |
| 835.3 | 650.5 | 760.5 | $ 306.79 |
| 852.4 | 667.6 | 777.6 | $ 313.80 |
| 869.5 | 684.7 | 794.7 | $ 320.81 |
| 886.6 | 701.8 | 811.8 | $ 327.82 |
| 903.7 | 718.9 | 828.9 | $ 334.83 |
| 920.8 | 736 | 846 | $ 341.84 |
| 937.9 | 753.1 | 863.1 | $ 348.86 |
| 955 | 770.2 | 880.2 | $ 355.87 |
| 972.1 | 787.3 | 897.3 | $ 362.88 |
| 989.2 | 804.4 | 914.4 | $ 369.89 |
| 22878.9 | 17150.1 | 20560.1 | $ 8,274.15 |

Building 1A - Cost Per

| Day | Electricity (kWh) |
|---|---|
| 1 | 322.3 |
| 2 | 333.5 |
| 3 | 344.7 |
| 4 | 355.9 |
| 5 | 367.1 |
| 6 | 378.3 |
| 7 | 389.5 |
| 8 | 400.7 |
| 9 | 417.8 |
| 10 | 434.9 |
| 11 | 452 |
| 12 | 469.1 |
| 13 | 486.2 |
| 14 | 503.3 |
| 15 | 520.4 |
| 16 | 537.5 |
| 17 | 554.6 |
| 18 | 571.7 |
| 19 | 588.8 |
| 20 | 605.9 |
| 21 | 623 |
| 22 | 640.1 |
| 23 | 657.2 |
| 24 | 674.3 |
| 25 | 691.4 |
| 26 | 708.5 |
| 27 | 725.6 |
| 28 | 742.7 |
| 29 | 759.8 |
| 30 | 776.9 |
| 31 | 794 |
| Total | 16827.7 |

FIG. 21B

Run Day - 2017-08 [AUG - 8AM to 6PM]

| Water (GPH) | Gas (Therms) | Total Cost |
|---|---|---|
| 640.5 | 750.5 | $ 262.45 |
| 651.7 | 761.7 | $ 267.04 |
| 662.9 | 772.9 | $ 271.63 |
| 674.1 | 784.1 | $ 276.23 |
| 685.3 | 795.3 | $ 280.82 |
| 696.5 | 806.5 | $ 285.41 |
| 707.7 | 817.7 | $ 290.00 |
| 718.9 | 828.9 | $ 294.59 |
| 417.8 | 417.8 | $ 171.30 |
| 434.9 | 434.9 | $ 178.31 |
| 452 | 452 | $ 185.32 |
| 469.1 | 469.1 | $ 192.33 |
| 486.2 | 486.2 | $ 199.34 |
| 503.3 | 503.3 | $ 206.35 |
| 520.4 | 520.4 | $ 213.36 |
| 537.5 | 537.5 | $ 220.38 |
| 554.6 | 554.6 | $ 227.39 |
| 571.7 | 571.7 | $ 234.40 |
| 588.8 | 588.8 | $ 241.41 |
| 605.9 | 605.9 | $ 248.42 |
| 623 | 623 | $ 255.43 |
| 640.1 | 640.1 | $ 262.44 |
| 657.2 | 657.2 | $ 269.45 |
| 674.3 | 674.3 | $ 276.46 |
| 691.4 | 691.4 | $ 283.47 |
| 708.5 | 708.5 | $ 290.49 |
| 725.6 | 725.6 | $ 297.50 |
| 742.7 | 742.7 | $ 304.51 |
| 759.8 | 759.8 | $ 311.52 |
| 776.9 | 776.9 | $ 318.53 |
| 794 | 794 | $ 325.54 |
| 19373.3 | 20253.3 | $ 7,941.81 |

Building 1A - Pre Versus Pos

| Day | Total Cost (PRE-AUG) |
|---|---|
| 1 | $ 262.45 |
| 2 | $ 267.04 |
| 3 | $ 271.63 |
| 4 | $ 276.23 |
| 5 | $ 280.82 |
| 6 | $ 285.41 |
| 7 | $ 290.00 |
| 8 | $ 294.59 |
| 9 | $ 171.30 |
| 10 | $ 178.31 |
| 11 | $ 185.32 |
| 12 | $ 192.33 |
| 13 | $ 199.34 |
| 14 | $ 206.35 |
| 15 | $ 213.36 |
| 16 | $ 220.38 |
| 17 | $ 227.39 |
| 18 | $ 234.40 |
| 19 | $ 241.41 |
| 20 | $ 248.42 |
| 21 | $ 255.43 |
| 22 | $ 262.44 |
| 23 | $ 269.45 |
| 24 | $ 276.46 |
| 25 | $ 283.47 |
| 26 | $ 290.49 |
| 27 | $ 297.50 |
| 28 | $ 304.51 |
| 29 | $ 311.52 |
| 30 | $ 318.53 |
| 31 | |
| Total | $ 7,616.27 |

FIG. 21C t Boiler Upgrade - 2017-08 versus 2017-09 [AUG vs SEPT]

| Total Cost POST [SEPT] | Savings | Precentage Savings |
|---|---|---|
| $ 215.21 | $ 47.24 | 18.00% |
| $ 218.97 | $ 48.07 | 18.00% |
| $ 222.74 | $ 48.89 | 18.00% |
| $ 226.50 | $ 49.72 | 18.00% |
| $ 230.27 | $ 50.55 | 18.00% |
| $ 234.04 | $ 51.37 | 18.00% |
| $ 237.80 | $ 52.20 | 18.00% |
| $ 241.57 | $ 53.03 | 18.00% |
| $ 140.46 | $ 30.83 | 18.00% |
| $ 146.21 | $ 32.10 | 18.00% |
| $ 151.96 | $ 33.36 | 18.00% |
| $ 157.71 | $ 34.62 | 18.00% |
| $ 163.46 | $ 35.88 | 18.00% |
| $ 169.21 | $ 37.14 | 18.00% |
| $ 174.96 | $ 38.41 | 18.00% |
| $ 180.71 | $ 39.67 | 18.00% |
| $ 186.46 | $ 40.93 | 18.00% |
| $ 192.21 | $ 42.19 | 18.00% |
| $ 197.95 | $ 43.45 | 18.00% |
| $ 203.70 | $ 44.72 | 18.00% |
| $ 209.45 | $ 45.98 | 18.00% |
| $ 215.20 | $ 47.24 | 18.00% |
| $ 220.95 | $ 48.50 | 18.00% |
| $ 226.70 | $ 49.76 | 18.00% |
| $ 232.45 | $ 51.03 | 18.00% |
| $ 238.20 | $ 52.29 | 18.00% |
| $ 243.95 | $ 53.55 | 18.00% |
| $ 249.70 | $ 54.81 | 18.00% |
| $ 255.44 | $ 56.07 | 18.00% |
| $ 261.19 | $ 57.34 | 18.00% |
| $ 6,245.34 | $ 1,370.93 | 18.00% |

FIG. 21D

| identdrData | identCufflinkDevice | identCustomer | identFacility | identBuilding | identMeter | identEquipment | dateReceived | deviceTimeSent | timeZone | sensorNumber |
|---|---|---|---|---|---|---|---|---|---|---|
| 109771 | 1 | 1 | 0 | 0 | 0 | 0 | 1503078026 | 1503077607 | -7 | 1 |
| 109772 | 1 | 1 | 0 | 0 | 0 | 0 | 1503078026 | 1503077607 | -7 | 2 |
| 109773 | 1 | 1 | 0 | 0 | 0 | 0 | 1503078026 | 1503077607 | -7 | 3 |
| 109774 | 1 | 1 | 0 | 0 | 0 | 0 | 1503078026 | 1503077607 | -7 | 4 |
| 109775 | 1 | 1 | 0 | 0 | 0 | 0 | 1503078026 | 1503077607 | -7 | 5 |
| 109776 | 1 | 1 | 0 | 0 | 0 | 0 | 1503078026 | 1503077607 | -7 | 6 |
| 109777 | 1 | 1 | 0 | 0 | 0 | 0 | 1503078032 | 1503077667 | -7 | 1 |
| 109778 | 1 | 1 | 0 | 0 | 0 | 0 | 1503078032 | 1503077667 | -7 | 2 |
| 109779 | 1 | 1 | 0 | 0 | 0 | 0 | 1503078032 | 1503077667 | -7 | 3 |
| 109780 | 1 | 1 | 0 | 0 | 0 | 0 | 1503078032 | 1503077667 | -7 | 4 |
| 109781 | 1 | 1 | 0 | 0 | 0 | 0 | 1503078032 | 1503077667 | -7 | 5 |
| 109782 | 1 | 1 | 0 | 0 | 0 | 0 | 1503078032 | 1503077667 | -7 | 6 |
| 109783 | 1 | 1 | 0 | 0 | 0 | 0 | 1503078191 | 1503077727 | -7 | 1 |
| 109784 | 1 | 1 | 0 | 0 | 0 | 0 | 1503078191 | 1503077727 | -7 | 2 |
| 109785 | 1 | 1 | 0 | 0 | 0 | 0 | 1503078191 | 1503077727 | -7 | 3 |

| sampleTime | sensorType | sensorUnits | firstReading | lastReading | minReading | maxReading | avgReading | secsReading | countReading | indexCount |
|---|---|---|---|---|---|---|---|---|---|---|
| 1503077607 | AADC | A | 1144.264 | 57.0454 | 54.8084 | 1144.264 | 74.8093 | 60 | 59 | 60 |
| 1503077607 | AADC | A | 1144.264 | 51.4527 | 40.2674 | 1144.264 | 60.9508 | 60 | 59 | 60 |
| 1503077607 | AADC | A | 1144.264 | 45.8601 | 43.623 | 1144.264 | 63.5481 | 60 | 59 | 60 |
| 1503077607 | AADC | A | 1716.396 | 55.3676 | 53.6898 | 1716.396 | 83.5207 | 60 | 59 | 60 |
| 1503077607 | AADC | A | 1716.396 | 43.623 | 31.8783 | 1716.396 | 62.4201 | 60 | 59 | 60 |
| 1503077607 | AADC | A | 1716.396 | 41.9452 | 41.9452 | 1716.396 | 70.3256 | 60 | 59 | 60 |
| 1503077667 | AADC | A | 55.9269 | 55.9269 | 54.8084 | 58.164 | 56.5715 | 60 | 59 | 120 |
| 1503077667 | AADC | A | 51.4527 | 42.5044 | 40.2674 | 57.0454 | 45.9359 | 60 | 59 | 120 |
| 1503077667 | AADC | A | 45.8601 | 44.7415 | 44.7415 | 45.8601 | 44.969 | 60 | 59 | 120 |
| 1503077667 | AADC | A | 55.3676 | 53.6898 | 53.6898 | 57.0454 | 55.5951 | 60 | 59 | 120 |
| 1503077667 | AADC | A | 43.623 | 33.5561 | 33.5561 | 48.6564 | 37.5658 | 60 | 59 | 120 |
| 1503077667 | AADC | A | 41.9452 | 41.9452 | 41.9452 | 41.9452 | 41.9452 | 60 | 59 | 120 |
| 1503077727 | AADC | A | 57.0454 | 62.6381 | 55.9269 | 107.3796 | 62.676 | 60 | 59 | 180 |
| 1503077727 | AADC | A | 42.5044 | 51.4527 | 42.5044 | 102.9054 | 50.4859 | 60 | 59 | 180 |
| 1503077727 | AADC | A | 44.7415 | 55.9269 | 44.7415 | 107.3796 | 53.5761 | 60 | 59 | 180 |

FIG. 23

| Hour | Electricity (kWh) | Water (GPH) | Gas (Therms) | Total Cost |
|---|---|---|---|---|
| 12am | 13.4 | 5 | 10 | $3.87 |
| 1am | 13.5 | 5.1 | 10.1 | $3.91 |
| 2am | 13.6 | 5.2 | 10.2 | $3.95 |
| 3am | 13.7 | 5.3 | 10.3 | $4.00 |
| 4am | 13.8 | 5.4 | 10.4 | $4.04 |
| 5am | 13.9 | 5.5 | 10.5 | $4.08 |
| 6am | 14 | 5.6 | 10.6 | $4.12 |
| 7am | 14.1 | 5.7 | 10.7 | $4.16 |
| 8am | 36.2 | 27.8 | 32.8 | $13.22 |
| 9am | 36.3 | 27.9 | 32.9 | $13.26 |
| 10am | 36.4 | 28 | 33 | $13.30 |
| 11am | 36.5 | 28.1 | 33.1 | $13.34 |
| 12am | 36.6 | 28.2 | 33.2 | $13.38 |
| 1pm | 36.7 | 28.3 | 33.3 | $13.43 |
| 2pm | 36.6 | 28.2 | 33.2 | $13.38 |
| 3pm | 36.5 | 28.1 | 33.1 | $13.34 |
| 4pm | 36.4 | 28 | 33 | $13.30 |
| 5pm | 36.3 | 27.9 | 32.9 | $13.26 |
| 6pm | 36.2 | 27.8 | 32.8 | $13.22 |
| 7pm | 18.1 | 13.9 | 16.4 | $6.61 |
| 8pm | 18 | 13.8 | 16.3 | $6.57 |
| 9pm | 17.9 | 13.7 | 16.2 | $6.53 |
| 10pm | 17.8 | 13.6 | 16.1 | $6.49 |
| 11pm | 13.4 | 5 | 10 | $3.87 |
| Total | 595.9 | 411.1 | 521.1 | $208.64 |

FIG. 24B

SYSTEMS FOR REAL-TIME ANALYSIS AND REPORTING OF UTILITY USAGE AND SPEND

PRIORITY CLAIM

This application is the United States National Phase of international PCT application number PCT/US2017/050767, filed Sep. 8, 2017, which claims priority to and the benefit of U.S. Provisional Application No. 62/402,742 filed Sep. 30, 2016, both applications as well as any priority cases are hereby incorporated by reference herein in their entirety.

TECHNICAL FIELD

The present invention relates to the field of systems to analyze, track, and calculate utility consumption. In particular it relates to processes, devices, and programs that can obtain disparate utility data, generate and correlate that data, and universally assess and calculate composite utility consumption and spend information for a user in real time.

BACKGROUND

The idea of tracking and reporting of utility consumption has been known for many years. Currently there exists the ability to collect sensor information from a variety of utility types using a variety of time periods. Individual utility providers capture their own data for billing purposes. Meters usually store information in some interval perhaps once a month, then many days later, it might be available to the consumer as an overall bill for each utility with no detail associated with it and no composite picture of their utility spend for the user. Even when more detailed information is available, it often consists of only kilowatt (kW), kilowatt hour (kWh), and perhaps peak demand (kilowatt (kW)) information but limited rate information and composite information, if any. Many commercial consumers collect their own usage information, mostly for equipment tuning and automatic settings changes determination but again these are individualized and limited to only one item of focus. Consumers usually rely on the manufacturers of their equipment to provide this capability or purchase third party equipment that may hold the data on the device until requested via an application programming interface (API) like RESTful or BACnet or other retrieval methods. For example, systems such as U.S. Pat. No. 9,569,804 to Stein deals with analyzing and managing individual utility consumption, however does not tackle the challenge of utilizing disparate meter information that is not correlated in order to generate composite cost information. Systems such as U.S. Patent Application Publication U.S. 2012/0083930 by Ilic recognize that a challenge in the industry where there are vastly differing protocols and vastly different information not only from different sensors but also from fundamentally different types of utility consumption. Similarly, systems such as U.S. patent application publication U.S. 2010/02836062 Tsypin, attempt to utilize separate sensors, even for environmental information, but do not deal with the task of correlating the information that may be in differing timeframe periods and may even have missing elements of information that are necessary in order to provide the most accurate cost information for user.

Further, systems such as disclosed in U.S. Pat. No. 88,432,382 to Wentzel involve analyzing subsystems but do not provide the ability to be able to generate and correlate disparate utility cost information of differing types of consumed resources. The present invention provides devices, systems, methods, and programs through which many of these challenges can be overcome. It provides designs that can utilize disparate information even when items and information are missing or collected not only in different formats but even with different levels of completeness and the combined, correlated, and visualization data provide the user the most accurate information even in real time when desired.

DISCLOSURE OF THE INVENTION

Accordingly, the present invention includes a variety of aspects, devices, processes, and programs in varied embodiments which may be selected in different combinations to suit differing needs and achieve various goals. It discloses devices and methods to achieve universal assessment of composite utility consumption in a way that is more beneficial to a user and that allows the user to manage, control, and understand their composite consumption of energy. The embodiments present some initial ways to determine composite utility consumption and also how to achieve a number of user goals. Of course, further developments and enhancements may be possible within implementations of the present invention.

As stated, one of the basic goals of embodiments of the invention is to provide a universal device to assess composite utility consumption. It can achieve this goal in multiple ways and involving multiple aspects even when the users' systems are personalized and varied from one to another.

Another goal of embodiments of the invention is to be able to obtain whatever data is available and to generate whatever may be necessary in order to take this disparate data and yet still correlate it for use. In keeping with this goal, systems can even generate missing data from estimates and historical information and use that in making as accurate an assessment as possible for the user.

Yet another goal of embodiments of the invention is to allow the user unusual flexibility on setting the type of information and calculation that may be desired without being constrained by the nature or limitations of existing utility sensors or data.

Yet another goal is to provide a user an ability to, in real-time, and perhaps nearly instantaneously make a determination as to their utility consumption and spend at that point in time so that immediate actions can be taken if appropriate.

Still other goals of embodiments of the invention that users may find particularly beneficial includes abilities to provide system self-checking and calibration capabilities, and even to provide facility, utility device, and change analysis whereby changes in utility consumption that will have effects on composite utility cost.

Naturally other goals of the invention are presented throughout the specifications and claims.

BRIEF DESCRIPTION OF THE DRAWINGS

FIG. 6 is a conceptual diagram of data collection from a separate energy management system with its own pre-existing sensors or the like.

FIGS. 18A and 18B are additional examples of potential visual and tabular presentations of information to a user.

FIG. 20 is an example of one tabular presentation of total facility composite utility consumption spends for two buildings applying a particular, perhaps user set, range.

FIGS. 21A, 21B, 21C, and 21D are further examples of a tabular presentation that expands and provides pre- and post-some event or change calculations and comparisons.

FIG. 23 is an example of a type of superset of data that can be created.

FIGS. 24A and 24B are presentations of composite data in both visual (24A) and tabular (24B) form.

MODE(S) FOR CARRYING OUT THE INVENTION

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional variations. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
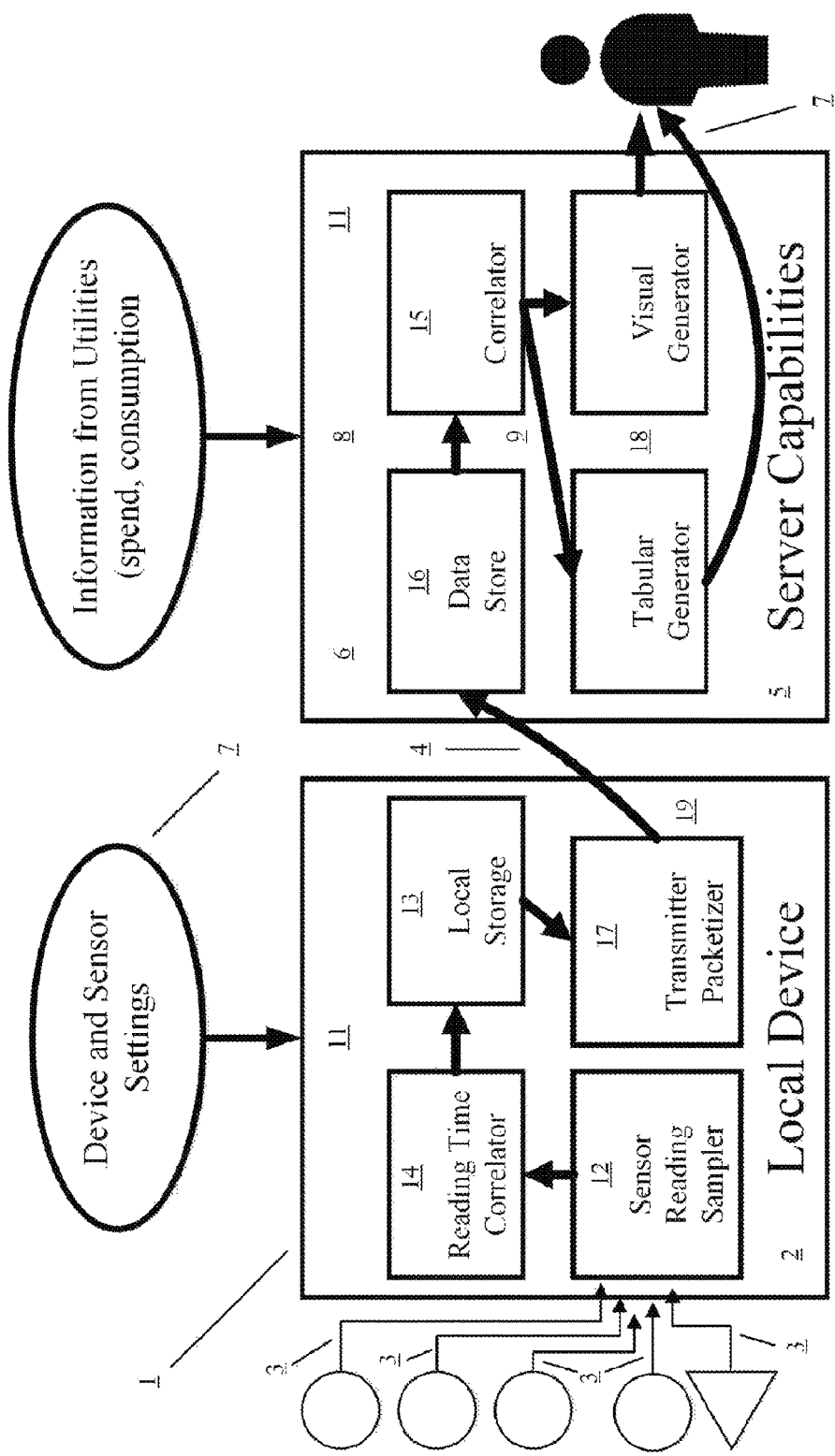
FIG. 1 is a block diagram of an embodiment showing one type of overall system configuration according to the present invention.

As shown in FIG. 1, a system to universally assess composite utility consumption (1) can involve a number of components that even may be placed at different locations. The system (1) can involve a local device (2) and a central process capability (5) interacting with each other by some type of connection (4). The local device (2) may be placed at a home, building, facility, plant, specific equipment, or the like. Further, in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure, it should be understood that all such aspects are at least defined by structures including, as person of ordinary skill in the art would well recognize: hardware circuitry, firmware, programmed application specific components, and even a general purpose computer programmed to accomplish the identified aspect. It may respond to sensors provided with it, may use existing sensors at that locale, may access information externally, or may use a combination of any of these to get various utility consumption information. Significantly, it is shown as configured to accept differing utilities by having multiple disparate utility sensor data inputs (3). These multiple disparate utility sensor data inputs (3) can supply disparate utility consumption data to the local device (2) so that the system to universally assess composite utility consumption (1) can acquire sensor data for multiple disparate utility inputs. At a high level, and as can be appreciated from this overall configuration, the local device (2) can provide this by some type of connection (4), or conditioned or even correlated data to an external location. In addition, as mentioned more generally above, the local device (2) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

In FIG. 1 this external location is shown as the central process capability (5). In addition, as mentioned more generally above, the central process capability (5) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. Within the central process capability (5), there may be a central data warehouse (6) within which some type of composite utility consumption data—raw, conditioned, or both—may reside. Such composite utility consumption data may be generated, correlated, or conditioned either at the local device (2) or the central process capability (5). In order to generate at least some estimated current rate of composite economic spend information, the composite utility consumption data may be combined with a collection of differing types of utility rate information. These differing types of utility rate information can be a challenge to obtain and can be especially challenging for embodiments that desire to provide real-time spend information. As shown in FIG. 1, this overall system configuration can use the central process capability (5) to access these varied rates. This can be achieved by providing an access capability such as by using hardware, firmware, and perhaps software subroutines that configure aspects of the central process capability (5) as a disparate utility rate information accessor (8). In addition, as mentioned more generally above, the disparate utility rate information accessor (8) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. By combining at least some of the composite utility consumption data with appropriate differing types of utility rate information, perhaps including the current rate of composite economic spend information can be provided. All of this can be user controlled by user interface capabilities (7) which may include inputs and outputs for the user. In addition, as mentioned more generally above, the user interface capabilities (7) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

As shown in FIG. 1, the local device (2) may have multiple disparate utility sensor data inputs (3). The disparate utility sensor data inputs (3) can come from different types of sensors. For example, for an electric utility there may be voltage and current sensors and so voltage and current electric utility inputs, for a water utility there may be a flow-based sensor and thus a water utility water flow input for water consumption information, for a gas utility there may be a gas utility gas flow input for gas consumption information, etc. Such sensors can exist and be supplied by the utility itself such as for the utility to sense on-site the user's consumption. The device can use these sensors to tap into and can get the existing outputs from these sensors. Alternatively, the device can supply its own sensors redundantly or in lieu of preexisting sensors. In this manner users can have the comfort of a cross check in their existing sensed information and this can be accomplished and displayed or merely alerted if desired for such a configuration. In this manner, an aspect of embodiments of the invention can include utility-provider-independent sensors or sensing of at least one utility input. The local device (2) or even the central process capability (5) can even obtain such information from other information such as when the information is not traditionally sensed on location but is merely available by outside data access. Such consumption data can be sensed at varied frequencies and in varied manners, of course.

Embodiments can achieve the simultaneous acquisition of data specific to utility consumption at a facility, building, meter, or equipment level and the eventual transmission of this information either periodically (batch) or immediately (real-time). In one preferred embodiment, the inventive technology may non-intrusively and simultaneously collect and transmit interval data recording (IDR) sensor data of natural gas, electric, and water utility consumption for eventual correlation to utility rates and time-of-use (TOU) rates.

In one preferred embodiment, the present inventive technology may provide a metering unit that incorporates a variety of collection and transmission equipment, together in a single small unit. In other embodiments, the present invention may provide for integration of the data analysis and software services within the collection system/unit or a multiplicity of sensors and monitoring devices, including but not limited to, water sensors, electric sensors and meters, energy management systems, and gas/fuel sensors, which can be connected simultaneously to a single device which internally uses a variety of methods to gather the sensor data and then transmit as a single time correlated set of readings via cellular (GPRS, 3G, 4G, LTE, 5G), Wi-Fi, and or connected interfaces to a centralized data storage/warehouse for eventual processing, further or initial time correlation, and application of analytics either immediately and/or accumulated and transmitted at a later time for premises and equipment that were not designed with these monitoring systems in place. The system may receive multiple data points across a variety of time-spans and time periods associated with utility consumption, then utilizing a variety of transmission and collection equipment and methods to accumulate and correlate this data and then store into a database for eventual time correlation, data analysis, spend correlation, including visually discernable signals using a variety of computational systems either locally hosted or other accessible computer-based systems.

As shown in FIG. 1, the local device (2) may include a sensor reading sampler (12) that captures data at an appropriate interval. This can be one way the device can obtain otherwise missing data that is needed in response to a user's indication of desired data frequency such as through a user settable, data collection frequency selector (shown in figure as part of the user interface capabilities (7)) as one of the user inputs possible. The sensor reading sampler (12) aspect can serve to on-site locally collect information from each of the multiple disparate utility inputs. In addition, as mentioned more generally above, the sensor reading sampler (12) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. Once collected, this information may be stored. If this is accomplished on the local device (2), the local device may also include a local, on-site collected utility use information storage (13) responsive to each of the multiple disparate utility sensor data inputs in a manner that the data collected can be stored within the local device (2), which with its sensors or not can be considered a unitary collection device to which each of the utility inputs are provided. In this manner the system can accomplish the step of on-site locally collecting information from each of the utility inputs at the unitary collection device. As shown in FIG. 1, data can also be stored in the server data store (16). This can involve use of a transmitter packetizer (17) that can take whatever information the local device (2) has captured or created and assemble it as an integrated collection, perhaps even compress it, to efficiently provide it to a transceiver (19) for communication by connection (4). In the central process capability (5) full composite utility consumption information can be created and then provided to the user such as by a tabular generator or visual generator (18). Of course, as mentioned more generally above, both the transmitter packetizer (17) and the tabular generator or visual generator (18) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

Because the system can be designed to universally capture what can amount to both widely varying disparate utility consumption information and utility consumption information that may actually be missing or difficult to relate at times, a feature of embodiments can be a need to achieve correlation among the multiple disparate utility sensors or data or the data inputs. This is discussed in more detail below, but in general, the system can include a data correlation capability that can be dispersed between the local device (2) and the central process capability (5), contained within either, or provided elsewhere. The ability to correlate the information from each of the multiple disparate utility inputs towards achieving the collected composite utility data information can be important because the data captured can have different frequencies and can have missing portion of data. In the particular overall system embodiment shown in FIG. 1, the general collected composite utility data information correlator (11) responsive to each of the multiple disparate utility sensor data inputs is shown as dispersed between and as existing at both the local device (2) and the central process capability (5). In addition, as mentioned more generally above, the collected composite utility data information correlator (11) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. In the local device (2) this embodiment shows a reading time correlator (14), and in the central process capability (5) this embodiment shows a server correlator (15). Once more, as mentioned more generally above, both the reading time correlator (14) and the server correlator (15) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. Together these two elements achieve correlating the information from each of the multiple disparate utility inputs to achieve the collected composite utility data information. Correlation can be first achieved as a time correlation such as by the reading time correlator (14) whereby the device can link data taken at like times and even create data such as by interpolation or the like to provide synchronized data such as under one-time index or the like. This data can then be communicated by connection (4) to the central process capability (5) where additional or further correlation can occur such as by server correlator (15).

Figure 2:
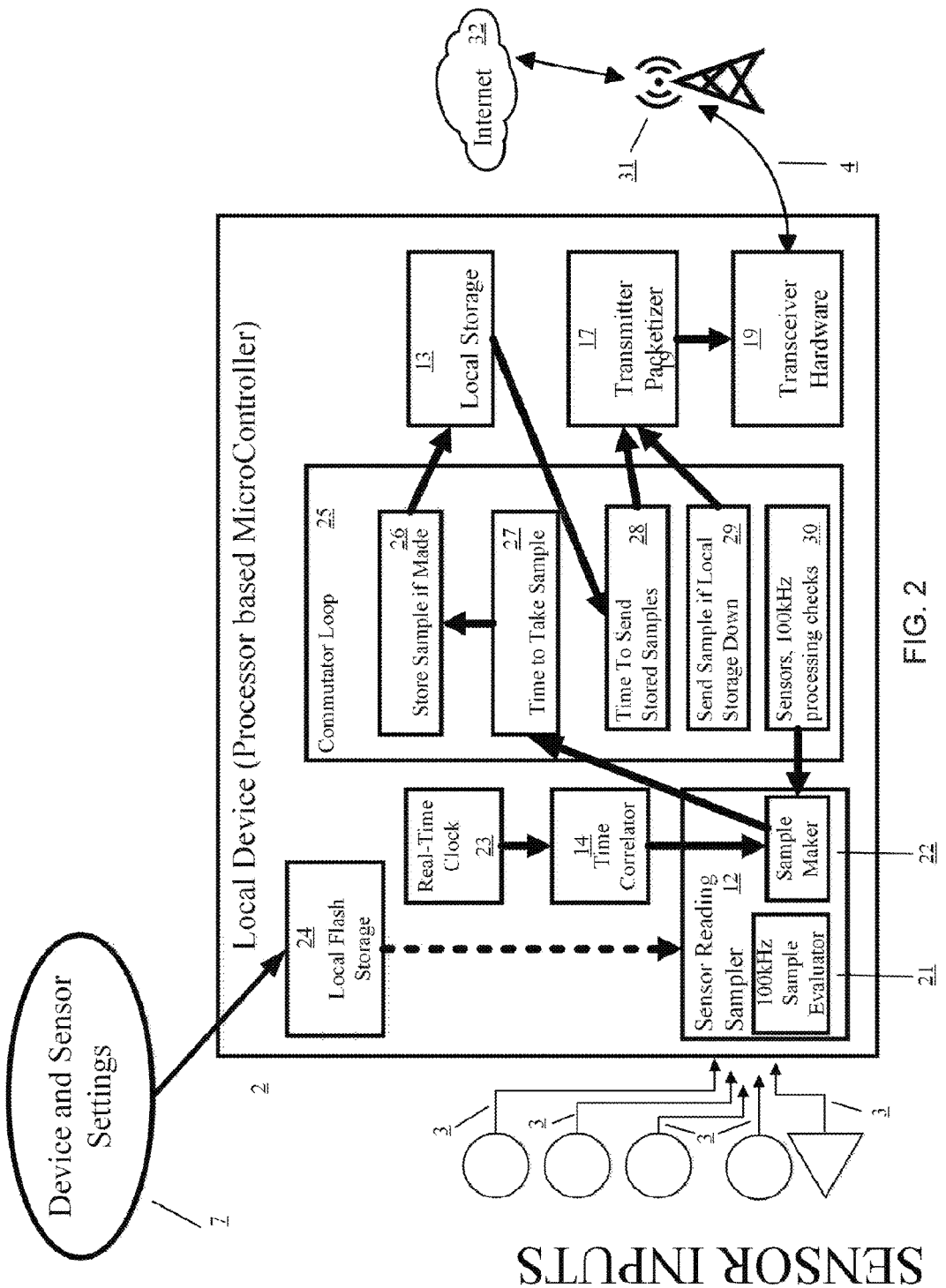
FIG. 2 is a more detailed block diagram of one possible configuration for a local device according to the present invention.
Figure 3:
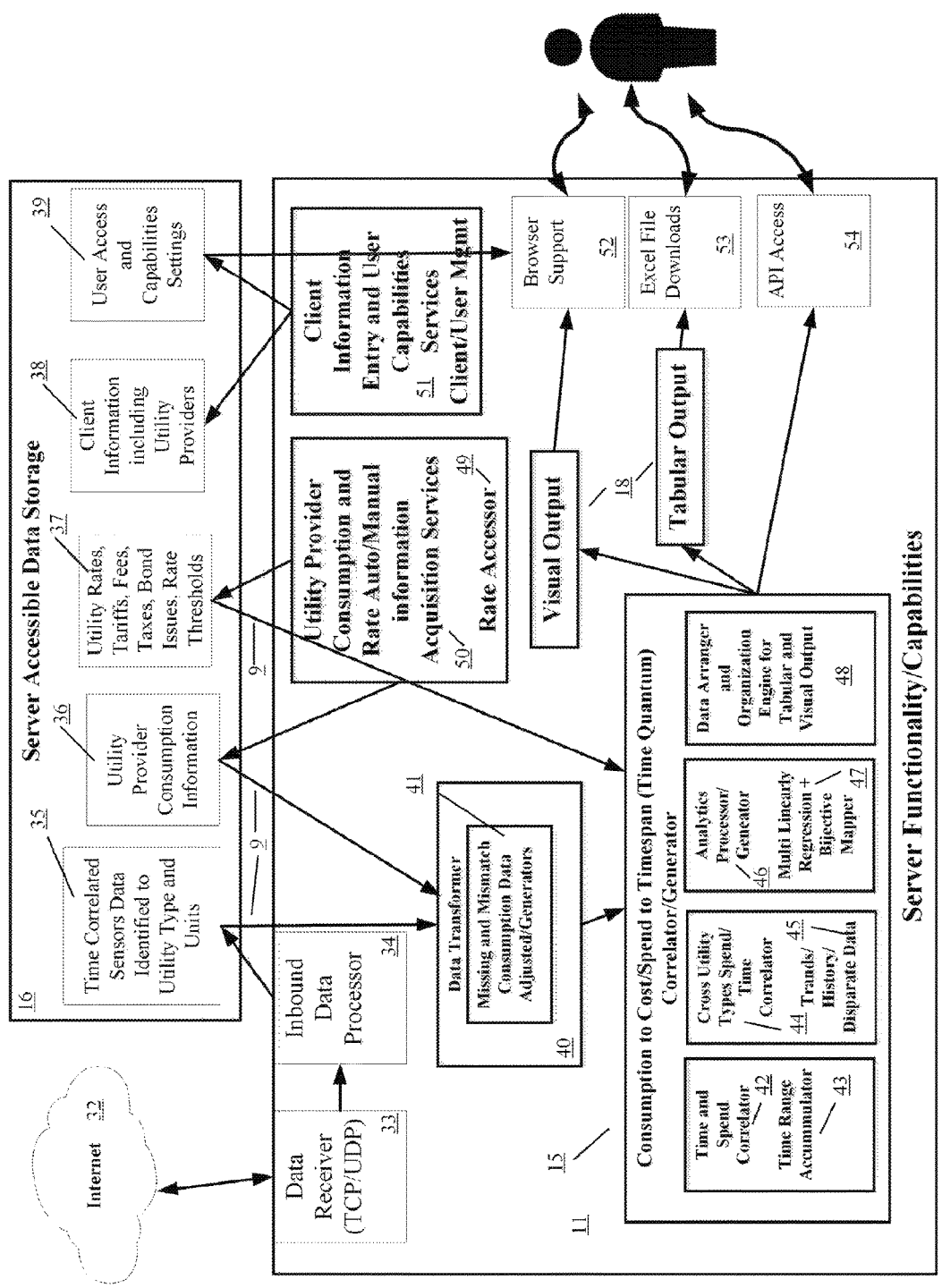
FIG. 3 is a more detailed block diagram of one possible configuration for a central process capability according to the present invention.

FIGS. 2 and 3 show more detail for one configuration of the local device (2) (FIG. 2) and the central process capability (5) (FIG. 3). Referring to FIG. 2, details for a general configuration of the local device (2) can be understood. Again, it should be understood that in all of this discussion, capabilities and elements can be configured at the local device (2), at the central process capability (5), or even elsewhere such as in a portable device or the like. The local device (2) can use the multiple disparate utility sensor data inputs (3) with sampling controlled by sensor reading sampler (12). The sensor reading sampler (12) can be controlled by a real-time clock or counter (23) in a manner such that the time correlator (14) can synchronize the samples. As part of the sensor reading through action of the sensor reading sampler (12) there can be a sample evaluator (21) perhaps such as the 100 kHz sample evaluator as shown to do appropriate data and processing checks. For example, there can also be the processing check capability (30) which can ensure that appropriate data sampling has been achieved. From this, the device can make a data sample (22) for use. Decisions with respect to a sampling can be made perhaps through a commutator loop (25) which can achieve particular decisional processes. Each of the sample evaluator (21), commutator loop (25), and processing check capability (30) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. As shown, the sample can be directed to be stored (29) and the ultimate storage can occur at local storage (13). Decisions can be made within the commutator loop (25) or otherwise such as a decision that it is time to send samples (27). This can then cause the processor to packetize the sample data as mentioned above such as by transmitter packetizer (17). Once packetizing of the data is done, it may be sent by transceiver hardware (19). This can then be transmitted by connection (4). The connection (4) can be a wireless connection (31) or can be a connection simply to the Internet (32). As shown in FIG. 2, sensors can be resident or may be outside the system. For instance, a separate sensor (20) can be provided with its own input into the local device (2). This can be an independent sensor, or even just a separate data access that provides an alternate input to the local device (2). This can act as externally-sourced information and there can be an on-site sensed information combiner that achieves combining externally-sourced information with on-site sensed information. Together, whether locally or externally sourced, such data referred to as, more generally, multiple disparate utility data or a multiple disparate utility data input.

As shown in FIG. 3, more details for the general central process capability (5) can be seen. As shown, information can be provided to the central process capability (5) such as by an Internet Communication (32). Other manners of providing information such as direct wired, wireless, and other types of transmissions or communications are possible within the meaning of connection (4). The data may be received such as by data receiver (33) which may be a type of TCPIP/UDPIP receiver. Once received, the data can be processed such as by inbound data processor (34) which can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. The inbound data processor (34) can provide the data to the server data store (16) which may include: storage of time-correlated sensor data identified by utility type and units (35), utility-provider consumption information (36), rate and rate-related information (37), client information (38), user access and capabilities settings (39), and other types of data storage. This stored data can be used to achieve the data analysis, data generation, and in providing users the desired information. For instance, within the central processing capability (5) or at some other location, there can be included a composite utility estimated cost generator (9). To calculate composite utility estimated cost, the system can include a data transformer (40), and a missing or mismatch consumption data generator (41). Both the data transformer (40) and missing or mismatch consumption data generator (41) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. These can act to transform data so that cost calculations can be made, or to even fill in blanks such as where data is missing or to fill in data where the sampling rates are not synchronized to the user's desires. Of course, the creation of missing data in general can be an important feature. Data for synchronization can occur within the local device (2) or the central process capability (5). Either of these can include a correlator (11). The correlator (11) can be a distributed capability as mentioned above. As shown in FIG. 3, the correlator (11) can include a server correlator (15) that accomplishes some aspects of correlation within the central process capability (5). To do this, the server correlator (15) can have sub processes which would be accomplished by the time and spend correlator (42) and a time-range accumulator (43). These elements can correlate the data in its sample timing and/or also coordinate it as for a desired time range set perhaps by the user input (7). Different types of correlations can be included, such as by a cross utility correlator (44), trends, history, and disparate data correlator (45), as well as other aspects. Once these correlations are accomplished, an analytics processor or data generator (46) can act such as to generate the desired composite cost data. In instances where disparate sensors or sensing rates occur, the server correlator (15) can act as through a multiple regression capability or perhaps a bijective mapper (47). This can ensure that the data across disparate sensors can be used to generate meaningful composite cost information. Once the cost information is created, the data arranger and organizer (48) can act to provide information such as can be used by a tabular output or visual output (18). These outputs can act in conjunction with aspects such as browser support (52), Excel or other formatted file downloads (53), and perhaps API access (54) to provide information as desired. These elements can provide information to a user through the user interface capabilities (7). In addition, as mentioned more generally above, each of: the time and spend correlator (42), the time-range accumulator (43), the cross utility correlator (44), the disparate data correlator (45), the analytics processor or data generator (46), the multiple regression capability, the bijective mapper (47), and the data arranger and organizer (48) and the like can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

As mentioned above the system can involve multiple disparate utility sensor data inputs that provide data by the step of acquiring sensor data for multiple disparate utility inputs. These may be pre-existing or provided as part of the equipment for this system in particular. Thus, there can be a plurality of system separate, non-intrusive sensors each to which at least one of said multiple disparate utility sensor data inputs is responsive and from which it provides data. To avoid interfering with utilities' managed flows, the system can non-intrusively sense each of the multiple disparate utility inputs. This can be done even in part through the step of utility-provider-independent sensing at least one utility input through one or a plurality of utility-provider independent sensors each to which at least one of said multiple disparate utility sensor data inputs is responsive. The sensors and inputs can be varied and can include all or some of the varied utilities a facility may use. This can include: a utility electrical voltage information input, a utility electrical current information input, an airflow information input, a utility gas flow information input, a utility water flow information input, a fuel consumption information input, and the steps of obtaining each of these types of values from a utility input (e.g., obtaining electrical voltage information from a utility input, etc.), and others. These inputs can be used by the system's local unitary collection device. Such local, on-site collected utility use information can be stored at a local, on-site collected utility use information storage such as within the unitary collection device. Consumption information can also be obtained externally such as if or when such raw information is available apart from a local sensor or online from a utility provider and this type of input can be utilized by the system as well. Significant to this invention is the ability for the system to access and correlate a plurality of fundamentally different utility type sensors. These differing types of information can be used by the unitary device by its programming to achieve acquiring consumption data from fundamentally different utility types. The system can also act to filter information to limit the collected information to that which is relevant to the configuration for the facility, utilities, and even the type of system selected by the user. Here the system can include a collected composite utility data information filter upon input or even in internal processes where the filter is an item to which the composite utility estimated cost generator may be responsive. In such an internal process, the step of filtering the collected composite utility data information can occur prior to accomplishing the step of generating at least some estimated composite utility cost indication. Type of filter and filtering can include a collected composite utility data information filter such as a single point in time collected composite utility data information filter that filters the collected composite utility data information as appropriate to address a single point in time of utility consumption, or a time range collected composite utility data information filter that filters the collected composite utility data information as appropriate to address a particular time range of utility consumption.

One aspect that can be important to achieve the embodiment of the invention to achieve real-time visualization and reporting of utility usage and spend can be the collection of consumption or estimated consumption data from the various sensors at differing intervals. Sensors can collect and store or obtain real-time data over a varied frequency (1-second, 1-minute, 5-minute, 15-minute, etc.) or in a batch format where the data is collected across the frequent time period, saved and then transmitted as a group (1-minute, 15-minute, 1-hour, daily, weekly, etc.). Once collected the this consumption and time information along with client/consumer identification, commodity type, commodity consumption units and other information can be transmitted either via WIFI, connected interface, Cellular Network or other means of transmission interface to a central repository of information, a data warehouse, where time-correlation and current rate information may be calculated and stored for eventual presentation as a report or visualization as determined by the consumer. An interface in the form of an API, a visualization platform such as a browser/web-site, a commercial product like Excel, and/or a customer application may then be used to provide the raw data files, visualization and reporting using filtering from the data storage and application of the utility spend information.

Figure 4:
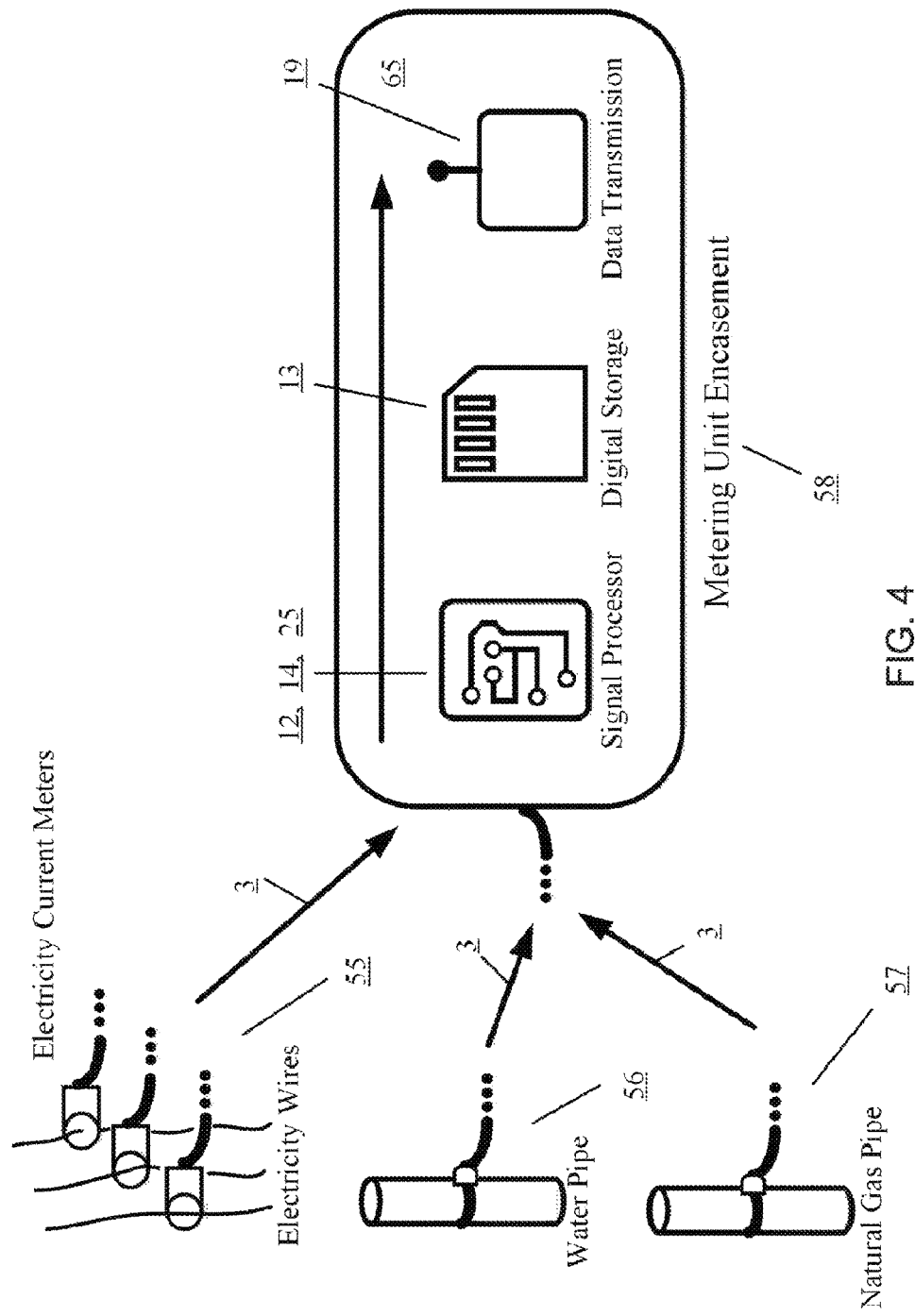
FIG. 4 is a conceptual diagram of basic sensor data collection from electric, water, and natural gas utilities.

The collection of data from sensors to provide an input is shown in more detail in FIGS. 4, 5, 6 and 7. FIG. 4 shows the general collection of data such as from three types of utility use: electric, water, and natural gas utilities. The different types of sensors can include electricity current and voltage meters (55), a water flow sensor (56), and a natural gas flow sensor (57). Each of these can provide inputs to the system. These different types of utility use and different types of sensors connect to provide the multiple disparate utility sensor data inputs (3). Part of the local device (2), can be a separate metering unit encasement (58) which can include different functionalities. This metering unit encasement (58) can be the local device (2) or just a part of it. As shown conceptually in FIG. 4, there can be a processor (65). This signal processor can be the collection of capabilities that ultimately provided the sensor reading sampler (12), the reading time correlator (14), the commutator loop (25), and other programmed capabilities. Again, each of these can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect. The signal processor can provide the data to a digital storage such as the local, on-site collected utility use information storage (13). This information can ultimately be transmitted from the metering unit encasement to another location within the local device (2), or external device, to the processing portion of a local device (2), or otherwise via some type of data transmission. The data transmission can occur through transceiver hardware (19) as mentioned above. In this manner aspects of the system can achieve on-site locally collecting information from each of the utility inputs at some unitary collection device and even storing that information.

Figure 5:
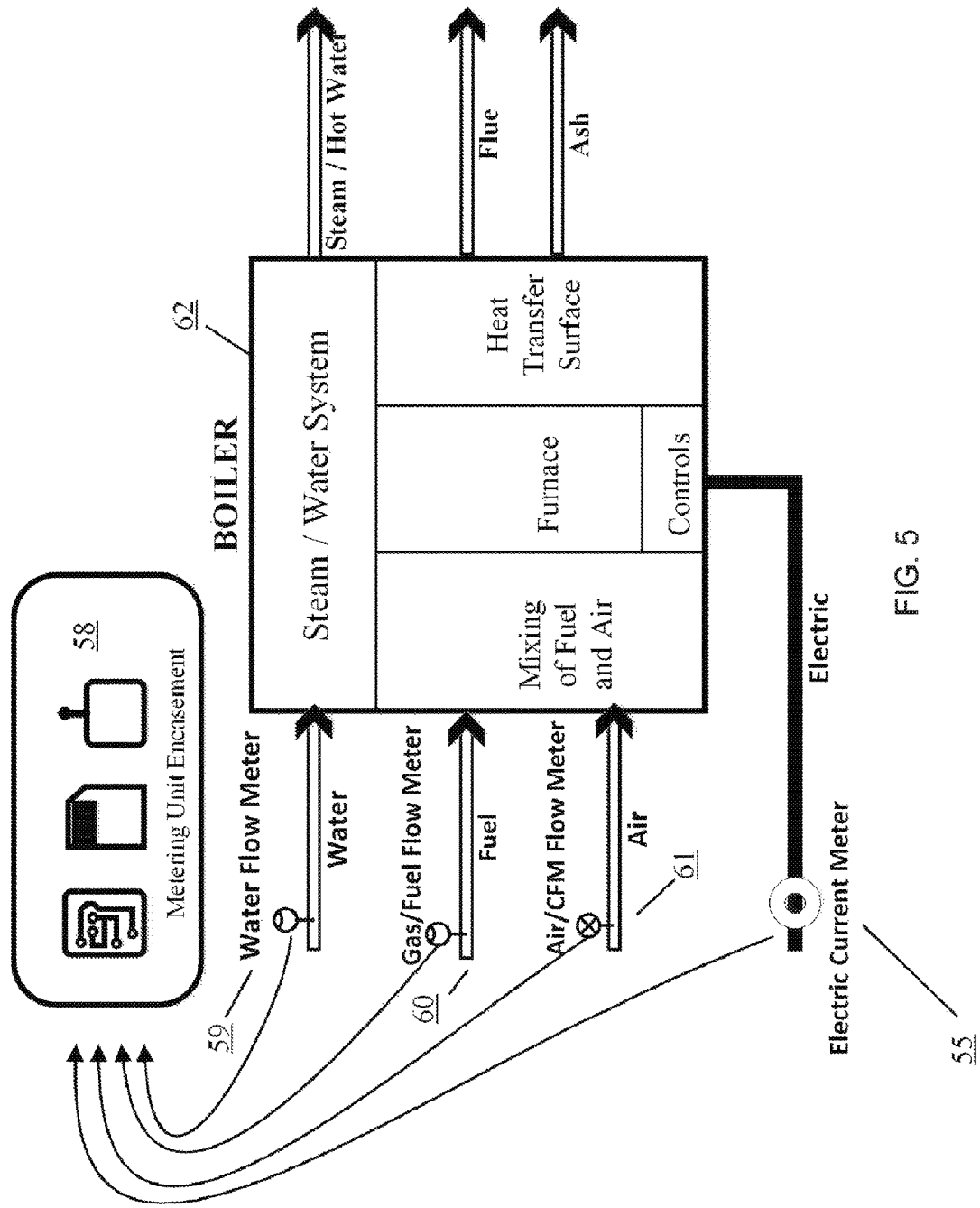
FIG. 5 is a conceptual diagram of equipment level data collection from an item of equipment such as from a boiler.
Figure 6:
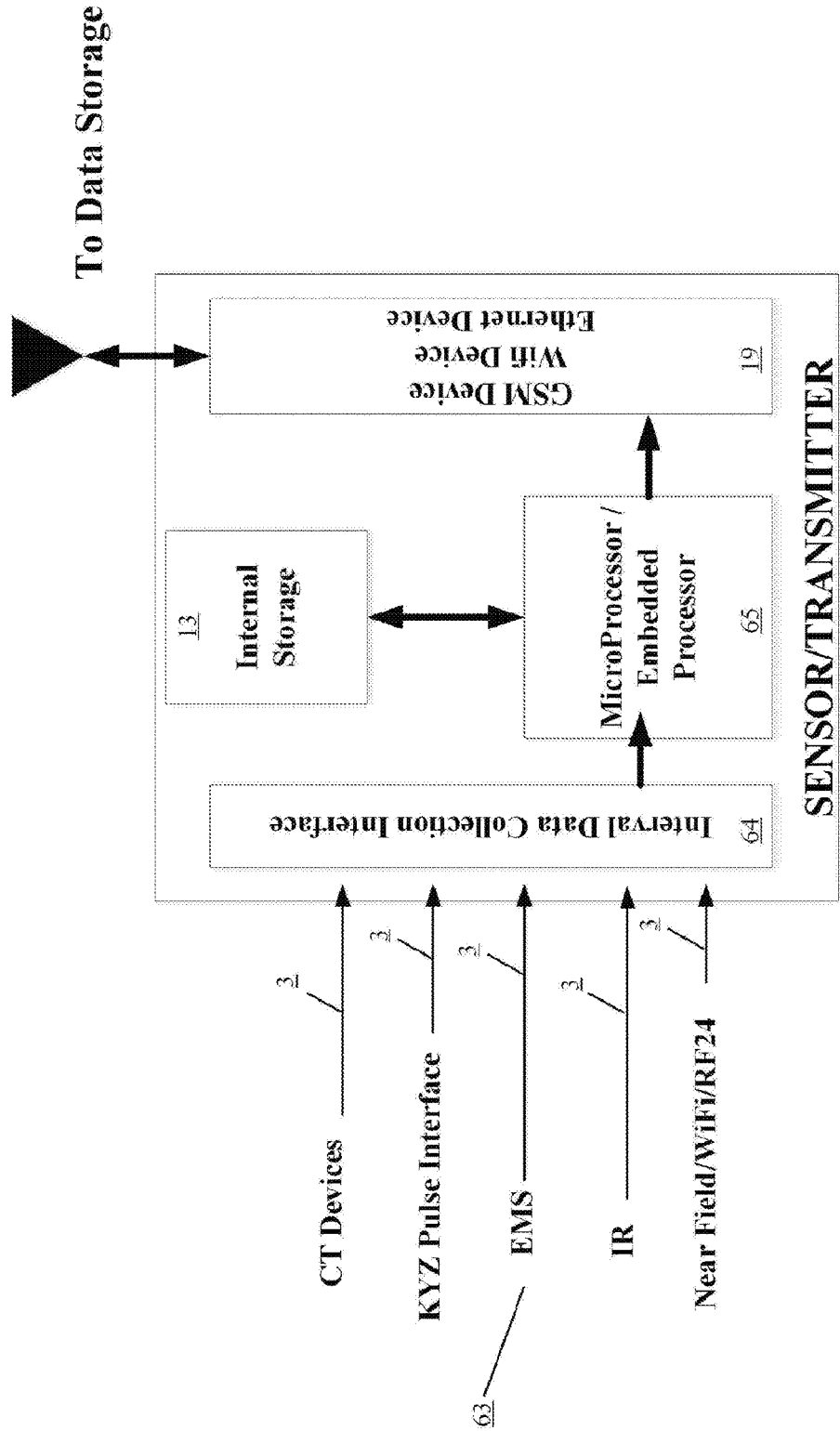
Figure 7:
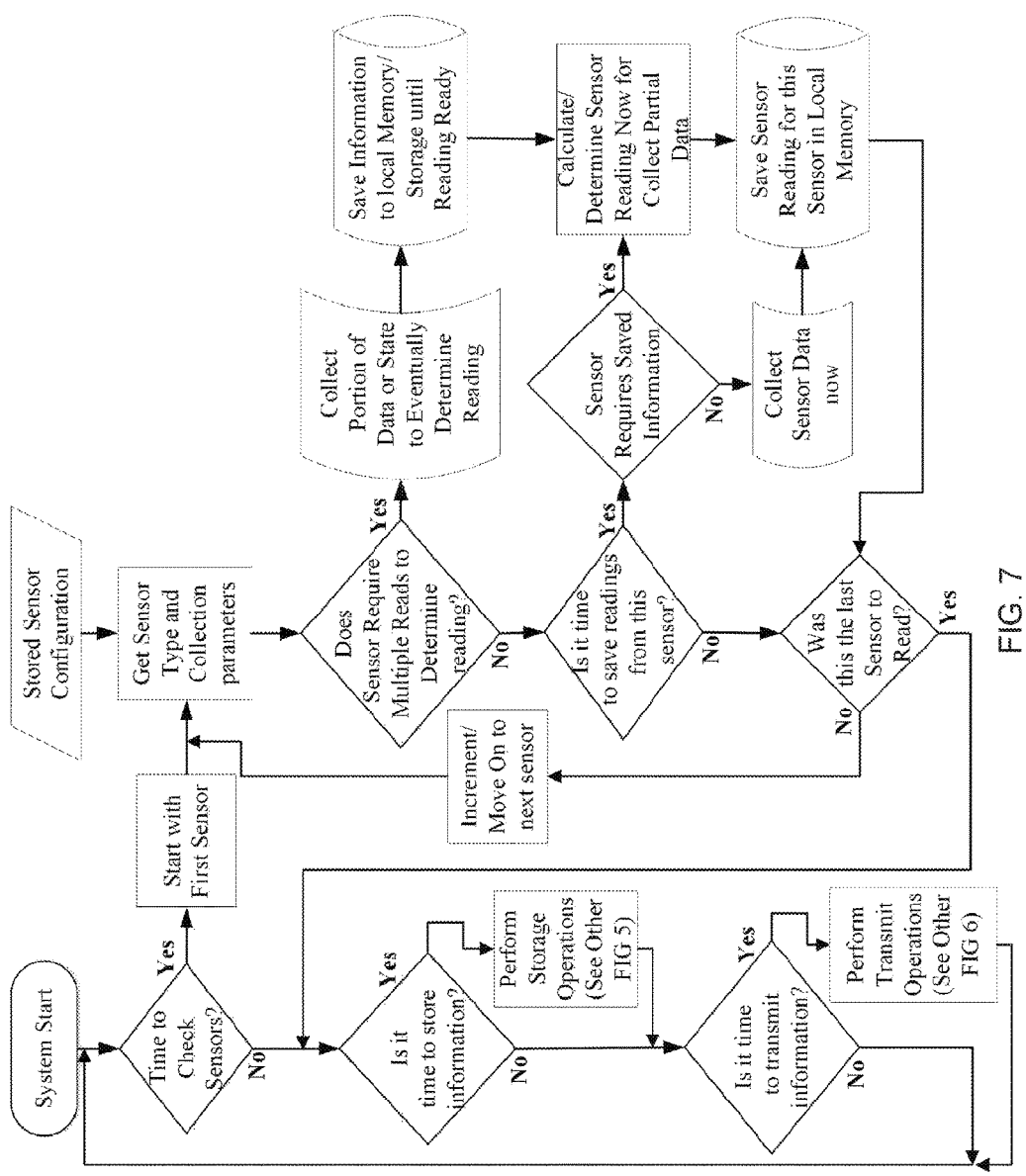
FIG. 7 is a flow chart diagram of a type of sensor data collection routine that can be implemented according to one embodiment of the present invention.

FIG. 5 shows the collection of data at an equipment level, in this case a collection of data from a boiler that uses both electric, water, and fuel such as natural gas, and potentially other utilities. As shown, the disparate sensors can include a boiler water flow sensor (59), a boiler gas or fuel sensor (60), a boiler air use sensor (61), as well as an electric current sensor or sensors (55) as discussed earlier. These types of sensors can provide input to the metering unit encasement (58) and thus the particular data can be isolated to a particular item of equipment, in this case, the boiler (62). FIG. 6 shows the collection of data from an energy management system such as might previously exist at the facility. As is known, the energy management system can include a variety of standard configuration sensors (63) which can provide interval data as is well known. These items can be the input to the local device (2). For interval data, there can be an interval data collection interface (64) which feeds data for handling and appropriate utilization by a processor (65). The processor (65) can provide its output for storage such as to the local, on-site collected utility use information storage (13), or such as for transmission by transceiver hardware (19) for ultimate transmission to another location. FIG. 7 shows one type of embodiment for sensor data collection. This flow chart shows how the system can act from a start of the system, to evaluate when to collect information from sensors. As shown, it can sequence through the various sensors saving the readings and providing the appropriate data frequency for collection.

In collection of data from an energy management system (EMS), collection of interval data, or otherwise, the system can provide an information transformer or achieve transforming in a number of ways such as: an amperage sensor information to selected common utility data information transformer, a KYZ pulse information to selected common utility data information transformer, an EMS information to selected common utility data information transformer, an infrared detection sensor information to selected common utility data information transformer, a near-field communication utility data to selected common utility data information transformer, an externally-sourced third party sensor or meter information to selected common utility data information transformer, or the like to achieve a collected correlated composite utility data information.

The aspect of correlating the information from each of the multiple disparate utility inputs to achieve collected composite utility data information can occur automatically within the unitary collection device such as the local device (2). For data captured at a different frequency, this can be an automatic activity so the system can automatically data-frequency correlate the information and make it correspond even if the sensors' intervals or the like are different. The sensors may collect over differing frequency or time periods (1-second, 1-minute, 5-minute, 15-minute, etc.). Once some data is collected, either the local device (2) or the central process capability (5) can achieve time-correlation and storage for eventual use. This is significant because the present system can have the ability to acquire and even generate information as needed to achieve correlation. Further, this can occur in real-time or for batch information. By this correlation, questions about utility spend can be answered. These can include inquiries such as: (1) "How am I doing right now on my utility consumption?"; (2) "Am I doing better or worse than before?"; (3) "How much am I spending on my utility consumption, right now/period-to-date?"; (4) "What do I do if the utility provider provides me only with monthly numbers?"; (5) "What do I do if the utility provider provides me with incomplete information?"; (6) "Did the improvements I made really help?"; (7) "When was my demand the highest?"; (8) "What is each individual piece of equipment costing me?", (9) "What is going on when I spend the most amount?"; (10) "What equipment operation caused my demand to be so high?"; and many others. While these might, at first glance, seem like very easy to answer questions, in reality, they are not. First and foremost, the quality of the data needed to answer these questions along with the ability to acquire it is difficult. Most entities that acquire this data only use it to determine macro information (e.g. monthly spend) and/or specific equipment information for use by the manufacturer to ensure settings and functionality for specific operational requirements, but not to answer any of the questions above comprehensively, or to use for ad-hoc purposes, like when a piece of equipment is installed or being analyzed for some malfunction or setting issue. Additionally, there are typically no data acquisition devices that will correlate electric consumption, gas consumption, and water consumption for a device using all three (e.g. a boiler) for post analysis processing to enable eventual tuning of a boiler system and/or detection of anomalies that may have crept into the system and how these have affected spend.

Systems according to embodiments of the present invention can include a collected composite utility data information correlator that is responsive to each of the multiple disparate utility sensor data inputs. This element can achieve correlating the information from each of the multiple disparate utility inputs to achieve collected composite utility data information. As mentioned this can occur automatically and can include data-frequency and/or time correlation of the information. This can occur by providing a collected composite utility data information time correlator that correlates information from at least one of the multiple disparate utility sensor data inputs to at least one of the other of the multiple disparate utility sensor data inputs. Frequency correlation can involve the aspect of assuring that the period in between the individual data points from each input are similar. If they are not, the system can even intelligently generate the missing data to make the data correlated even though it was not provided by the sensor as something that could have been correlated. Thus, systems can include a different data frequency input utility data information correlator, and a data approximation utility estimated cost generator. These elements can achieve correlating information from disparate utility inputs having differing data-frequencies, and can achieve generating approximate data to achieve the desired common data frequency for at least some of the multiple disparate utility inputs, to achieve a collected data frequency-correlated composite utility data information. This can include correlating the information from a gas utility input, correlating the information from a water utility input, correlating the information from an electric utility input, and even others to achieve the desired collected composite utility data information.

Time correlating the information from at least one of the multiple disparate utility inputs to at least another of the multiple disparate utility inputs to create at least some collected time-correlated composite utility data information can occur by assuring that data is available across the entire desired time spectrum. Again, if it is not, the system can intelligently generate it. This can include filling in the blanks where there is discordantly fragmented information such as might exist when a sensor malfunctioned, was offline, or the like. Again, this can occur on-site by an on-site collected composite utility data information correlator or it can occur on the local device (2) at another location, such as at the central process capability (5).

As part of the aspect of correlating the data, the system can even be configured as a bijective mapping processor that maps information from at least one of the multiple disparate utility sensor data inputs with information onto another of the multiple disparate utility sensor data inputs. One can serve as the master, and the other can serve as the slave in such a unique process for the data to allow the system to create appropriate data and provide the user the desired activity even if the sensors would not otherwise have been able to have allowed the system to achieve such an activity. By bijectively mapping the information from at least one of the multiple disparate utility inputs onto at least another of the multiple disparate utility inputs to create at least some collected time-correlated composite utility data information, the system can achieve significant advances.

Figure 8:
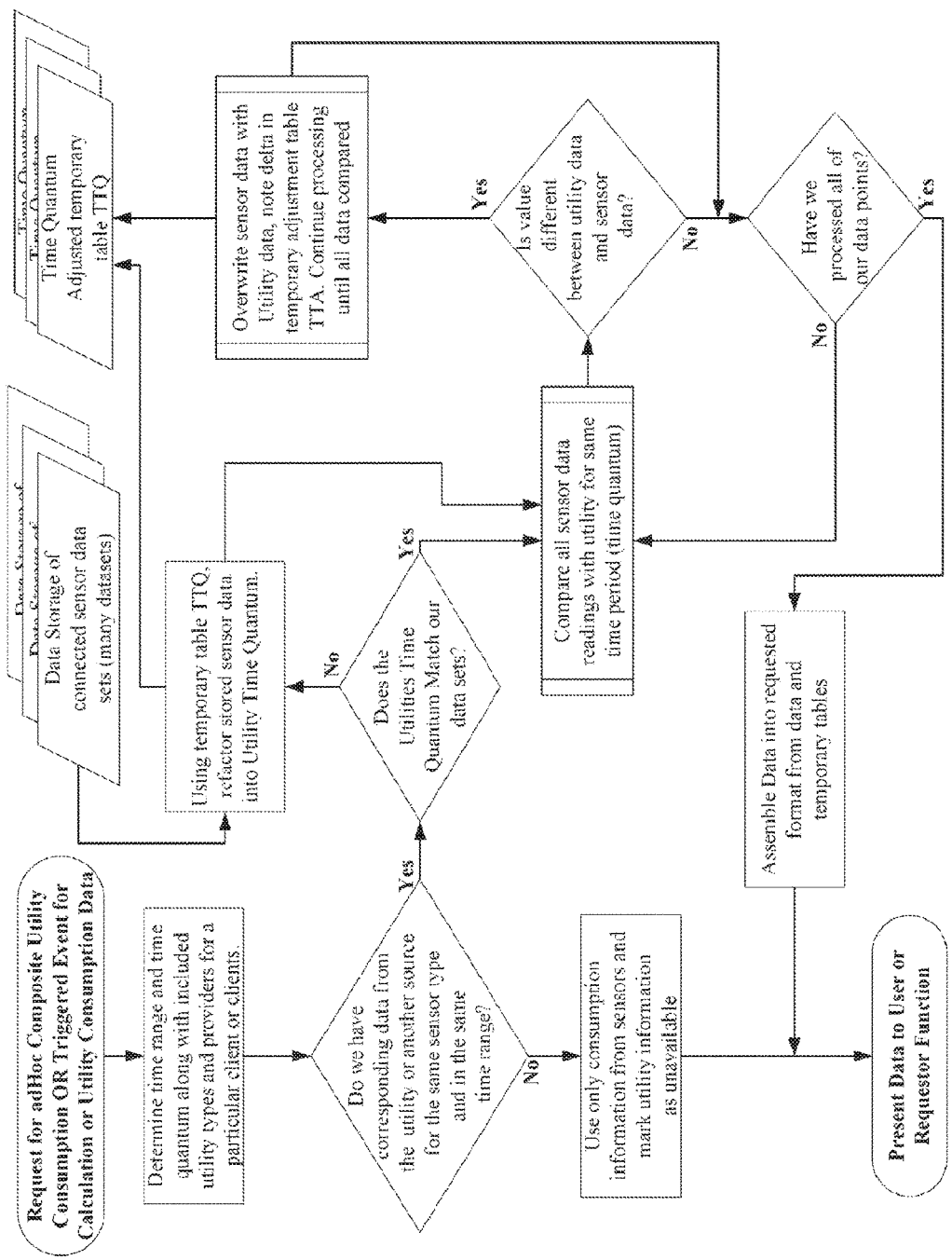
FIG. 8 is a flow chart showing a method by which one embodiment can achieve correlation of disparate sensor data.

FIG. 8 shows a method by which one embodiment can achieve correlations. In this figure the flow chart shows how in real-time an ad-hoc request or other trigger can cause the system to act to capture, analyze, and correlate the data ultimately to be able to provide a visualized or other result as requested by the user. As can be understood from FIG. 8, the calculation of cost information can require the implementation of peculiar processes relative to update and rate information. This is explained below.

Some utility rate information is necessary in order to calculate a utility cost indication. This can be achieved within the central process capability (5) through the utility provider acquisition services (50), and through the more general rate accessor (49). Again, each of the more general rate accessor (49), utility provider acquisition services (50), and the user capabilities services (51) and the like can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

Access to appropriate utility rate information and the like can be achieved by setup and through the client information and the user capabilities services (51). This can occur through user interface capabilities (7) that may exist either as part of the local device (2) or the central process capability (5). The aspect of obtaining and using rate information is discussed in more detail below. Utility rate information placed into the data store may be acquired using a variety of methods including manual entry (such as reading off a bill, or from PRC site, or from utility provider site), a utility provider API interface that provides rate/fee information, a provider of TOU information for a specific region, a utility action, or a client input. Rate information is stored with an applicable effective time-range such that the systems and methods will be accurate historically as well as currently. TOU information can be stored with an applicable time-range as well.

Rates and fees by utility providers are typically published either via a Public Regulatory Agency or Commission (PRC) responsible for the geographic areas the utility provider operates in, on its own web-sites for the different types of customer classes (commercial, government, residential, etc.) that they may serve, and typically on the consumer's billing statement. Utility billing typically includes peak (higher price) and off-peak rates for total usage along with additional billing for Demand peaks (highest rate of usage in a particular time period). At this time, most rates for electricity are only based on two time ranges (peak and off peak) and a possible higher penalty rate if a total trailing monthly average is exceeded. Demand is discretely billed based on the maximum demand in a month as determined within some time-period (5 minute or 15 minute). These rates are provided as singular values and are not correlated to any of the time-based sensor data to the client. Additionally, taxes and other regulatory fees may be applied to the billing. Additional billing methodologies exist ranging from the simple method previously described to a Time-Of-Use billing method (TOU) which is where the rate changes based on available utility resources, the costs at that moment to acquire more or generate/provide more of the resources (e.g. I need to buy power from Texas at 3 PM because it is hot out and it will cost more). To date, utility providers have tried to predict this additional spend and factor it into the overall billing rate, but the TOU model can be further enabled with the availability of the invention described herein.

Figure 9:
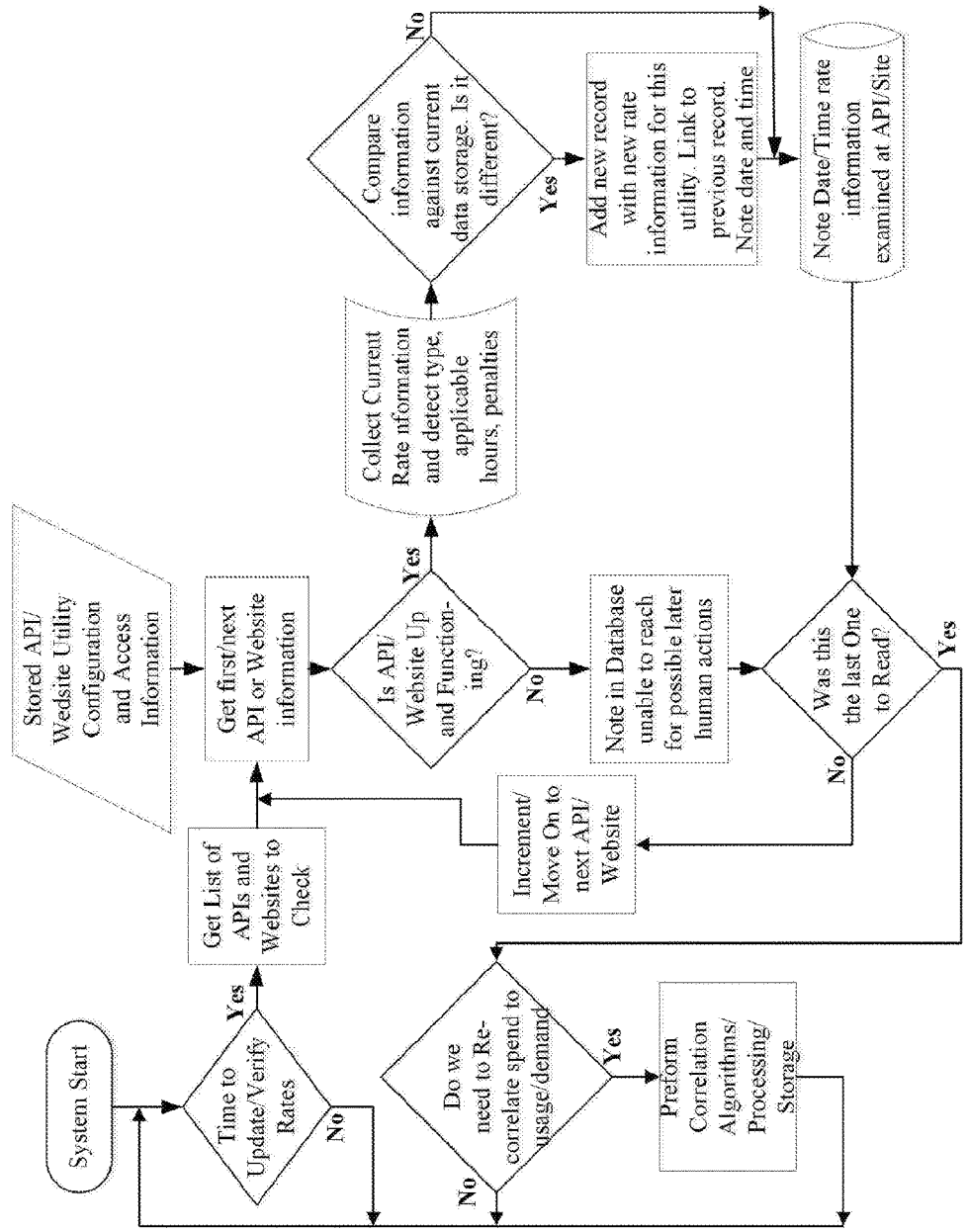
FIG. 9 is a flow chart to collect published rates to achieve a composite utility cost indication according to one embodiment of the present invention.

FIG. 9 shows a flow chart for how one embodiment of the system can act to collect published rates to achieve a composite utility cost indication according to one embodiment of the present invention. As mentioned earlier, embodiments of the system can include a disparate utility rate information accessor (8) that can acquire disparate utility rate information corresponding to each of the multiple disparate utility inputs. Once collected, this disparate utility rate data can be stored perhaps at the server data store (16) acting as a disparate utility rate information data storage, or perhaps at the local storage (13). The system can check for current rate information as shown, can act upon startup, or can update rates at any time. It can determine a set of external rate information that may be needed for said user, can externally acquire that rate information for eventual use, and can store the set of external rate information. Because there are likely multiple types of utilities and multiple utility providers, the accessor (8) can be a multiple access capability, disparate utility rate information accessor with a plurality of active capabilities. Each of these active capabilities can correspond to one of the multiple disparate utility sensor data inputs and utility types, and the active capabilities can be active in the sense that they are available for use upon need at any time. Upon action, these active capabilities can be used to get the rate information and then to download the desired utility rate information which can be stored at some location. In some embodiments the user can be provided a user viewable utility rate information display to show least one, if not all, of the multiple disparate rate information as well as the utility sensor data inputs. By acquiring disparate utility rate data for multiple disparate utilities, the system can be in a position to calculate a cost indication. The composite utility cost indications can be achieved by applying the disparate utility rate data to at least a portion of the collected composite utility data information, such as the consumption data. Rate information can be influenced by demand and so embodiments can include a current user utility demand value calculator and even a demand peak rate applicator to which the composite utility estimated cost generator is responsive to calculate appropriately when a demand peak rate is applicable A variety of types of rate information accessors can be included, such as a time-of-use utility rate information accessor, an automatic externally-sourced full-factored utility rate information accessor, a peak usage utility rate information accessor, an off-peak usage utility rate information accessor, a demand peak utility rate information accessor, a fuel charge utility rate information accessor, a rider utility rate information accessor, a reactive power charge utility rate information accessor, a carbon related charge utility rate information accessor, a governmental surcharge utility rate information accessor, a renewable energy credit utility rate information accessor, an electric franchise fee credit utility rate information accessor, a renewable energy rider utility rate information accessor, a cost-effective energy saving credit utility rate information accessor, a penalty utility rate information accessor, a supplier charge utility rate information accessor, and the like. Similarly, the system can access various types of rate information such as: peak usage rate information, off-peak usage rate information, demand peak rate information, time-of-use rate information, fuel charge information, rider information, reactive power charge information, carbon related charge information, governmental surcharge information, renewable energy credit information, electric franchise fee credit information, renewable energy rider information, cost-effective energy saving credit information, penalty information, supplier charge information, and the like.

An important aspect to calculating an accurate composite utility cost indication is that the system can automatically obtain full-factored utility rate information for each of the multiple disparate utility inputs. This full-factored utility rate information can be synchronized to the utility data information for application in calculating a composite utility cost indication. For utility providers that provide computer-to-computer access to current rate, fees, tariffs, and costs information including rate types and additional fees and taxes and bond measure information, the system can have a scheduled timed trigger operation (CRON JOB) that acquires at least some aggregate rate information from the utility provider's API for each utility that the system needs information for or has utility provider information in its database. If all of the information is identical to the last pass, then the new information might not be entered into the database and the current record can be assumed to be the current rates (last active set of rate data records for that utility provider). If no information is stored, all of the acquired information may be stored as the latest and newest rate information. If the old, non-matching, rate information is present in the data store for this utility provider, then a new record might be added to the data store reflecting the new rate information and its effective start date. The old record can be updated with a date when the rates are no longer valid (maybe a date difference is detected, or when the API says the new rate goes into effect), and this record may be rewritten along with a reference to the newly added rate record for this utility and this utility resource/commodity. For utility providers that do not provide a computer-to-computer access to its current rates, fees, tariffs, and costs, the system can notify a user to periodically check the rate information for these utility providers either using the utility provider's published information or a related government entity or regulatory entity. If there is no change, no action might be taken. If there is a change, then the user can be prompted to go to a system screen that might allow them to add the new rate information and its effective start date. Such a system screen can then add a new rate record for this utility and mark the last active one as no longer valid and update the forward reference to the new date along with date information.

Embodiments of the system can use a scheduled event timer (CRON Job) or a user request for a tabular report or visualization of spend for a particular building, facility, or piece of equipment for a specific time range. Once triggered the system can begin execution of a process that computes current spend for all related utility resource consumption for a particular client or all clients. The system can look at a client's specific building, facility, or piece or equipment for the particular time range and can determine the utility spend record set that applies for all types of utility provider provided commodities such as electricity, water, and natural gas consumption for a boiler, or the like. Once the disparate utility inputs are determined, the system can generate a rate, fee, cost, and tariff analysis based on time of day, rates in effect for the desired time range, exceeded thresholds, and other inputs. In the case where thresholds and changes to rates may require more historical information than was initially acquired and identified, the system can gather the requisite additional information to correctly calculate the spend for each commodity time in the time-frame requested. In the case of a scheduled event timer, this is typically any newly acquired data present in the data store when the process was started. Additionally, for fixed fees, taxes, and other fees that apply to an entire billing cycle but not necessarily to actual consumption levels, the applicable portion of these fees may be applied across the time-domain of the billing cycle and the average consumption of resources to effectively determine an estimate of the applicable cost associated with a unit of commodity consumption. Once the rates and applicable fees are calculated, the system can begin to process and sum the values for the time-span requested or the time-range of the data. As each sum and value is calculated, it can be placed into a related record and stored with a reference to the stored utility resource records. Additionally, the resource records may be updated with a reference to the stored spend values, or the actual calculated value. Information may be stored with the original sensor/resource data. If prior historical information was required, then the process can start at the oldest included data and then calculate forward (typically from the end of the last billing cycle) until it reaches the end of the stored data or the end of the requested timespan. With the spend data now acquired for all of the disparate utilities, the spend can be time-correlated, in the sense of being linked with appropriate data, between the disparate utilities and the spend can be added together for the identical time ranges. If identical time ranges don't exist, the largest time span/quantum can be used and the non-conforming disparate utility information can be adjusted to match. Once the time is correlated to the spend amounts (and related consumption data), the system may either store this information, produce a tabular report based on the requested fields, apply some requested analytics to generate a visualization for the user to view or use, or otherwise act. In these manners, the system can provide an automatic externally-sourced full-factored utility rate information accessor and can automatically externally obtain full-factored utility cost information for each of the multiple disparate utility inputs. It can automatically synchronize the full-factored utility cost information to the utility data information.

One aspect that can be advantageous for certain embodiments is that embodiments of the system can act at down times to get information that will or might be needed in the future. Embodiments can achieve request-unnecessary acquiring utility rate information corresponding to at least one utility input, and can achieve storing the utility rate information for later use. This can occur during periods of low activity and so it can achieve the step of low activity acquiring utility cost information corresponding to at least one utility input and can have a low activity utility rate information accessor, or more generally, achieve request-unnecessary acquiring of utility cost information corresponding to at least one utility input.

Figure 10:
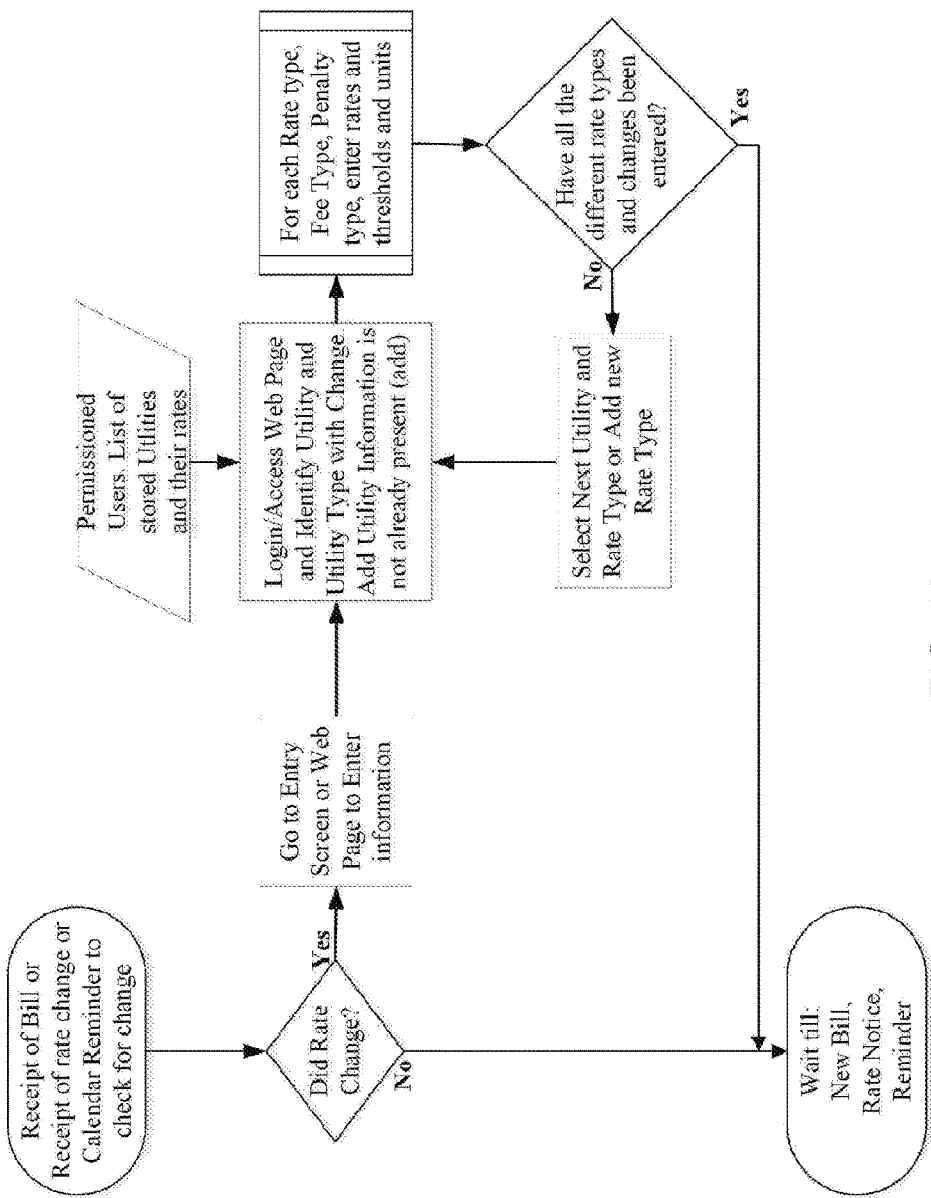
FIG. 10 is a flow chart for processes to allow user input for rate information in order to achieve a composite utility cost indication according to one embodiment of the present invention.

The system can also determine when external rate information is unavailable. In response it can automatically act as a result of such a determination. For example, it can prompt a user, and can indicate that the rate information is unavailable. For instances when rate information is not externally available or otherwise, FIG. 10 shows a flow chart for how an embodiment of the system can allow user input for rate information in order to achieve a composite utility cost indication according to one embodiment of the present invention. As can be understood, embodiments can allow for manual user input from which utility rate information for at least one utility can be determined. By providing a user an opportunity to manually input information indicative of utility cost information such as from a utility bill, an alternative can be provided. When a utility provider's costs, rates, fees, and/or tariffs are not available for electronic download, user input can be manually entered into the system from several sources. These sources include, but are not limited to: (a) published information on their websites in Webpage form, PDF documents, Word Documents, or other publication methods; from regulatory entities such as Public Regulatory Commissions (PRC) or Public Utility Commissions (PUC); or derived from billing information sent to their clients. Information can be available from rate groups including individual, commercial, industrial, farming, cities, and/or government facilities. Almost all rates and tariffs are time-of-day based with costly rates and tariffs during daylight hours with possible demand (rate of usage) charges as well along with tax entities. They may include one type of utility consumption, such as electric usage, or include a variety of utility consumables and other services such as water, trash, emergency personnel, and other fees unrelated to the actual consumed utility resources.

The steps to manual input this information could be:
(1) Acquire the rate, costs, fees, and/or tariff information for entry. These might include for electricity, but are not limited to: Applicable Rate Type, Cost per kWh non-peak, Cost per kWh peak, Fuel Cost Adjustments per kWh, Taxes (State, County, City), Fees for Propositions, Franchise Fees, Water Base Changes, Water Units Charge, Facility Fees, any surcharges, and others.
(2) Bring up the system's manual entry screen and select the utility to which these rates, fees, costs, and tariffs apply. If the utility doesn't exist, go to the "Add a Utility" page and add this utility, filling in all of the fields on the "Add a Utility" page and then pressing save/submit. Once the utility is selected, the type of utility will be selected by the user.
(3) Next the user might add a rate type, if it doesn't exist for this utility, after which, they will move to the costs and fees screen.
(4) The user may select from a menu the type of fee, rate, cost, or tariff to be entered.
(5) The user may enter the actual cost in the appropriate currency and select the currency type. The currency type may be prepopulated based on the utility address and information from the utility add screen.

(6) The user might also add any applicable thresholds, if any, that may trigger this fee (e.g. always, above XXX units, during XXX time of day, etc.)
(7) The user may then continue to add fees, surcharges, taxes, and all other collected information for this utility for this rate code or type until all of the acquired information has been entered.
(8) If required, the user may then press save/submit. The entry of this information may span many pages and may vary depending upon the utility type (e.g. different pages for water versus gas versus electricity).
(9) A facility may be provided that allows the user to enter parameters from a client's bill to see if the system calculates the same fees and total charges as the utility. If it doesn't match, the user can then return to the fees and structure screen to attempt to determine any issues.

As should be understood from the above, the system can achieve obtaining needed rate information automatically. It can include an automatic utility rate information locator to which the multiple access capability, disparate utility rate information accessor is responsive. It can automatically determine desired or potentially desired utility rate information corresponding to a particular utility input or more. Then it can automatically select an available resource location at which the desired utility cost information can be accessed, automatically download the desired utility rate information, and can automatically store the desired utility rate information. The automatic functions can also include advising the user of rate changes. By doing a comparison or otherwise, it can automatically determine when a utility rate information change occurs for at least one of the multiple disparate utility inputs and can automatically advise the user at some point before or after that utility rate information change occurs. It can similarly update rates and thus can be considered as including an automatic utility rate information rate information updater.

Figure 11:
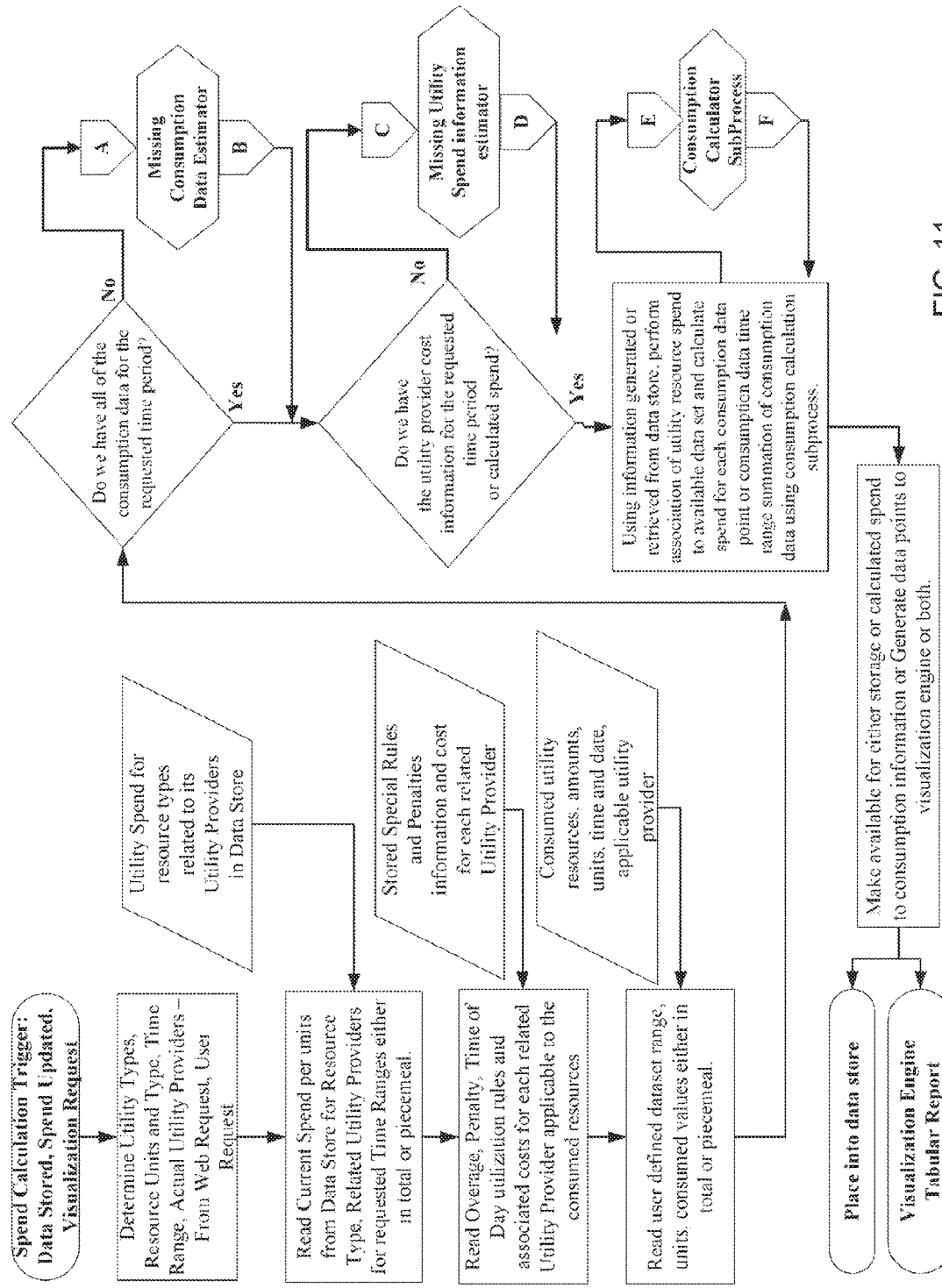
FIG. 11 is a flow chart diagram of a type of real-time request for consumption information according to one embodiment of the present invention.
Figure 12:
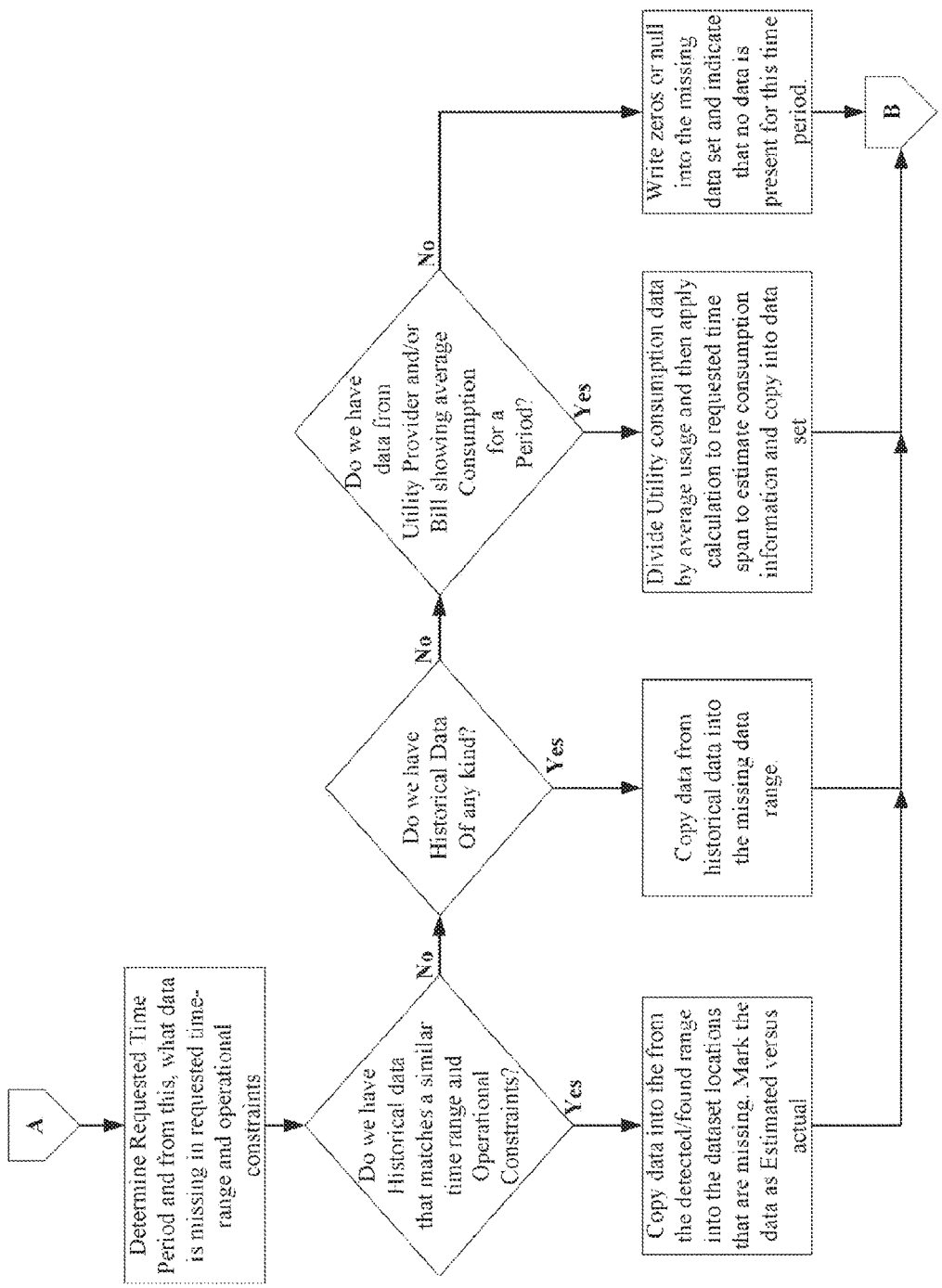
FIG. 12 is a flow chart showing the missing consumption data estimator subroutine callout from FIG. 11 as well as FIG. 19.
Figure 13:
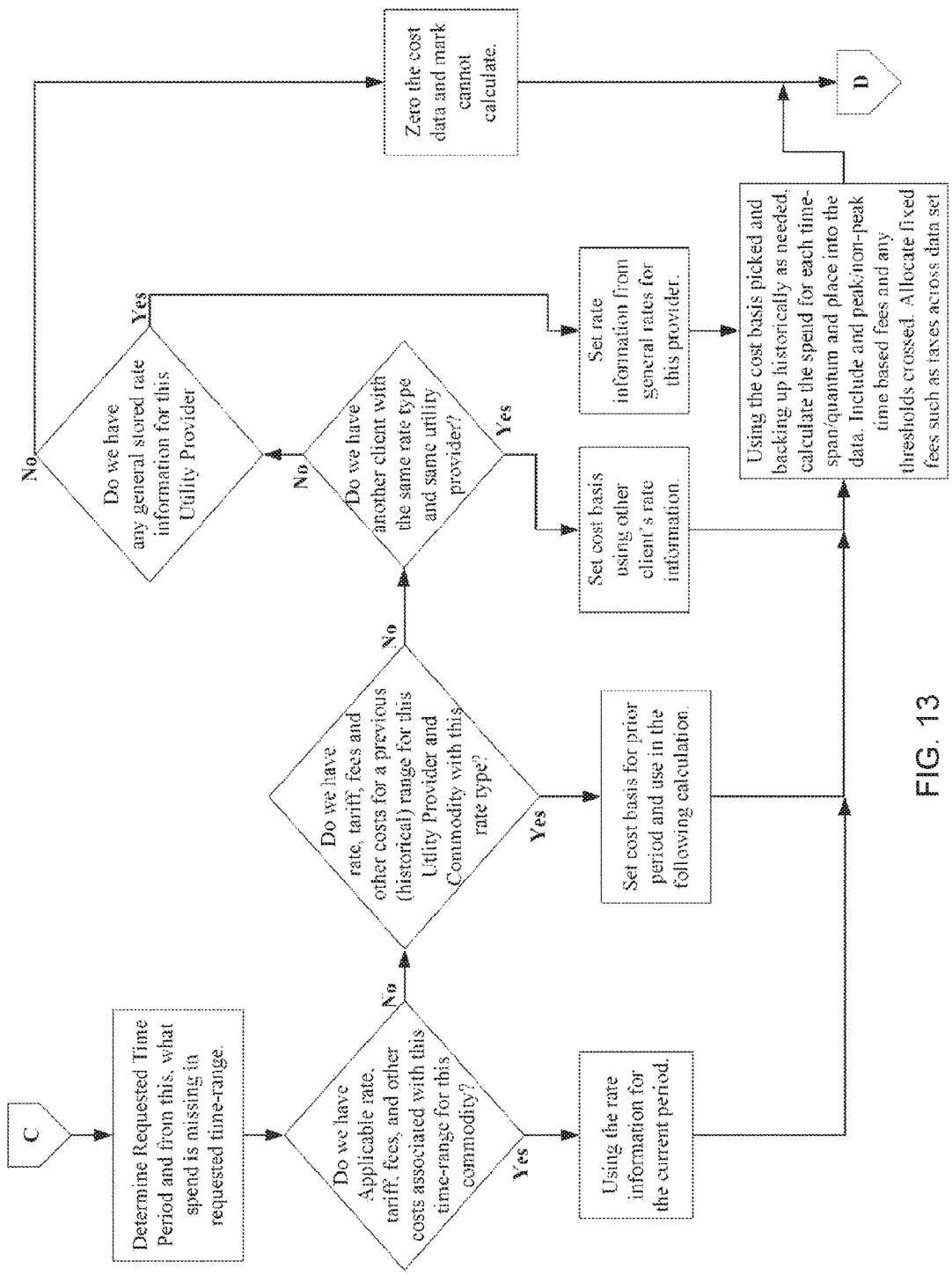
FIG. 13 is a flow chart showing the missing utility spend estimator subroutine callout from FIG. 11 as well as FIG. 19.
Figure 14:
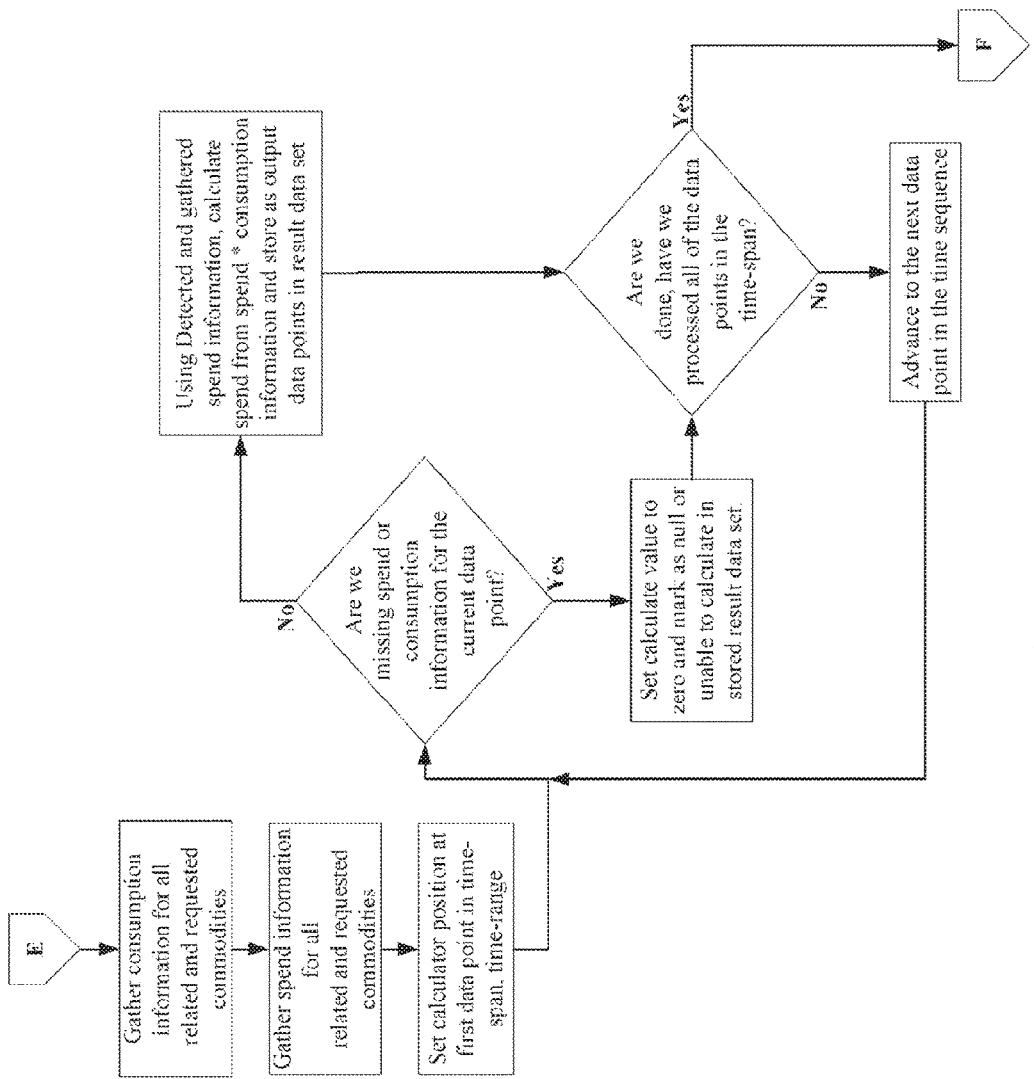
FIG. 14 is a flow chart showing the consumption calculator subprocess subroutine callout from FIG. 11 as well as FIG. 19.
Figure 15:
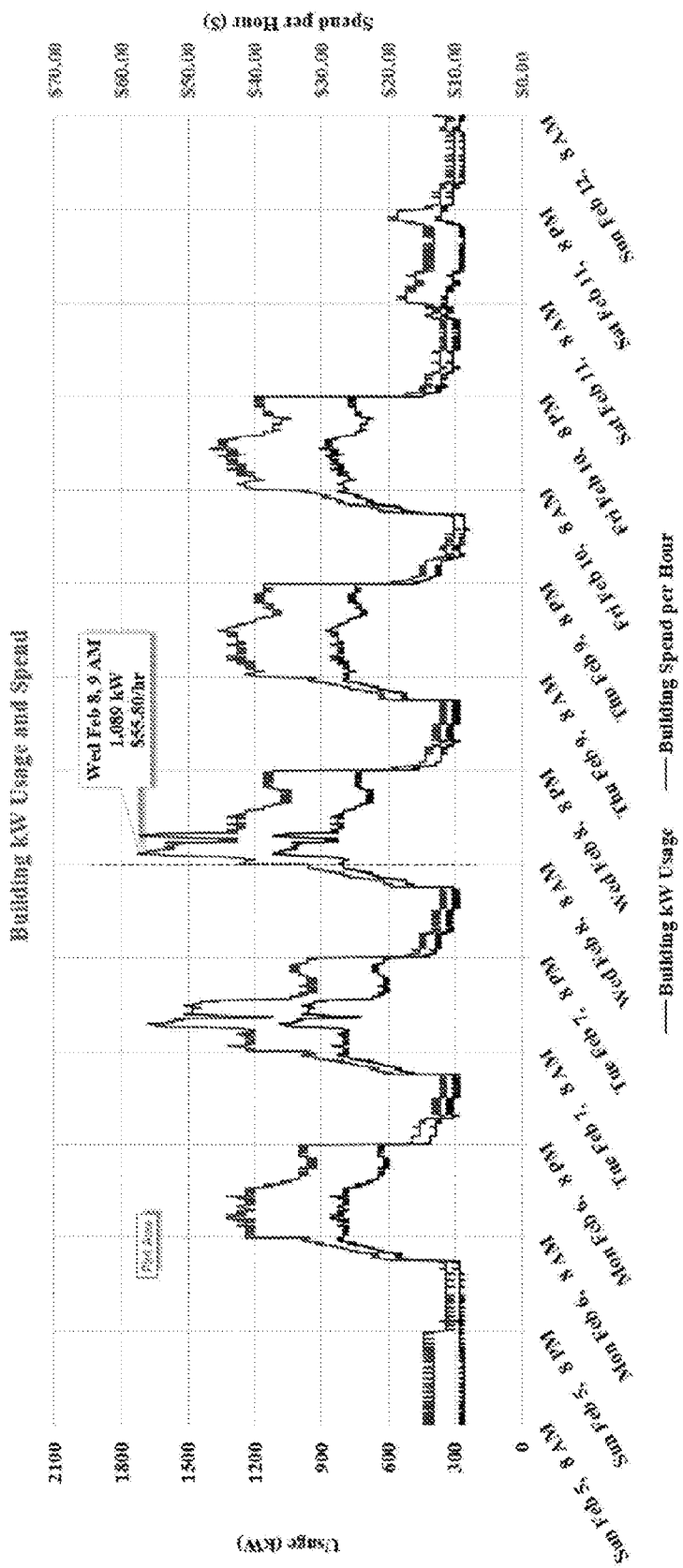
FIG. 15 is one example of a potential visualization presentation of information to a user showing a type of visual display presentation such as for a facility.
Figure 16:
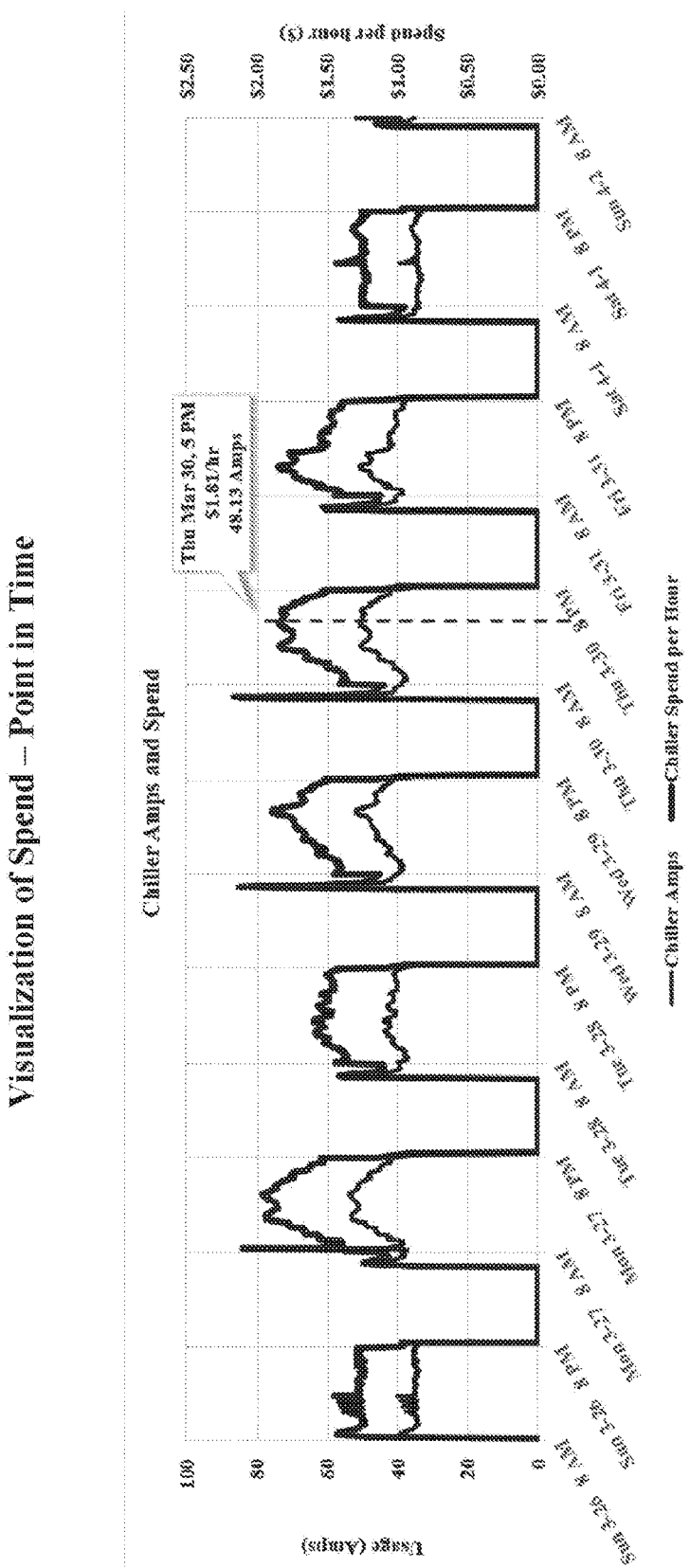
FIG. 16 is another example of a potential visualization presentation of information to a user showing a type of visual display presentation such as for an item of equipment.
Figure 17:
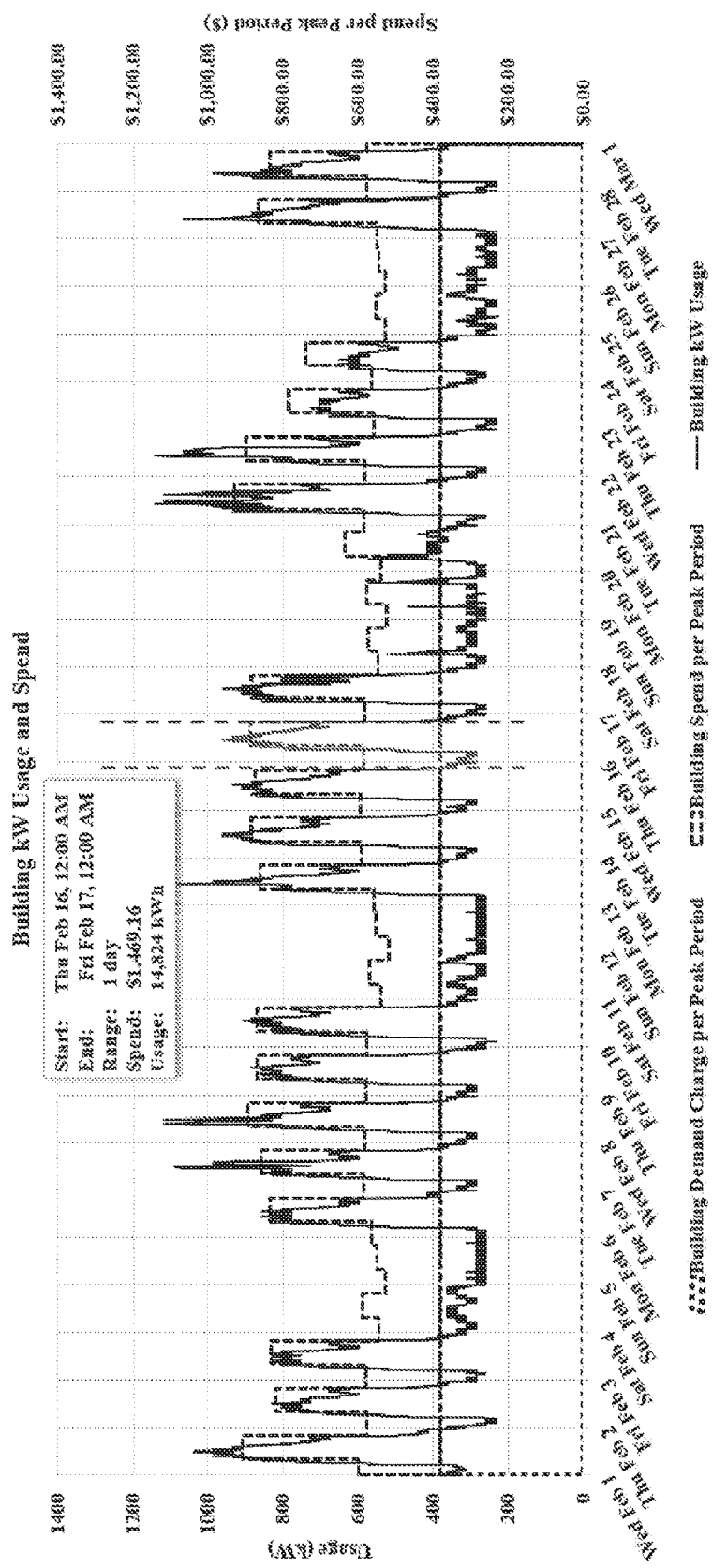
FIG. 17 is another example of a potential visualization presentation of information to a user showing a type of visual display presentation for demand charges, spend, and kilowatt usage.
Figure 18A:
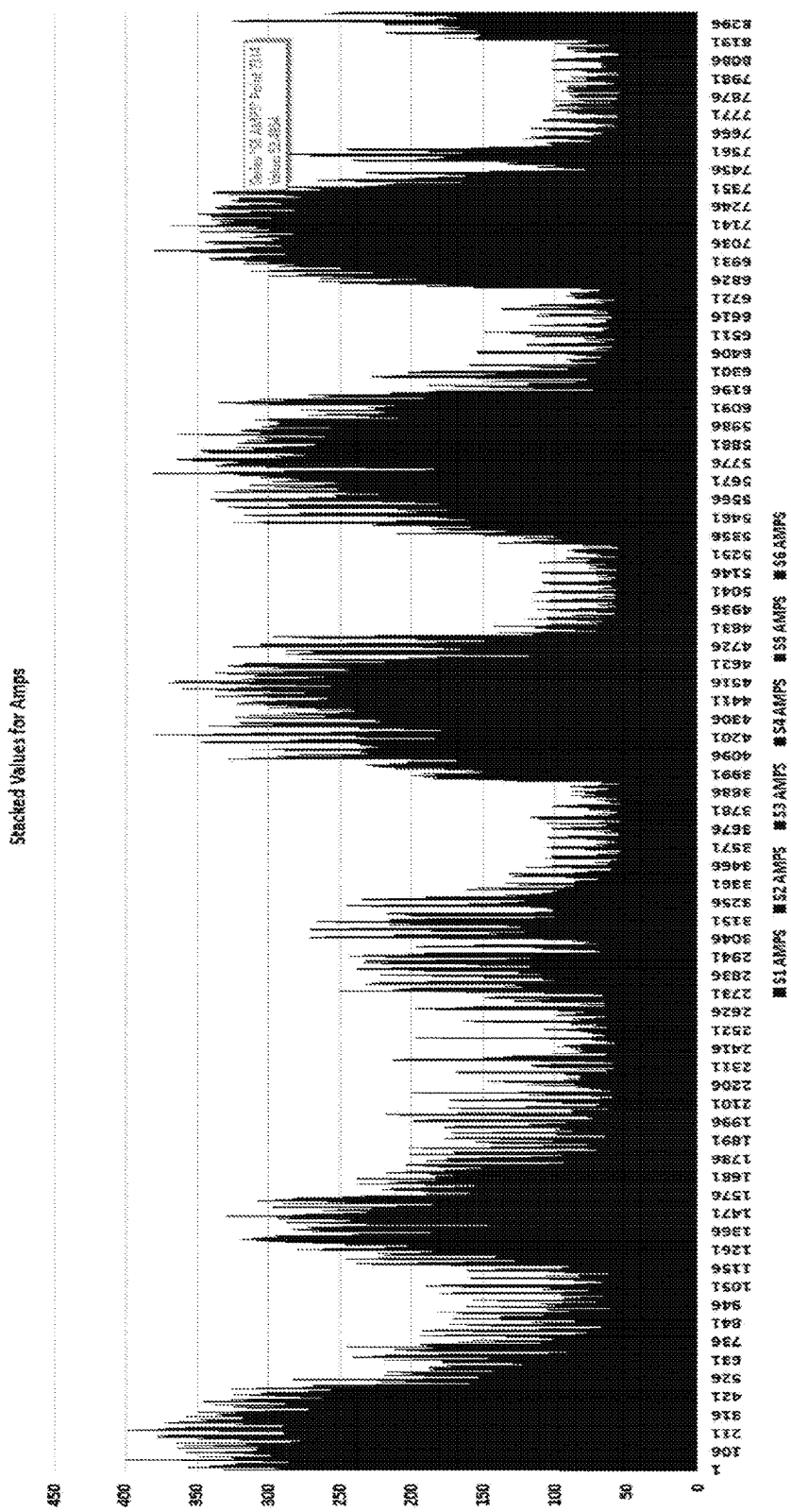

Composite utility cost indications are likely a desired end product, of course, so the system may be configured to use the utility consumption data with the time information for that data together with the rate information to make composite utility cost indications. A process that embodiments can use for this is shown in FIG. 11 together with its sub routines such as that for missing data and for calculating consumption values as explained in FIGS. 12, 13, and 14. As can be appreciated from these, the system can include the composite utility estimated cost generator (9) that provides at least some estimated composite utility cost information in response to the collected utility use information storage such as shown in the local device as item (13) or otherwise. The composite utility estimated cost generator (9) can also use information from the disparate utility rate information data storage, which may also be at either location. With this information, the system may achieve generating at least some estimated composite utility cost indication(s) by applying the disparate utility rate data to at least a portion of the collected composite utility data information. The cost indications generated can be stored such as in a composite utility cost information storage responsive to the composite utility estimated cost generator. Again, this storage can be at either the local device (2), perhaps as part of the local storage (13) or at the central process capability (5), perhaps as part of the server data store (16). When expressed in pure dollars or other monetary currency, the system can be considered as generating at least some estimated current rate of composite economic spend information. For this the system can have a composite utility estimated economic spend generator that provides at least some composite utility economic spend information perhaps in response to the local, on-site collected utility use information storage and the disparate utility rate information data storage. Data for each utility, rather than a composite, can be generated, and for this the system can have an individual utility estimated cost generator so it can generate at least one individual utility economic spend information for the user from the collected composite utility data information.

Embodiments of the system can act to analyze data and can even make comparisons to show or suggest that changes may have occurred in the facility. Thus, embodiments can have an estimated composite utility cost indication change effect indicator. It can automatically calculate an estimated effect of some utility cost information change on said user, and can display the estimated effect of the utility cost information change to the user.

Displaying and presenting information to the user is also a unique aspect. The results of calculations can be presented using a variety of visualizations, filters, and reports from which conclusions can then be made around the efficacy or need for energy and utility consumption improvement decisions. The visualizations can take the form of, but are not limited to, information presented on a static line-graph, a static bar graph, an updating line-graph, an updating bar graph. Visualization can include multiple devices, multiple facilities, multiple sensors, a variety of utility commodity types (e.g. water, gas, and electric in the case of boilers). Visualization can allow the client to select or click on a specific data point for displayed usage and spend information. Visualization can allow the client to select or highlight a time-range for more detail. Visualization can provide a variety of filters and search options (e.g. show me my highest demand peak for the last three months). Similarly, reports can take the form of, but are not limited to, information in tabular form, information in the format of a specific commercial application (Excel, CSV, etc.), or displayed tabular form. Reports may utilize filters and search information as well (e.g. give me a minute view of all of my highest demand peaks for the last three months).

Systems can provide presentations which can help answer those questions indicated above, along with many other questions. Those questions relate to utility spend such as: (1) "How am I doing right now on my utility consumption?"; (2) "Am I doing better or worse than before?"; (3) "How much am I spending on my utility consumption, right now/period-to-date?"; (4) "What do I do if the Utility provides me only with monthly numbers?"; (5) "What do I do if the Utility provides me with incomplete information?"; (6) "Did the improvements I made really help?"; (7) "When was my demand the highest"; (8) "What is each individual pieces of equipment costing me?", (9) "What is going on when I spend the most amount?"; (9) "What caused my demand to be so high"; and many others.

Examples of just some of the potential presentations that can be included are shown in FIGS. 15-18 and 24A-B. As can be appreciated, these show either a visual or tabular composite utility cost display that can be presented to the user as a way of showing an estimated composite utility cost indication. As some show, the user can be presented an estimated current rate of composite cost indication or any number of other types of displays. They can be generated at the time of request using immediate data and so the system can display a visualized current, real-time composite economic cost indication. As many of these representative displays show, the display can be a graphical composite utility cost display. Some of the different types of displays that can be created and presented include but not limited to:

a daily domain based composite cost display, an equipment domain based composite cost display, a total facility domain based composite cost display, a meter domain based composite cost display, an equipment incremental cost domain based composite cost display, and the like. The steps can be similarly varied and can include the steps of: graphically displaying a daily domain based composite cost indication to a user, graphically displaying an equipment domain based composite cost indication to a user, graphically displaying a total facility domain based composite cost indication to a user, graphically displaying a meter domain based composite cost indication to a user, graphically displaying an equipment incremental cost domain based composite cost indication to a user, and the like. The types of composite consumption information conveyed can vary as well, including but not limited to: a current composite rate of consumption cost display, a current composite total consumption cost display, a time range selected composite total consumption cost display, a time-of-use incremental charge indicative composite consumption cost display, an equipment delimited composite cost display, presenting a current composite rate of consumption cost indication for visual display to a user, presenting a current composite total consumption cost indication for visual display to a user, presenting a time range selected composite total consumption cost indication for visual display to a user, presenting a time-of-use incremental charge indicative composite consumption cost indication for visual display to a user, presenting an equipment delimited composite cost indication for visual display to a user, and the like. A tabulated utility cost report can be presented as well and the system can automatically achieve displaying the composite cost indication information to a user in a tabulated report. Tabulated displays can present time domain based composite cost indications, equipment domain based composite cost indications, total facility domain based composite cost indications, meter domain based composite cost indications, equipment incremental cost domain based composite cost indication, and the like. The system can tabularly display each of these to a user. These can be presented at any location or through any device such as at the local device (2), at the central process capability (5), or even elsewhere such as in a portable device or the like.

One aspect that can be desired by users is the aspect of being able to present a user selected range totaled composite utility cost indication such as by embodiments that include a composite utility estimated economic spend generator configured for generating a range totaled composite economic spend indication. The ranges can be set by user input or a selector, and can include preset selectable choices including but not limited to causing generation of cost indications such as by: a current annual rate of composite utility estimated economic spend generator, a current monthly rate of composite utility estimated economic spend generator; a current weekly rate of composite utility estimated economic spend generator; a current daily rate of composite utility estimated economic spend generator; a current hourly rate of composite utility estimated economic spend generator, a current quarter-hour rate of composite utility estimated economic spend generator; a current five-minute rate of composite utility estimated economic spend generator; a current minute-based rate of composite utility estimated economic spend generator; among others.

These can be generated and/or presented not only in real-time, but also using real-time information. As can be appreciated from the flow charts mentioned earlier, the system can act immediately upon a user request to access, and generate the desired information when desired. The ability to provide real-time information—especially for composite information—and to correlate disparate sensor inputs for utility spend for reporting or visualization presentations is significant. This is unlike simply providing predictive analysis, which typically takes the rate information, weather information, and prior utility usage to attempt to predict next month's spend and is different from using a macro (e.g., monthly)/batch analysis model. Instead, embodiments can include a current, real-time composite utility estimated cost generator that provides at least some current, real-time composite utility cost information. By generating in real-time a current, real-time composite cost indication the user can obtain far more meaningful, and actionable, energy management and usage control information. For example, a current rate of composite utility estimated economic spend generator can provide at least some current composite utility economic spend information virtually immediately and even locally by display on any number of devices. To achieve this, the system can even act to correlate the desired information from each of the multiple disparate utility inputs right upon a user analysis request. It can also access and acquire rate information in real-time through a real-time, current utility rate information accessor that can act in response to a user assessment request input. The input or request can act as a disparate utility rate information acquisition trigger that achieves triggering the initiation of the act of acquiring current utility rate information or consumption data or a cost indication calculation involving all, some, or one of the multiple disparate utility inputs.

Figure 19:
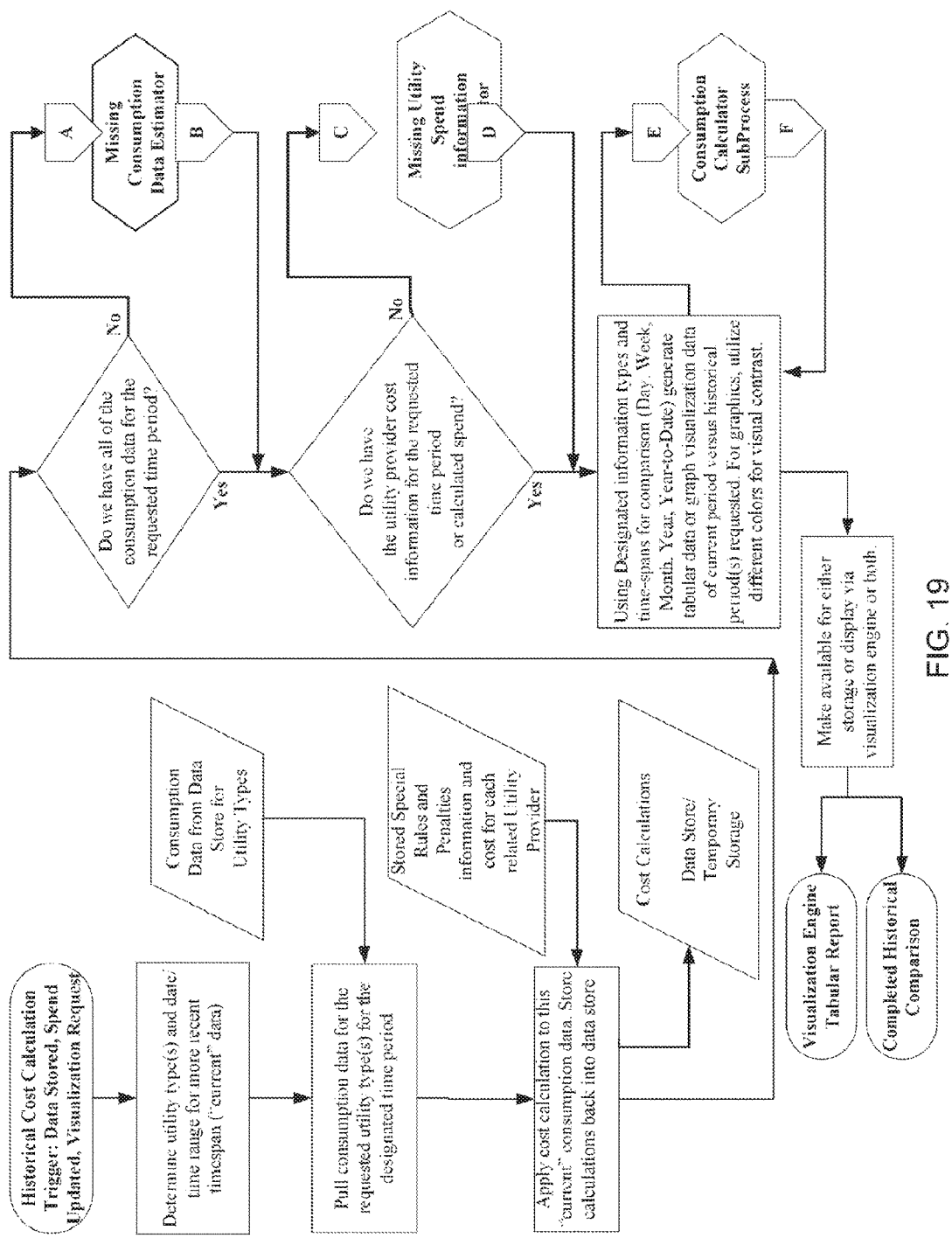
FIG. 19 is a flow chart diagram of a type of comparison analysis of consumption information according to one embodiment of the present invention.

By the systems' ability to store information, it can uniquely achieve comparisons at a composite level or even in real-time that have not been widely available. FIG. 19 and its related subroutines such as shown generally in FIGS. 12-14 (which apply to the FIG. 11 processes as well), is a flow chart diagram of a type of historical calculation of consumption information according to one embodiment of the present invention. Such embodiments can include a historical composite utility cost comparator that uses stored information developed from the step of generating at least some estimated composite utility cost indication (in real-time or previously) to achieve comparing later information developed for a later occurrence with information previously stored from of a prior occurrence of generating some estimated composite utility cost indication(s). The comparison can be requested, triggered, or can occur automatically and can be noted to the user automatically or only if there is a reason to bring it to the user's attention. For example, embodiments can include an abnormal cost occurrence identifier and an abnormal cost occurrence user notification display that can identify a potentially abnormal cost occurrence. By advising the user of the existence of a potentially abnormal cost occurrence, the user can act if appropriate or necessary. Comparison can include calculating or noting the differences or delta amounts calculated by activating a differential utility cost comparator and differentially comparing distinct cost indications for the user. This can be user set such as by a user selectable differential utility cost comparator that utilizes user selected input to achieve a desired differential comparison of distinct cost indications as the user may desire. Embodiments can even automatically recommend comparison bases by a user selection recommendation differential utility cost comparator. This can be particularly useful such as when relating a change of an equipment to some of the estimated composite utility cost indications or comparisons. It can also be useful in retroactively comparing a composite cost indication against a utility supplier bill, such as by inclusion of a retroactive utility supplier bill data comparator.

The ability to make and analyze comparisons in consumption either for real-time information or for composite information opens significant new tools for a user with respect to changes that may have occurred or that were implemented in the facility as shown in FIGS. 20 and 21. For example, FIG. 20 shows total facility composite utility consumption spends for two buildings applying perhaps user set, range. This is, of course, one type of display or presentation that can occur through the system, here shown as a tabular presentation and it calculates and even presents the differences between the buildings. FIGS. 21A-D expand and provide pre- and post-some event or change calculations and comparisons, even with a percentage effect of change calculation displayed for the user to act upon. The system can automatically act to utilize such collected composite utility data information to monitor facilities, a building, or even one specific item of equipment. It can include a collected composite utility data information equipment monitor for a specific item of equipment, a facility change prompt that can inquire of the user if there was some type of change. In one embodiment, this can be accomplished such as by automatically threshold querying a user on facility changes and the threshold can be user set or automatic. It can even allow a user to provide an equipment change indication input to aid in conducting an appropriate analysis or comparison. Allowing a user input can be optional and even prompted.

The analysis of potential or indicated changes can have varying levels of sophistication and embodiments can include a collected composite utility data information multi-regression routine such as responsive to a user equipment change indication input or otherwise to achieve its analysis. It can use this, or other analysis techniques, as a data information equipment monitor to cause an automatic user equipment change query. Through these types of processes systems can automatically determine likely changes in installed equipment or even in equipment performance such as might indicate a malfunction or degradation in efficiency. As one example of a way to do such analysis, embodiments can create two types of template libraries which may be stored in the data store. The first can be an historical series of templates based on a specific building, facility, or piece of equipment that may be actively monitored. The templates created can deal with normal operation, periods of non-operation, startup/power up, shutdown/power off in a variety of weather, temperature, and other external conditions that may be applicable. Additionally, time of day factors and which days equipment is normally used may be addressed. Templates may be annotated by users for normal operation, abnormal operation, startup and shutdown settings, maintenance and upgrade activities which the system may use as a basis to identify issues or lack of improvements. The second set can be an historical series of templates derived from looking at the operation of all similar buildings, facilities, and equipment of the same type or model and storing these along with user annotations to determine normal operation, abnormal operation, and external characteristics that may influence the operation of the equipment.

The system may also check equipment based on a periodic timed event trigger to perform the current equipment data (CRON Job) or a check request may be triggered by a user. Once triggered, the system can build a template of the current building, facility, or equipment data and include all external factors such as weather, temperature, pressures, air flow, etc. Once the current template is built, the system can then compare it against any historic templates, if they exist for this equipment. If they exist (even for other users) and matches are found within reasonable threshold differences, and the templates indicate normal operation, then this can be noted to the user for user triggered requests and discarded for automatic operation. A unique aspect can involve comparisons even among other user's equipment or facilities which can be conducted without revealing identities by merely using analysis akin to MTBF statistical collections of information among a user community. If the templates indicate abnormal operation, then the user may be informed if user generated and if in automatic mode, a notification may be sent by the system to the client and/or their designee via email, or SMS, or other means indicating the abnormality and the building, facility, or equipment in question. If no templates are found that match this current template, then the current template may be stored and a user is notified or requested to annotate the template (or templates) as to their normality of operation or abnormality. Applicable external information can also be stored and the user can indicate whether they believe it to be a factor along with any applicable thresholds.

Once the system has performed a historical check on data received from the building, facility, or equipment, assuming there are templates, it can compare the current template against the non-historic similar equipment templates. If it finds matching templates with similar external conditions which indicate normal operation, it may discard the current template and terminate any further checking. If it finds a matching template indicating an abnormal condition, it may begin the notification process to the user or client. If it doesn't find any matching templates, it may use the current template to create a new one in the non-historic equipment templates and may notify the user that this new template needs to be annotated by the user for normal operation, abnormal operation, and applicable external conditions and thresholds. Once stored, but prior to annotation, the system can complete its analysis of this building, facility, or equipment and continue on to the next, if there is one.

Through these and other processes embodiments can include an individual equipment estimated cost generator that generates individual equipment economic spend information for the user. It can provide a user equipment change indication input such as by allowing optional user input to indicate equipment changes. This can cause a collected composite utility data information equipment monitor to activate or there can be automatic processes for determining likely changes in installed equipment, and even automatic querying of a user to determine likely changes in installed equipment. Changes can include detail of an equipment configuration change by user input, a time of equipment configuration change user input, a type of equipment configuration change user input, or merely allow a user to input simply the existence of an equipment configuration change. As a result, multi-regressing or other analysis of collected composite utility data information can occur. This can even isolate change effects for the user, such as by an estimated composite utility cost indication change effect isolator.

Figure 22:
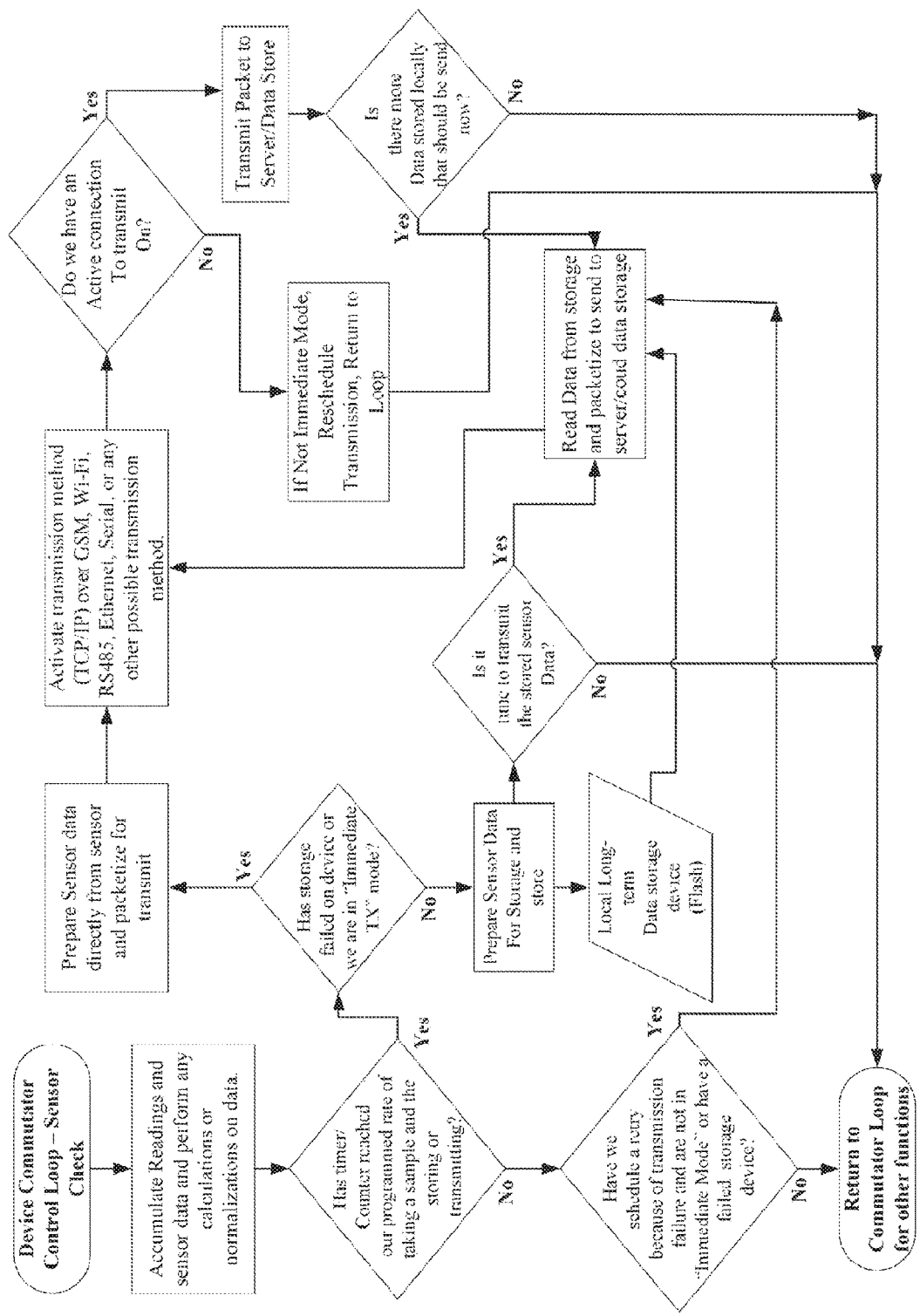
FIG. 22 is a flow chart diagram of a type of data transmission activity according to one embodiment of the present invention.
Figure 24A:
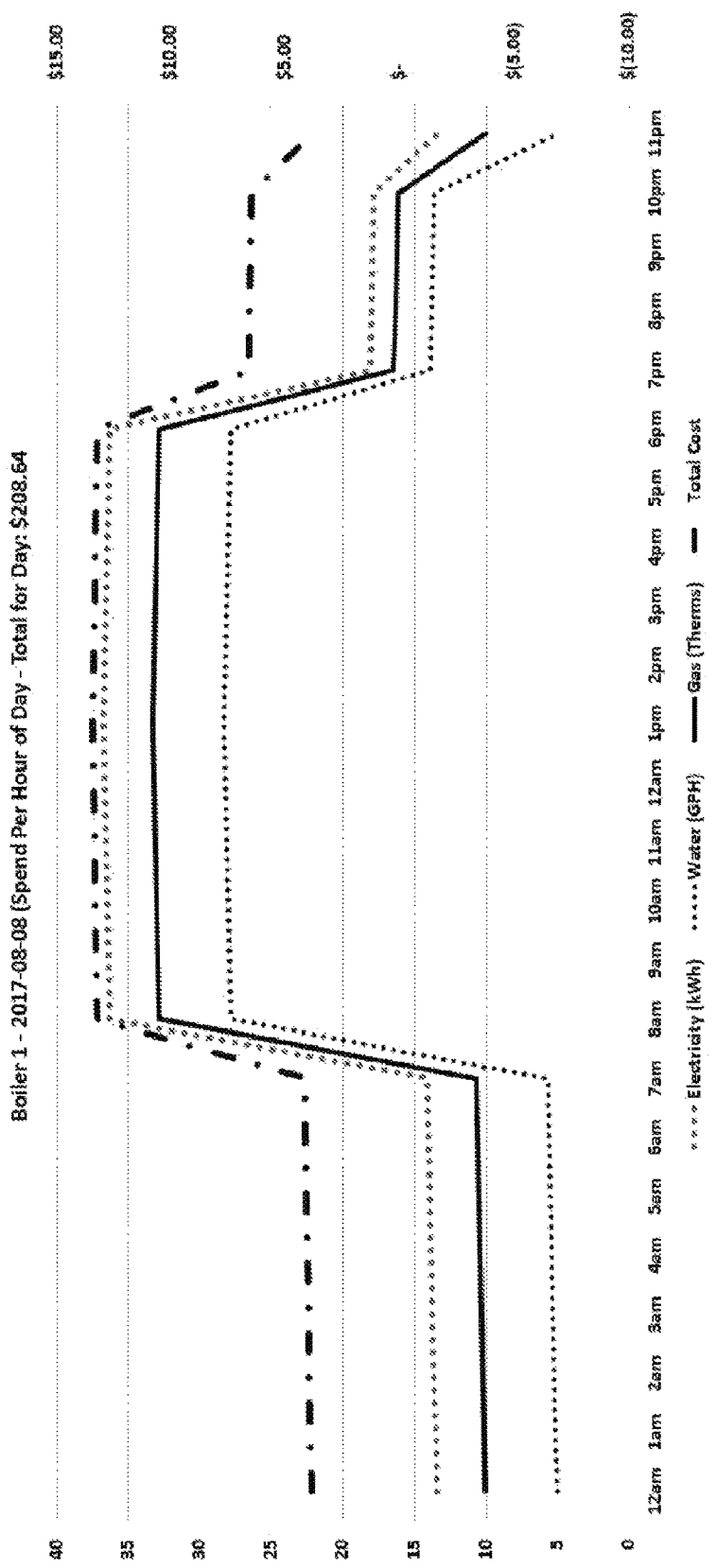

As mentioned above, this can be conducted at or by a local device (2) or at or by a central process capability (5). At the central process capability (5), there can be a central data warehouse (6) where all may be stored. For data transfer and interaction with the local device (2), there can be a collected composite utility data information transmitter such transceiver hardware (19) to which the central data warehouse (6) is responsive. In this manner, there can be an off-site collected composite utility data information processor and even correlator for the information from each of the multiple disparate utility inputs. Transmission of information, a presentation, a user input, or some notification can be in a number of ways, and one embodiment is flow charted in FIG. 22. There may be a collected composite utility data information transmitter that uses a general packet radio service connection, a short message service connection, a cellular telephone connection, a WIFI protected setup service connection, an ethernet connection, or even a wired connection. Decisions on when and how much to send can occur when a system's main commutator loop is running. This can check periodically from a setting if it is time to save accumulated sensor data from its connector sensors. This information may include units and type and time, or it may not. Once the trigger is reached on the update time, such as to the central data storage, the system may check if the on board/local storage is working and if so, may act to store the readings and associated sensor information to a local data storage device or otherwise. If the on-board storage device is not found or is not working or is full, the system may even go into "immediate" transmit mode and trigger transmission to the off-device/off-device data storage (central server/central database). In such an immediate mode, a data packet may be prepared and then a TCP/IP connection can be made to the central server and the packet may be transmitted for storage. The system may then continue on the main commutator loop to perform any additional operations.

If the storage device is working and data was stored, the system can check to see if it is time, via a setting, to transmit any stored data. If triggered, or a time to send threshold is met, the system may establish a TCP/IP connection to the off-device data storage server. If it fails to do this because of connection issues or busy cell towers or the like, it may continue to save the information and reschedule or wait for the next transmit trigger to send the stored data. If a connection was established, then the oldest stored, non-transmitted sensor data can be placed into a packet and sent to the central data store. Once completed, the system may mark the information as sent such that it will not be sent again. Then the system may check to see if there are additional saved sensor readings and if so, may continue the packet generation and transmission until either all of the sensor readings are sent or the connection is lost. In either case, the system might then continue on the main commutator loop to perform any additional operations.

An aspect that can aid the user and even encourage full use of such composite consumption information can be the use of an efficient, standard format type of superset of data created such as shown in FIG. 23. This can exist or data collections can be transformed by some type of composite cost indication or other data transformer perhaps upon data export into an open, standardized data exchange format disparate utility data, common exchange format utility data file, an open, standardized data exchange format disparate utility data, common exchange format utility data file, a comma separated value disparate utility data file, a tab-delimited disparate utility data file, an MS-XLS binary file disparate utility data file, an MS-XLSX binary file disparate utility data file, a delimiter separated disparate utility data file, a tab separated value disparate utility data file, an open standard disparate utility data file, and even any combination of the above or other aspects. Similarly, the data itself can be placed in such files and it can even be normalized, such as in a mathematical sense including but not limited to: multiply (a series, function, or item of data) by a factor that makes the norm or some associated data samples such as an integral equal to a desired unit range or the like, adjusted for more appropriate consumption information, appended to include raw and adjusted consumption information, or merely superset format transformed into a superset format that includes consumption information, consumption units, and time of measurement information. For efficient transmission, there can be a local, on-site data packet generator to locally packetize information from each of the multiple disparate utility inputs for efficient use. Each of these types of data can be consolidated such as by a composite time-correlated data consolidator processor configured to create collected composite utility data information. This can occur as part of efficiently time correlating such information from each of said multiple disparate utility inputs. It can then be compressed, such as by a composite time-correlated data compression processor for transmission.

An aspect that can be very significant is the aspect of providing embodiments of the system that can generate missing information due to the fact that disparate utility information and sensors may be employed.

The composite utility estimated cost generator (9), more general processor (65), collected composite utility data information correlator (11), or other capability at any location can act to estimate consumption information, a cost indication, or otherwise. This can be done by tagging a result for user awareness. Of course, both the composite utility estimated cost generator (9) and processor (65) can be implemented via software, hardware, or even firmware structures as set up for a general purpose computer, a programmed chip or chipset, an ASIC, application specific controller, subroutine, or other known programmable, programmed, or circuit specific structure; it also can be defined by structures such as: hardware circuitry, firmware, programmed application specific components, and even a general purpose computer programmed to accomplish the identified aspect.

Approximating information such as by a data approximation utility estimated cost or data generator. It can accomplish this in a number of ways, such as by using historical information, by applying trend information, and by acting to achieve a common data frequency for the multiple disparate utility inputs. This can occur for differing sensing frequencies or periods and even for missing spots of information such as by a discordantly fragmented information data approximation utility estimated cost generator that can act to correlate discordantly fragmented information from disparate utility inputs. This can generate approximate data to achieve a common data range of information for the multiple disparate utility inputs. Again, this solution to generate data for discordantly fragmented information can be by use of historical information, by trend analysis, by use of external information (e.g., weather information, other user information, etc.), or otherwise. These can be applied to achieve common data ranges for the multiple disparate utility inputs. Upon creation of missing data, the system can provide the user with an estimated data indication display that acts to tag the existence of estimated generated data for user awareness and there can be an estimated data indication display or a data accuracy information display for this purpose. The creation of missing data can be important to allowing a user settable, data collection frequency such as by a selector. In addition, if the user resets or requests a different type of analysis or presentation, the system can even activate a data approximation utility estimated cost re-generator responsive to the user re-settable, data collection frequency selector so to re-generate approximate data to achieve a reset desired data collection frequency or the like. The system can also use existing sensor information to calculate and provide a user accuracy information relative to how the user sets a desired data collection frequency for configured multiple disparate utility inputs. For example, the greater the sensor data collection frequency differs lower than the frequency essentially selected by the user, the anticipated accuracy may decrease, etc.

As mentioned above, in embodiments, a user may be able to enter parameters from a client's bill to see if the system calculates the same fees and total charges as the utility. Whether from manual input or as an automatic process, this can be used as a self-check or calibration for the system. Embodiments can include an automatic composite cost indication self-check comparator to automatically self-check a composite cost indication against an external calculation of cost such as for a similar period. The processor (65) or another capability can serve as an automatic utility supplier data comparator when available. While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions. Examples of alternative claims may include:

1. A system to universally assess composite utility consumption comprising:
   multiple disparate utility sensor data inputs;
   a local, on-site collected utility use information storage responsive to each of said multiple disparate utility sensor data inputs;
   a collected composite utility data information correlator responsive to each of said multiple disparate utility sensor data inputs;
   a multiple access capability, disparate utility rate information accessor that has a plurality of active capabilities, each corresponding to one of said multiple disparate utility sensor data inputs;
   a disparate utility rate information data storage responsive to said multiple access capability, disparate utility rate information accessor;
   a composite utility estimated cost generator that provides at least some composite utility cost indication in response to said local, on-site collected utility use information storage and said disparate utility rate information data storage;
   a composite utility cost indication storage responsive to said composite utility estimated cost generator; and
   a visual composite utility cost display responsive to said composite utility cost indication storage.

2. A system to universally assess composite utility consumption as described in clause 1 or any other clause wherein said composite utility estimated cost generator that provides at least some composite utility cost indication in response to said local, on-site collected utility use information storage and said disparate utility rate information data storage comprises a composite utility estimated economic spend generator that provides at least some composite utility economic spend information in response to said local, on-site collected utility use information storage and said disparate utility rate information data storage.

3. A system to universally assess composite utility consumption as described in clause 2 or any other clause wherein said composite utility estimated economic spend generator comprises a range totaled composite utility estimated economic spend generator.

4. A system to universally assess composite utility consumption as described in clause 2 or any other clause wherein said composite utility estimated economic spend generator that provides at least some composite utility economic spend information in response to said local, on-site collected utility use information storage and said disparate utility rate information data storage comprises a current rate of composite utility estimated economic spend generator that provides at least some current composite utility economic spend information in response to said local, on-site collected utility use information storage and said disparate utility rate information data storage.

5. A system to universally assess composite utility consumption as described in clause 4 or any other clause wherein said composite utility estimated economic spend generator comprises a composite utility estimated economic spend generator selected from a group consisting of:
   a current annual rate of composite utility estimated economic spend generator;
   a current monthly rate of composite utility estimated economic spend generator;
   a current weekly rate of composite utility estimated economic spend generator;
   a current daily rate of composite utility estimated economic spend generator;
   a current hourly rate of composite utility estimated economic spend generator;
   a current quarter-hour rate of composite utility estimated economic spend generator;
   a current five-minute rate of composite utility estimated economic spend generator;
   a current minute-based rate of composite utility estimated economic spend generator; and
   any combination of the above, all without limiting other aspects.

6. A system to universally assess composite utility consumption as described in clause 1 or any other clause wherein said composite utility estimated cost generator that provides at least some composite utility cost indication in response to said local, on-site collected utility use information storage and said disparate utility rate information data storage comprises a current, real-time composite utility estimated cost generator that provides at least some current, real-time composite utility cost indication in response to said local, on-site collected utility use information storage and said disparate utility rate information data storage.

7. A system to universally assess composite utility consumption as described in clause 6 or any other clause and further comprising a disparate utility rate information acquisition trigger to which said multiple access capability, disparate utility rate information accessor is responsive.

8. A system to universally assess composite utility consumption as described in clause 1 or any other clause and further comprising a plurality of system separate, non-intrusive sensors each to which at least one of said multiple disparate utility sensor data inputs is responsive.

9. A system to universally assess composite utility consumption as described in clause 1 or any other clause and further comprising a plurality of utility-provider independent sensors each to which at least one of said multiple disparate utility sensor data inputs is responsive.

10. A system to universally assess composite utility consumption as described in clause 1 or any other clause and further comprising a historical composite utility cost comparator responsive to said composite utility cost indication storage.

11. A system to universally assess composite utility consumption as described in clause 10 or any other clause and further comprising:
    an abnormal cost occurrence identifier; and
    an abnormal cost occurrence user notification display responsive to said abnormal cost occurrence identifier.
12. A system to universally assess composite utility consumption as described in clause 1 or any other clause and further comprising:
    a central data warehouse; and
    a collected composite utility data information transmitter to which said central data warehouse is responsive,
    and wherein said multiple access capability, disparate utility rate information accessor, said disparate utility rate information data storage, and said composite utility estimated cost generator are located at said central data warehouse.
13. A system to universally assess composite utility consumption as described in clause 11 or any other clause wherein said collected composite utility data information collector and transmitter comprises a collected composite utility data information transmitter selected from a group consisting of:
    a general packet radio service connection;
    a short message service connection;
    a cellular telephone connection;
    a Wi-Fi protected setup service connection;
    an ethernet connection;
    a wired connection; and
    any combination of the above, all without limiting other aspects.
14. A system to universally assess composite utility consumption as described in clause 1 or any other clause and further comprising a utility use data importer responsive to off-site utility use information for said user, and wherein said collected composite utility data information correlator comprises a utility data information synchronizer responsive to both said multiple disparate utility sensor data inputs and information resulting from said utility use data importer.
15. A system to universally assess composite utility consumption as described in clause 1 or any other clause wherein said multiple disparate utility sensor data inputs comprise utility sensor data inputs selected from a group consisting of:
    a utility electrical voltage information input;
    a utility electrical current information input;
    an airflow information input;
    a utility gas flow information input;
    a utility water flow information input,
    a fuel consumption information input; and
    any combination of the above, all without limiting other aspects.
16. A system to universally assess composite utility consumption as described in clause 1 or any other clause wherein said multiple disparate utility sensor data inputs comprise:
    a utility electrical voltage information input;
    a utility electrical current information input;
    a utility water flow information input,
    wherein each of said multiple disparate utility sensor data inputs are provided to a unitary collection device,
    and wherein said local, on-site collected utility use information storage and said collected composite utility data information correlator, are contained within said unitary collection device.
17. A system to universally assess composite utility consumption as described in clause 16 or any other clause wherein said multiple disparate utility sensor data inputs further comprises a utility gas flow information input.
18. A system to universally assess composite utility consumption as described in clause 16 or 17 or any other clause and further comprising an airflow information input.
19. A system to universally assess composite utility consumption as described in clause 18 or any other clause and further comprising a fuel consumption information input.
20. A system to universally assess composite utility consumption as described in clause 1 or any other clause wherein said collected composite utility data information correlator responsive to each of said multiple disparate utility sensor data inputs comprises a bijective mapping processor responsive to map information from at least one of said multiple disparate utility sensor data inputs with information onto another of said multiple disparate utility sensor data inputs.
21. A system to universally assess composite utility consumption as described in clause 1 or any other clause wherein said collected composite utility data information correlator responsive to each of said multiple disparate utility sensor data inputs comprises a collected composite utility data information time correlator that correlates information from at least one of said multiple disparate utility sensor data inputs to at least one of the other of said multiple disparate utility sensor data inputs.
22. A system to universally assess composite utility consumption as described in clause 1 or any other clause wherein said collected composite utility data information correlator responsive to each of said multiple disparate utility sensor data inputs comprises a collected composite utility data information data-frequency correlator responsive to each of said multiple disparate utility sensor data inputs.
23. A system to universally assess composite utility consumption as described in clause 1 or any other clause wherein said collected composite utility data information correlator comprises an off-site collected composite utility data information correlator
24. A system to universally assess composite utility consumption as described in clause 21 or any other clause wherein said collected composite utility data information correlator comprises an on-site collected composite utility data information correlator.
25. A system to universally assess composite utility consumption as described in clause 21 or any other clause wherein said on-site collected composite utility data information correlator comprises an information transformer selected from a group consisting of:
    amperage sensor information to selected common utility data information transformer;
    KYZ pulse information to selected common utility data information transformer;
    an energy management system information to selected common utility data information transformer;
    an infrared detection sensor information to selected common utility data information transformer;
    a near-field communication utility data to selected common utility data information transformer;
    an externally-sourced third-party sensor or meter information to selected common utility data information transformer; and
    any combination of the above, all without limiting other aspects.
26. A system to universally assess composite utility consumption as described in clause 25 or any other clause wherein said transformer comprises a superset format transformer output that includes consumption information, consumption units, and time of measurement information.
27. A system to universally assess composite utility consumption as described in clause 26 or any other clause wherein said superset format transformer output also includes adjusted consumption information.
28. A system to universally assess composite utility consumption as described in clause 26 or any other clause wherein said superset format transformer output also includes raw and adjusted consumption information.
29. A system to universally assess composite utility consumption as described in clause 21 or any other clause wherein said collected composite utility data information time correlator comprises an externally-sourced information and on-site sensed information combiner.
30. A system to universally assess composite utility consumption as described in clause 1 or any other clause wherein said a visual composite utility cost display responsive to said composite utility cost indication storage comprises a graphical composite utility cost display responsive to said composite utility cost indication storage.
31. A system to universally assess composite utility consumption as described in clause 30 or any other clause wherein said visual composite utility cost display comprises a visual composite utility cost display selected from a group consisting of:
a daily domain based composite cost display;
an equipment domain based composite cost display;
a total facility domain based composite cost display;
a meter domain based composite cost display;
an equipment incremental cost domain based composite cost display; and
any combination of the above, all without limiting other aspects.
32. A system to universally assess composite utility consumption as described in clause 1 or any other clause wherein said visual composite utility cost display comprises a visual composite utility cost display selected from a group consisting of:
a current composite rate of consumption cost display;
a current composite total consumption cost display;
a time range selected composite total consumption cost display;
a time-of-use incremental charge indicative composite consumption cost display;
an equipment delimited composite cost display; and
any combination of the above, all without limiting other aspects.
33. A system to universally assess composite utility consumption as described in clause 1 or any other clause and further comprising a differential utility cost comparator to which said visual composite utility cost display is responsive.
34. A system to universally assess composite utility consumption as described in clause 33 or any other clause wherein said differential utility cost comparator comprises a user selectable differential utility cost comparator.
35. A system to universally assess composite utility consumption as described in clause 34 or any other clause wherein said user selectable differential utility cost comparator comprises a user selection recommendation differential utility cost comparator.
36. A system to universally assess composite utility consumption as described in clause 33 or any other clause and further comprising a facility change prompt responsive to said differential utility cost comparator.
37. A system to universally assess composite utility consumption as described in clause 1 or any other clause and further comprising a tabulated utility cost report display responsive to said composite utility cost indication storage.
38. A system to universally assess composite utility consumption as described in clause 37 or any other clause wherein said tabulated utility cost report display comprises a tabulated utility cost report display selected from a group consisting of:
a time domain based composite cost indication tabulated utility cost report display;
an equipment domain based composite cost indication tabulated utility cost report display;
a total facility domain based composite cost indication tabulated utility cost report display;
a meter domain based composite cost indication tabulated utility cost report display;
an equipment incremental cost domain based composite cost indication tabulated utility cost report display; and
any combination of the above, all without limiting other aspects.
39. A system to universally assess composite utility consumption as described in clause 1 or any other clause and further comprising a local, on-site data packet generator responsive to said local, on-site collected utility use information storage.
40. A system to universally assess composite utility consumption as described in clause 39 or any other clause wherein said local, on-site data packet generator comprises a composite time-correlated data consolidator processor configured to create collected composite utility data information.
41. A system to universally assess composite utility consumption as described in clause 40 or any other clause wherein said composite time-correlated data consolidator processor comprises a composite time-correlated data compression processor.
42. A system to universally assess composite utility consumption as described in clause 1 or any other clause and further comprising a plurality of fundamentally different utility type sensors each to which at least one of said multiple disparate utility sensor data inputs is responsive.
43. A system to universally assess composite utility consumption as described in clause 42 or any other clause wherein said collected composite utility data information correlator comprises a different data frequency input utility data information correlator, and wherein said composite utility estimated cost generator comprises a data approximation utility estimated cost generator.
44. A system to universally assess composite utility consumption as described in clause 43 or any other clause wherein said data approximation utility estimated cost generator comprises a data approximation utility estimated cost generator selected from a group consisting of:
data trend approximation utility estimated cost generator;
historical information approximation utility estimated cost generator;
any combination of the above, all without limiting other aspects.
45. A system to universally assess composite utility consumption as described in clause 1 or any other clause and further comprising a user viewable utility rate information display for at least one of said multiple disparate utility sensor data inputs.

46. A system to universally assess composite utility consumption as described in clause 42 or any other clause wherein said composite utility estimated cost generator comprises a discordantly fragmented information data approximation utility estimated cost generator.
47. A system to universally assess composite utility consumption as described in clause 46 wherein said discordantly fragmented information data approximation utility estimated cost generator comprises a discordantly fragmented information data approximation utility estimated cost generator selected from a group consisting of:
 data trend discordantly fragmented information data approximation utility estimated cost generator;
 historical information discordantly fragmented information data approximation utility estimated cost generator;
 any combination of the above, all without limiting other aspects.
48. A system to universally assess composite utility consumption as described in clause 43 or any other clause and further comprising an estimated data indication display responsive to said data approximation utility estimated cost generator.
49. A system to universally assess composite utility consumption as described in clause 46 and further comprising an estimated data indication display responsive to said discordantly fragmented information data approximation utility estimated cost generator.
50. A system to universally assess composite utility consumption as described in clause 1 or any other clause wherein said multiple access capability, disparate utility rate information accessor comprises an automatic externally-sourced full-factored utility rate information accessor.
51. A system to universally assess composite utility consumption as described in clause 1 or clause 50 or any other clause wherein said multiple access capability, disparate utility rate information accessor comprises a real-time, current utility rate information accessor.
52. A system to universally assess composite utility consumption as described in clause 51 and further comprising a user assessment request input, and wherein said real-time, current utility rate information accessor is responsive to said user assessment request input in real-time.
53. A system to universally assess composite utility consumption as described in clause 1 or any other clause wherein said multiple access capability, disparate utility rate information accessor comprises a low activity utility rate information accessor.
54. A system to universally assess composite utility consumption as described in clause 1 or any other clause wherein said multiple access capability, disparate utility rate information accessor comprises a manual user input from which utility rate information for at least one utility can be determined.
55. A system to universally assess composite utility consumption as described in clause 1 or any other clause wherein said multiple access capability, disparate utility rate information accessor that has a plurality of active capabilities, each corresponding to one of said multiple disparate utility sensor data inputs comprises at least one time-of-use utility rate information accessor corresponding to at least one of said multiple disparate utility inputs.
56. A system to universally assess composite utility consumption as described in clause 50 or any other clause wherein said automatic externally-sourced full-factored utility rate information accessor comprises an automatic externally-sourced full-factored utility rate information accessor selected from a group consisting of:
 peak usage utility rate information accessor;
 off-peak usage utility rate information accessor;
 demand peak utility rate information accessor;
 time-of-use utility rate information accessor;
 fuel charge utility rate information accessor;
 rider utility rate information accessor;
 reactive power charge utility rate information accessor;
 carbon related charge utility rate information accessor;
 governmental surcharge utility rate information accessor;
 renewable energy credit utility rate information accessor;
 electric franchise fee credit utility rate information accessor renewable energy rider utility rate information accessor;
 cost-effective energy saving credit utility rate information accessor;
 penalty utility rate information accessor;
 supplier charge utility rate information accessor; and
 any combination of the above, all without limiting other aspects.
57. A system to universally assess composite utility consumption as described in clause 50 or any other clause and further comprising:
 current user utility demand value calculator; and
 demand peak rate applicator to which said composite utility estimated cost generator is responsive when a demand peak rate is applicable and responsive to said current user utility demand value calculator.
58. A system to universally assess composite utility consumption as described in clause 1 or any other clause and further comprising a user settable, data collection frequency selector to which said composite utility estimated cost generator is responsive.
59. A system to universally assess composite utility consumption as described in clause 58 or any other clause and further comprising a data accuracy information display responsive to said user settable, data collection frequency selector.
60. A system to universally assess composite utility consumption as described in clause 58 or any other clause and further comprising a data approximation utility estimated cost generator responsive to said user settable, data collection frequency selector.
61. A system to universally assess composite utility consumption as described in clause 60 or any other clause wherein said user settable, data collection frequency selector to which said composite utility estimated cost generator is responsive comprises a user re-settable, data collection frequency selector, and wherein said data approximation utility estimated cost generator comprises a data approximation utility estimated cost re-generator responsive to said user re-settable, data collection frequency selector.
62. A system to universally assess composite utility consumption as described in clause 1 or any other clause and further comprising a collected composite utility data information filter to which said composite utility estimated cost generator is responsive.
63. A system to universally assess composite utility consumption as described in clause 62 or any other clause wherein said collected composite utility data information filter comprises a collected composite utility data information filter selected from a group consisting of:
 a single point in time collected composite utility data information filter;

a time range collected composite utility data information filter; and any combination of the above, all without limiting other aspects.

64. A system to universally assess composite utility consumption as described in clause 1 or any other clause and further comprising a collected composite utility data information equipment monitor for at least one specific item of equipment.

65. A system to universally assess composite utility consumption as described in clause 64 or any other clause and further comprising a user equipment change indication input.

66. A system to universally assess composite utility consumption as described in clause 65 or any other clause and further comprising a collected composite utility data information multi-regression routine responsive to said user equipment change indication input.

67. A system to universally assess composite utility consumption as described in clause 64 or any other clause and further comprising an automatic user equipment change query responsive to said collected composite utility data information equipment monitor.

68. A system to universally assess composite utility consumption as described in clause 2 or any other clause wherein said composite utility estimated economic spend generator comprises an individual equipment estimated cost generator.

69. A system to universally assess composite utility consumption as described in clause 2 or any other clause wherein said composite utility estimated economic spend generator comprises an individual utility estimated cost generator.

70. A system to universally assess composite utility consumption as described in clause 1 or any other clause and further comprising a user equipment change indication input.

71. A system to universally assess composite utility consumption as described in clause 1 or clause 70 or any other clause and further comprising:
    a collected composite utility data information equipment monitor; and
    an automatic user equipment change query responsive to said collected composite utility data information equipment monitor.

72. A system to universally assess composite utility consumption as described in clause 70 or any other clause wherein said user equipment change indication input comprises a user equipment change indication input selected from a group consisting of:
    a mere existence of equipment change user input;
    a detail of equipment configuration change user input;
    a time of equipment configuration change user input;
    a type of equipment configuration change user input; and
    any combination of the above, all without limiting other aspects.

73. A system to universally assess composite utility consumption as described in clause 1 or any other clause and further comprising:
    a collected composite utility data information multi-regression routine; and
    an estimated composite utility cost indication change effect isolator responsive to said collected composite utility data information multi-regression routine.

74. A system to universally assess composite utility consumption as described in clause 1 or any other clause and further comprising an automatic composite cost indication self-check comparator responsive to at least some external information.

75. A system to universally assess composite utility consumption as described in clause 74 or any other clause wherein said automatic composite cost indication self-check comparator comprises an automatic utility supplier data comparator.

76. A system to universally assess composite utility consumption as described in clause 75 or any other clause wherein said automatic utility supplier data comparator comprises a retroactive utility supplier bill data comparator.

77. A system to universally assess composite utility consumption as described in clause 1 or any other clause and further comprising:
    a composite cost indication transformer that creates an open, standardized data exchange format disparate utility data, common exchange format utility data file; and
    a data export capable of transmitting said open, standardized data exchange format disparate utility data, common exchange format utility data file.

78. A system to universally assess composite utility consumption as described in clause 77 or any other clause wherein said composite cost indication transformer comprises a composite cost indication transformer selected from a group consisting of:
    a comma separated value disparate utility data file composite cost indication transformer;
    a tab-delimited disparate utility data file composite cost indication transformer;
    an MS-XLS binary file disparate utility data file composite cost indication transformer;
    an MS-XLSX binary file disparate utility data file composite cost indication transformer;
    a delimiter separated disparate utility data file composite cost indication transformer;
    a tab separated value disparate utility data file composite cost indication transformer;
    an open standard disparate utility data file composite cost indication transformer; and
    any combination of the above, all without limiting other aspects.

79. A system to universally assess composite utility consumption as described in clause 1 or any other clause and further comprising an automatic utility rate information locator to which said multiple access capability, disparate utility rate information accessor is responsive.

80. A system to universally assess composite utility consumption as described in clause 1 or any other clause and further comprising an automatic utility rate information rate information updater to which said composite utility estimated cost generator is responsive.

81. A system to universally assess composite utility consumption as described in clause 80 or any other clause and further comprising an estimated composite utility cost indication change effect indicator responsive to said automatic utility rate information rate information updater.

82. A system to universally assess composite utility consumption comprising:
    multiple disparate utility sensor data inputs;
    a plurality of utility-provider independent sensors each to which at least one of said multiple disparate utility sensor data inputs is responsive;
    a local, on-site collected utility use information storage responsive to each of said multiple disparate utility sensor data inputs;

a collected composite utility data information time correlator that correlates information from at least one of said multiple disparate utility sensor data inputs to at least one of the other of said multiple disparate utility sensor data inputs;

a collected composite utility data information data-frequency correlator responsive to each of said multiple disparate utility sensor data inputs;

a data approximation utility estimated cost generator responsive to said collected composite utility data information data-frequency correlator;

a superset format transformer with an output that includes consumption information, consumption units, and time of measurement information, and wherein said superset format transformer is responsive to said local, on-site collected utility use information storage;

a composite utility cost indication storage responsive to said superset format transformer;

an automatic utility rate information locator;

a multiple access capability, disparate utility rate information accessor that has a plurality of active capabilities, each corresponding to one of said multiple disparate utility sensor data inputs and that is responsive to said automatic utility rate information locator;

a disparate utility rate information data storage responsive to said multiple access capability, disparate utility rate information accessor;

a user settable, data collection frequency selector;

current rate of composite utility estimated economic spend generator that provides at least some current composite utility economic spend information in response to said local, on-site collected utility use information storage and said disparate utility rate information data storage and that is responsive to said a user settable, data collection frequency selector;

a visual composite utility cost display responsive to said composite utility cost indication storage; and an historical composite utility cost comparator responsive to said composite utility cost indication storage.

wherein said multiple disparate utility sensor data inputs comprise inputs selected from a group comprising:
a utility electrical voltage information input;
a utility electrical current information input;
a utility water flow information input;
a utility gas flow information input; and
any combination of the above, al without limiting other aspects, and wherein each of said multiple disparate utility sensor data inputs are provided to a unitary collection device.

83. A system to universally assess composite utility consumption as described in clause 82 or any other clause and further comprising:
an abnormal cost occurrence identifier; and
an abnormal cost occurrence user notification display responsive to said abnormal cost occurrence identifier.

84. A system to universally assess composite utility consumption as described in clause 82 and further comprising a discordantly fragmented information data approximation utility estimated cost generator selected from a group consisting of:
data trend approximation utility estimated cost generator;
historical information approximation utility estimated cost generator;
any combination of the above, all without limiting other aspects, and further comprising an estimated data indication display responsive to said discordantly fragmented information data approximation utility estimated cost generator.

85. A system to universally assess composite utility consumption as described in clause 82 or any other clause wherein said multiple access capability, disparate utility rate information accessor comprises a low activity utility rate information accessor.

86. A system to universally assess composite utility consumption as described in clause 82 or any other clause and further comprising an automatic user equipment change query responsive to said collected composite utility data information equipment monitor.

87. A system to universally assess composite utility consumption as described in clause 82 or any other clause and further comprising a retroactive utility supplier bill data comparator.

88. A method of universally assessing composite utility consumption comprising the steps of:
acquiring sensor data for multiple disparate utility inputs;
on-site locally collecting information from each of said multiple disparate utility inputs;
correlating the information from each of said multiple disparate utility inputs to achieve collected composite utility data information;
acquiring disparate utility rate information corresponding to each of said multiple disparate utility inputs to achieve disparate utility rate data;
applying said disparate utility rate data to at least a portion of said collected composite utility data information;
generating at least some estimated composite utility cost indication from said step of applying said disparate utility rate data to at least a portion of said collected composite utility data information; and
presenting said estimated composite utility cost indication for visual display to a user.

89. A method of universally assessing composite utility consumption as described in clause 88 or any other clause wherein said step of generating at least some estimated composite utility cost indication from said step of applying said disparate utility rate data to at least a portion of said collected composite utility data information comprises the step of generating economic spend information for said user from said step of applying said disparate utility rate data to at least a portion of said collected composite utility data information.

90. A method of universally assessing composite utility consumption as described in clause 89 or any other clause wherein said step of generating economic spend information for said user comprises the step of generating a range totaled composite economic spend indication for said user.

91. A method of universally assessing composite utility consumption as described in clause 89 or any other clause wherein said step of generating economic spend information for said user comprises the step of generating a current rate of composite economic spend indication for said user.

92. A method of universally assessing composite utility consumption as described in clause 91 or any other clause wherein said step of generating a current rate of composite economic spend indication for said user comprises a step selected from a group consisting of:
generating a current annual rate of composite economic spend indication for said user;
generating a current monthly rate of composite economic spend indication for said user;

generating a current weekly rate of composite economic spend indication for said user;
generating a current daily rate of composite economic spend indication for said user;
generating a current hourly rate of composite economic spend indication for said user;
generating a current quarter-hour rate of composite economic spend indication for said user;
generating a current five-minute rate of composite economic spend indication for said user;
generating a current minute-based rate of composite economic spend indication for said user; and
any combination of the above, all without limiting other aspects.

93. A method of universally assessing composite utility consumption as described in clause 88 or any other clause wherein said step of generating comprises the step of generating in real-time a current, real-time composite cost indication from a step of applying said multifactored disparate utility rate data to a current collected composite utility data information, and further comprising the step of displaying a visualized current, real-time composite economic cost indication to said user.

94. A method of universally assessing composite utility consumption as described in clause 93 or any other clause and further comprising the step of triggering initiation of the act of acquiring current utility rate information corresponding to each of said multiple disparate utility inputs.

95. A method of universally assessing composite utility consumption as described in clause 88 or any other clause wherein said step of acquiring sensor data for multiple disparate utility inputs comprises the step of system separately and sensing each of said multiple disparate utility inputs.

96. A method of universally assessing composite utility consumption as described in 88 or any other clause wherein said step of acquiring sensor data for multiple disparate utility inputs comprises utility-provider-independent sensing at least one of said multiple disparate utility inputs.

97. A method of universally assessing composite utility consumption as described in clause 88 or any other clause and further comprising the step of storing at least some of said disparate utility rate information for later use.

98. A method of universally assessing composite utility consumption as described in 88 or any other clause and further comprising the steps of:
storing information developed from said step of generating at least some estimated composite utility cost indication; and
comparing later information developed for a later occurrence of said step of generating at least some estimated composite utility cost indication with information previously stored from of a prior occurrence of said step of generating at least some estimated composite utility cost indication.

99. A method of universally assessing composite utility consumption as described in 98 or any other clause and further comprising the steps of:
identifying a potentially abnormal cost occurrence; and
advising said user of the existence of said abnormal cost occurrence.

100. A method of universally assessing composite utility consumption as described in clause 88 or any other clause wherein said step of acquiring sensor data for multiple disparate utility inputs comprises the steps of:
on-site sensing at least one utility input to create a separately sensed utility input data information;
importing from off-site at least one utility input to create an imported utility input data information; and
synchronizing said separately sensed utility input data information with said imported utility input data information to create said collected composite utility data information.

101. A method of universally assessing composite utility consumption as described in clause 88 or any other clause wherein said step of acquiring sensor data for multiple disparate utility inputs comprises a step selected from a group consisting of:
obtaining electrical voltage information from a utility input;
obtaining electrical current information from a utility input;
obtaining device airflow inputs from a device input;
obtaining gas flow information from a utility input;
obtaining water flow information from a utility input;
obtaining fuel consumption information from a utility input; and
any combination of the above, all without limiting other aspects.

102. A method of universally assessing composite utility consumption as described in clause 88 or any other clause wherein said step of acquiring sensor data for multiple disparate utility inputs comprises the steps of:
obtaining electrical voltage information from a utility input;
obtaining electrical current information from a utility input; and
obtaining water flow information from a utility input,
wherein said step of on-site locally collecting information from each of said multiple disparate utility inputs comprises the step of providing each of said multiple disparate utility inputs to a unitary collection device,
and wherein said step of correlating the information from each of said multiple disparate utility inputs to achieve collected composite utility data information occurs automatically within said unitary collection device.

103. A method of universally assessing composite utility consumption as described in clause 102 or any other clause wherein said step of acquiring sensor data for multiple disparate utility inputs further comprises the step of obtaining gas flow information from a utility input.

104. A method of universally assessing composite utility consumption as described in clause 102 or clause 103 or any other clause wherein said step of acquiring sensor data for multiple disparate utility inputs further comprises the step of obtaining airflow information at a device input.

105. A method of universally assessing composite utility consumption as described in clause 104 or any other clause wherein said step of acquiring sensor data for multiple disparate utility inputs further comprises the step of obtaining fuel consumption information from a utility input.

106. A method of universally assessing composite utility consumption as described clause 88 or any other clause wherein said step of correlating the information from each of said multiple disparate utility inputs to achieve collected composite utility data information comprises the step of bijectively mapping the information from at least one of said multiple disparate utility inputs onto at least another of said multiple disparate utility inputs to create at least some collected time-correlated composite utility data information.

107. A method of universally assessing composite utility consumption as described in clause 88 or any other clause wherein said step of correlating the information from each of said multiple disparate utility inputs to achieve collected composite utility data information comprises the step of time correlating the information from at least one of said multiple disparate utility inputs to at least another of said multiple disparate utility inputs to create at least some collected time-correlated composite utility data information.

108. A method of universally assessing composite utility consumption as described in clause 88 or any other clause wherein said step of correlating comprises data-frequency correlating the information from each of said multiple disparate utility inputs to achieve a collected data frequency-correlated composite utility data information.

109. A method of universally assessing composite utility consumption as described in clause 107 or any other clause wherein said step of correlating comprises off-site correlating the information from each of said multiple disparate utility inputs to achieve said collected correlated composite utility data information.

110. A method of universally assessing composite utility consumption as described in clause 107 or any other clause wherein said step of correlating comprises on-site correlating the information from each of said multiple disparate utility inputs to achieve said collected correlated composite utility data information through a local device.

111. A method of universally assessing composite utility consumption as described in clause 110 or any other clause wherein said step of on-site locally collecting information from each of said multiple disparate utility inputs comprises creating a single, collected, time-correlated composite utility data information through said local device.

112. A method of universally assessing composite utility consumption as described in clause 111 or any other clause wherein said step of correlating the information from each of said multiple disparate utility inputs to achieve said collected correlated composite utility data information comprises a step selected from a group consisting of:
 transforming information from a current transformer based amperage sensor to a selected common utility data information format;
 transforming information from a KYZ pulse interface to a selected common utility data information format;
 transforming information from an energy management system to a selected common utility data information format;
 transforming information from an infrared detection sensor placed on a utility meter to a selected common utility data information format;
 transforming information from a near-field communication of utility data to a selected common utility data information format;
 transforming information from an externally-sourced third-party sensor or meter to a selected common utility data information format; and
 any combination of the above, all without limiting other aspects,
each to achieve a collected correlated composite utility data information.

113. A method of universally assessing composite utility consumption as described in clause 112 or any other clause wherein said step of transforming comprises the step of transforming information from each of said multiple disparate utility inputs to normalized utility data into a superset format that includes consumption information, consumption units, and time of measurement information.

114. A method of universally assessing composite utility consumption as described in clause 113 or any other clause wherein said step of transforming information from each of said multiple disparate utility inputs to normalized utility data into a superset format includes the step of transforming into a superset format that also includes adjusted consumption information values.

115. A method of universally assessing composite utility consumption as described in clause 113 or any other clause wherein said step of transforming information from each of said multiple disparate utility inputs to normalized utility data into a superset format includes the step of transforming into a superset format that also includes raw and adjusted consumption information values.

116. A method of universally assessing composite utility consumption as described in clause 107 or any other clause wherein said step of correlating information from each of said multiple disparate utility inputs to achieve a collected composite utility data information comprises the step of combining externally-sourced information with on-site sensed information.

117. A method of universally assessing composite utility consumption as described in clause 107 or any other clause wherein said step of correlating the information from each of said multiple disparate utility inputs to achieve a collected composite utility data information comprises correlating said information from each of said multiple disparate utility inputs to achieve a collected composite utility data information upon user analysis request.

118. A method of universally assessing composite utility consumption as described in clause 107 or any other clause wherein said step of correlating the information from each of said multiple disparate utility inputs to achieve a collected composite utility data information comprises correlating said information from each of said multiple disparate utility inputs to achieve a collected composite utility data information upon data storage.

119. A method of universally assessing composite utility consumption as described in clause 88 or any other clause and further comprising the step of graphically displaying said composite cost indication information to a user.

120. A method of universally assessing composite utility consumption as described in clause 119 or any other clause wherein said step of graphically displaying said composite cost indication information to a user comprises a step selected from a group consisting of:
 graphically displaying a daily domain based composite cost indication to a user;
 graphically displaying an equipment domain based composite cost indication to a user;
 graphically displaying a total facility domain based composite cost indication to a user;
 graphically displaying a meter domain based composite cost indication to a user;
 graphically displaying an equipment incremental cost domain based composite cost indication to a user; and
 any combination of the above, all without limiting other aspects.

121. A method of universally assessing composite utility consumption as described in clause 88 or any other clause wherein said step of presenting said composite cost indication information for visual display to a user comprises a step selected from a group consisting of:

presenting a current composite rate of consumption cost indication for visual display to a user;
presenting a current composite total consumption cost indication for visual display to a user;
presenting a time range selected composite total consumption cost indication for visual display to a user;
presenting a time-of-use incremental charge indicative composite consumption cost indication for visual display to a user;
presenting an equipment delimited composite cost indication for visual display to a user; and
any combination of the above, all without limiting other aspects.

122. A method of universally assessing composite utility consumption as described in clause 88 or any other clause and further comprising differentially comparing distinct cost indications for said user.

123. A method of universally assessing composite utility consumption as described in clause 122 or any other clause wherein said step of differentially comparing distinct cost indications for said user comprises utilizing user selected input to achieve said step of differentially comparing distinct cost indications for said user.

124. A method of universally assessing composite utility consumption as described in clause 123 or any other clause wherein said step of differentially comparing distinct cost indications for said user comprises automatically recommending comparison bases to achieve said step of differentially comparing distinct cost indications for said user.

125. A method of universally assessing composite utility consumption as described in clause 122 or any other clause and further comprising automatically threshold querying a user on facility changes responsive to said step of differentially comparing distinct cost indications for said user.

126. A method of universally assessing composite utility consumption as described in clause 88 or any other clause and further comprising the step of displaying said composite cost indication information to a user in a tabulated report.

127. A method of universally assessing composite utility consumption as described in clause 126 or any other clause wherein said step of displaying said composite cost indication information to a user in a tabulated report comprises a step selected from a group consisting of:
tabularly displaying a time domain based composite cost indication to a user;
tabularly displaying an equipment domain based composite cost indication to a user;
tabularly displaying a total facility domain based composite cost indication to a user;
tabularly displaying a meter domain based composite cost indication to a user;
tabularly displaying an equipment incremental cost domain based composite cost indication to a user; and
any combination of the above, all without limiting other aspects.

128. A method of universally assessing composite utility consumption as described in clause 88 or any other clause wherein on-site locally collecting information from each of said multiple disparate utility inputs comprises on-site locally packetizing information from each of said multiple disparate utility inputs for efficient use.

129. A method of universally assessing composite utility consumption as described in clause 128 or any other clause wherein on-site locally packetizing information from each of said multiple disparate utility inputs for efficient use comprises efficiently time correlating said information from each of said multiple disparate utility inputs; and consolidating composite time-correlated data to create said collected composite utility data information.

130. A method of universally assessing composite utility consumption as described in clause 152 or any other clause wherein said step of consolidating composite time-correlated data to create said collected composite utility data information comprises compressing said composite time-correlated data to create a compressed collected composite utility data information.

131. A method of universally assessing composite utility consumption as described in clause 88 or any other clause wherein acquiring sensor data for multiple disparate utility inputs comprises sensing acquiring consumption data for fundamentally different utility types.

132. A method of universally assessing composite utility consumption as described in clause 131 or any other clause wherein said step of correlating the information from each of said multiple disparate utility inputs to achieve a collected composite utility data information comprises the steps of: correlating information from disparate utility inputs having differing data-frequencies; and generating approximate data to achieve a common data frequency for said multiple disparate utility inputs, to achieve a collected data frequency-correlated composite utility data information.

133. A method of universally assessing composite utility consumption as described in clause 132 or any other clause wherein said step of generating approximate data to achieve a common data frequency for said multiple disparate utility inputs comprises a step selected from a group consisting of:
applying trend information to achieve a common data frequency for said multiple disparate utility inputs;
utilizing historical information to achieve a common data frequency for said multiple disparate utility inputs; and
any combination of the above, all without limiting other aspects.

134. A method of universally assessing composite utility consumption as described in clause 88 or any other clause and further comprising the step of providing a user the option to view at least information from said disparate utility rate information corresponding to at least one of said multiple disparate utility inputs.

135. A method of universally assessing composite utility consumption as described in clause 131 or any other clause wherein said step of correlating the information from each of said multiple disparate utility inputs to achieve a collected composite utility data information comprises the step of correlating discordantly fragmented information from disparate utility inputs; and further comprising the step of generating approximate data to achieve a common data ranges of information for said multiple disparate utility inputs.

136. A method of universally assessing composite utility consumption as described in clause 135 or any other clause wherein said step of generating approximate data to achieve a common data ranges of information for said multiple disparate utility inputs comprises a step selected from a group consisting of:
applying trend information to achieve common data ranges for said multiple disparate utility inputs;
utilizing historical information to achieve common data ranges for said multiple disparate utility inputs; and any combination of the above, all without limiting other aspects. 137. A method of universally assessing composite utility consumption as described in clause 132 or any other clause and further comprising the step of tagging an estimated generated data indication for user awareness when said step of generating approximate data to achieve a common data frequency for said multiple disparate utility inputs has occurred.

138. A method of universally assessing composite utility consumption as described in clause 135 or any other clause and further comprising the step of tagging a generated data indication for user awareness when said step of generating approximate data to achieve a common data ranges of information for said multiple disparate utility inputs has occurred.

139. A method of universally assessing composite utility consumption as described in clause 131 or any other clause wherein said step of acquiring consumption data for fundamentally different utility types comprises a step selected from a group consisting of:
acquiring sensor consumption data for a gas utility input;
acquiring sensor consumption data for a water utility input;
acquiring sensor consumption data for an electric utility input;
acquiring sensor data for an air flow;
acquiring sensor data for a fuel consumption;
any combination of the above, all without limiting other aspects.

140. A method of universally assessing composite utility consumption as described in clause 139 or any other clause wherein said step of correlating discordantly fragmented information from disparate utility inputs comprises:
correlating the information from a gas utility input, and
correlating the information from a water utility input, and
correlating the information from an electric utility input, to achieve said collected composite utility data information.

141. A method of universally assessing composite utility consumption as described in clause 88 wherein said step of acquiring disparate utility rate information corresponding to each of said multiple disparate utility inputs to achieve disparate utility rate data comprises the steps of:
automatically externally obtaining full-factored utility rate information for each of said multiple disparate utility inputs to achieve said disparate utility rate data; and
automatically synchronizing said full-factored utility rate information to utility data information.

142. A method of universally assessing composite utility consumption as described in clause 88 or clause 141 or any other clause wherein said step of acquiring disparate utility rate information corresponding to each of said multiple disparate utility inputs to achieve disparate utility rate data comprises acquiring in real-time, current utility rate information corresponding to at least one utility input.

143. A method of universally assessing composite utility consumption as described in clause 142 or any other clause and further comprising the step of receiving a user assessment request, and wherein said step of acquiring disparate utility rate information corresponding to each of said multiple disparate utility inputs to achieve disparate utility rate data comprises the step of acquiring in real-time, current utility rate information corresponding to at least one utility input after said step of receiving a user assessment request.

144. A method of universally assessing composite utility consumption as described in clause 97 or any other clause wherein said step of acquiring disparate utility rate information corresponding to each of said multiple disparate utility inputs to achieve disparate utility rate data comprises the steps of:
request-unnecessary acquiring utility rate information corresponding to at least one utility input; and
storing said utility rate information for later use.

145. A method of universally assessing composite utility consumption as described in clause 144 or any other clause wherein said step of request-unnecessary acquiring utility rate information corresponding to at least one utility input comprises the step of low activity acquiring utility rate information corresponding to at least one utility input.

146. A method of universally assessing composite utility consumption as described in clause 88 or any other clause wherein said step of acquiring disparate utility rate information corresponding to each of said multiple disparate utility inputs to achieve disparate utility rate data further comprises the step of providing a user an opportunity to manually input information indicative of utility rate information from a utility bill.

145. A method of universally assessing composite utility consumption as described in clause 88 or any other clause wherein said step of acquiring disparate utility rate information corresponding to each of said multiple disparate utility inputs to achieve disparate utility rate data comprises acquiring time-of-use rate information for at least one utility inputs.

148. A method of universally assessing composite utility consumption as described in clause 141 or any other clause wherein said step of automatically externally obtaining full-factored utility rate information for each of said multiple disparate utility inputs to achieve said disparate utility rate data comprises selecting rate information from a group consisting of:
peak usage rate information;
off-peak usage rate information;
demand peak rate information;
time-of-use rate information;
fuel charge information;
rider information;
reactive power charge information;
carbon related charge information;
governmental surcharge information;
renewable energy credit information;
electric franchise fee credit information;
renewable energy rider information;
cost-effective energy saving credit information;
penalty information;
supplier charge information; and
any combination of the above, all without limiting other aspects.

149. A method of universally assessing composite utility consumption as described in clause 141 or any other clause and further comprising the steps of determining a current demand value for said user; and applying a demand peak rate when applicable.

150. A method of universally assessing composite utility consumption as described in clause 141 or any other clause and further comprising the steps of:

determining a set of external rate information that may be needed for said user;

externally acquiring said set of external rate information for eventual use; and storing said set of external rate information for possible later use.

151. A method of universally assessing composite utility consumption as described in clause 141 or any other clause and further comprising determining at some point in time when external rate information is unavailable; and automatically acting as a result of said step of determining.

152. A method of universally assessing composite utility consumption as described in clause 151 or any other clause wherein said step of automatically acting as a result of said step of determining comprises a step selected from a group consisting of:

prompting a user upon user request;
indicating that said rate information is unavailable;
estimating consumption;
estimating a cost;
tagging a result for user awareness; and
any combination of the above, all without limiting other aspects.

153. A method of universally assessing composite utility consumption as described in clause 152 or any other clause wherein said step of automatically acting as a result of said step of determining further comprises a step selected from a group consisting of:

applying trend information to achieve common data ranges for said multiple disparate utility inputs;
utilizing historical information to achieve common data ranges for said multiple disparate utility inputs; and
any combination of the above, all without limiting other aspects.

154. A method of universally assessing composite utility consumption as described in clause 88 or any other clause and further comprising the step of user setting a desired data collection frequency for configured multiple disparate utility inputs.

155. A method of universally assessing composite utility consumption as described in clause 154 or any other clause and further comprising the step of providing a user accuracy information relative to said step of user setting a desired data collection frequency for configured multiple disparate utility inputs.

156. A method of universally assessing composite utility consumption as described in clause 154 or any other clause and further comprising the step of generating approximate data to achieve said desired data collection frequency for at least one of said multiple disparate utility inputs in response to said user setting said desired data collection frequency.

157. A method of universally assessing composite utility consumption as described in clause 156 or any other clause wherein said step of user setting a desired data collection frequency for configured multiple disparate utility inputs comprises the step of user resetting a desired data collection frequency for configured multiple disparate utility inputs, and wherein said step of generating approximate data to achieve said desired data collection frequency for at least one of said multiple disparate utility inputs in response to said user setting said desired data collection frequency comprises the step of re-generating approximate data to achieve a reset desired data collection frequency for at least one of said multiple disparate utility inputs in response to said user resetting said desired data collection frequency.

158. A method of universally assessing composite utility consumption as described in clause 88 or any other clause and further comprising filtering said collected composite utility data information prior to accomplishing said step of generating at least some estimated composite utility cost indication from said step of applying said disparate utility rate data to at least a portion of said collected composite utility data information as a result of user input relative to a desired display.

159. A method of universally assessing composite utility consumption as described in clause 158 or any other clause wherein said step of filtering said collected composite utility data information prior to accomplishing said step of generating at least some estimated composite utility cost indication from said step of applying said disparate utility rate data to at least a portion of said collected composite utility data information as a result of user input relative to a desired display comprises a step selected from a group consisting of:

filtering said collected composite utility data information to address a single point in time of utility consumption;
filtering said collected composite utility data information to address a particular time range of utility consumption; and
any combination of the above, all without limiting other aspects.

160. A method of universally assessing composite utility consumption as described in clause 88 or any other clause and further comprising the step of utilizing said collected composite utility data information to monitor at least one specific item of equipment.

161. A method of universally assessing composite utility consumption as described in clause 160 or any other clause and further comprising the step of allowing optional user input to indicate equipment changes.

162. A method of universally assessing composite utility consumption as described in clause 161 or any other clause and further comprising the step of multi-regressing said collected composite utility data information in response to said step of allowing optional user input to indicate equipment changes.

163. A method of universally assessing composite utility consumption as described in clause 160 or any other clause and further comprising the steps of:

determining likely changes in installed equipment; and
automatically querying a user as a result of said step of determining likely changes in installed equipment.

164. A method of universally assessing composite utility consumption as described in clause 89 or any other clause wherein said step of generating economic spend information for said user from said step of applying said disparate utility rate data to at least a portion of said collected composite utility data information comprises the step of generating at least one individual equipment economic spend information for said user.

165. A method of universally assessing composite utility consumption as described in clause 89 or any other clause wherein said step of generating economic spend information for said user from said step of applying said disparate utility rate data to at least a portion of said collected composite utility data information comprises the step of generating at least one individual utility economic spend information for said user from said collected composite utility data information.

166. A method of universally assessing composite utility consumption as described in clause 88 or any other clause and further comprising the step of allowing optional user input to indicate equipment changes.
167. A method of universally assessing composite utility consumption as described in clause 88 or clause 166 or any other clause and further comprising the steps of:
determining likely changes in installed equipment; and
automatically querying a user as a result of said step of determining likely changes in installed equipment.
168. A method of universally assessing composite utility consumption as described in clause 166 or any other clause wherein said step of allowing optional user input to indicate equipment changes comprises a step selected from a group consisting of:
allowing a user to input simply the existence of an equipment configuration change;
allowing a user to input a detail of an equipment configuration change;
allowing a user to input a time of an equipment configuration change;
allowing a user to input simply a type of equipment configuration change; and
any combination of the above, all without limiting other aspects.
169. A method of universally assessing composite utility consumption as described in clause 166 or any other clause and further comprising the step of relating a change of an equipment to at least some of said estimated composite utility cost indication.
170. A method of universally assessing composite utility consumption as described in clause 88 and further comprising the steps of:
multi-regressing said collected composite utility data information; and
isolating at least one change effect on at least some of said estimated composite utility cost indication for a user.
171. A method of universally assessing composite utility consumption as described in clause 88 or any other clause and further comprising the step of automatically self-checking a composite cost indication against an external calculation of cost for a similar period.
172. A method of universally assessing composite utility consumption as described in clause 171 or any other clause wherein said step of automatically self-checking a composite cost indication against an external calculation of cost for a similar period comprises the step of automatically comparing a composite cost indication against at least some utility provider data when available.
173. A method of universally assessing composite utility consumption as described in clause 172 or any other clause wherein said step of automatically comparing a composite cost indication against at least some utility provider data when available comprises retroactively comparing a composite cost indication against a utility supplier bill.
174. A method of universally assessing composite utility consumption as described in clause 88 or any other clause and further comprising the steps of:
transforming at least some of said composite cost indication into an open, standardized data exchange format to create a disparate utility data, common exchange format utility data file; and
exporting said disparate utility data, common exchange format utility data file for subsequent use.
175. A method of universally assessing composite utility consumption as described in clause 174 or any other clause wherein said step of transforming at least some of said composite cost indication into an open, standardized data exchange format to create a disparate utility data, common exchange format utility data file comprises a step selected from a group consisting of:
transforming at least some of said composite cost indication into a comma separated value disparate utility data file;
transforming at least some of said composite cost indication into a tab-delimited disparate utility data file;
transforming at least some of said composite cost indication into an MS-XLS binary file disparate utility data file;
transforming at least some of said composite cost indication into an MS-XLSX binary file disparate utility data file;
transforming at least some of said composite cost indication into a delimiter separated disparate utility data file;
transforming at least some of said composite cost indication into a tab separated value disparate utility data file;
transforming at least some of said composite cost indication into an open standard disparate utility data file; and
any combination of the above, all without limiting other aspects.
176. A method of universally assessing composite utility consumption as described in clause 88 or any other clause and further comprising the steps of:
automatically determining desired utility rate information corresponding to a particular utility input;
automatically selecting an available resource location at which said desired utility rate information can be accessed;
downloading said desired utility rate information from said available resource location; and
storing said desired utility rate information.
177. A method of universally assessing composite utility consumption as described in clause 144 or any other clause and further comprising the steps of:
automatically determining when a utility rate information change occurs for at least one of said multiple disparate utility inputs; and
automatically advising said user at some point after said utility rate information change occurs.
178. A method of universally assessing composite utility consumption as described in clause 177 or any other clause and further comprising the steps of:
automatically calculating an estimated effect of said utility rate information change on said user; and
displaying said estimated effect of said utility rate information change to said user.
179. A method of universally assessing composite utility consumption comprising the steps of:
utility-provider-independent sensing at least one utility input;
obtaining electrical voltage information from a utility input;
obtaining electrical current information from a utility input;
obtaining gas flow information from a utility input;
obtaining water flow information from a utility input;
providing each of said utility inputs to a unitary collection device;
on-site locally collecting information from each of said utility inputs at said unitary collection device;
user setting a desired data collection frequency for all of said utility inputs;

generating approximate data to achieve said desired data collection frequency for at least one of said multiple disparate utility inputs in response to said user setting said desired data collection frequency;

automatically data-frequency correlating the information from each of said utility inputs to achieve collected data frequency-correlated composite utility data information;

transforming information from each of said utility inputs to normalized utility data in a superset format that includes consumption information, consumption units, and time of measurement information;

automatically determining desired utility rate information for multiple disparate utilities corresponding to each of said multiple disparate utility inputs;

automatically selecting resource locations at which said desired utility rate information can be accessed;

downloading said desired utility rate information from said resource locations;

storing said desired utility rate information to create a collection of disparate utility rate data;

applying said disparate utility rate data to at least a portion of said collected composite utility data information;

generating at least some estimated current rate of composite utility economic spend information for said user from said step of applying said disparate utility rate data to at least a portion of said collected data frequency-correlated composite utility data information;

storing information developed from said step of generating at least some estimated current rate of composite utility economic spend information for later comparison;

transforming at least some of said estimated current rate of composite utility economic spend information into an open, standardized data exchange format to create a disparate utility data, common exchange format utility data file;

exporting said disparate utility data, common exchange format utility data file for subsequent use; and presenting said estimated current rate of composite utility economic spend information 180. A method of universally assessing composite utility consumption as described in clause 179 or any other clause and further comprising the steps of:
identifying a potentially abnormal cost occurrence; and
advising said user of the existence of said abnormal cost occurrence.

181. A method of universally assessing composite utility consumption as described in clause 179 or any other clause wherein said step of generating approximate data to achieve said desired data collection frequency for at least one of said multiple disparate utility inputs in response to said user setting said desired data collection frequency comprises a step selected from a group consisting of:
applying trend information to achieve a common data frequency for said multiple disparate utility inputs;
utilizing historical information to achieve a common data frequency for said multiple disparate utility inputs; and
any combination of the above, all without limiting other aspects,
and further comprising the step of tagging a generated data indication for user awareness when said step of generating approximate data to achieve a common data ranges of information for said multiple disparate utility inputs has occurred.

182. A method of universally assessing composite utility consumption as described in clause 179 or any other clause wherein said step of acquiring rate information for multiple disparate utilities corresponding to each of said utility inputs to achieve disparate utility rate data comprises the steps of:
request-unnecessary acquiring utility rate information corresponding to at least one utility input; and
storing said utility rate information for later use.

183. A method of universally assessing composite utility consumption as described in clause 179 or any other clause and further comprising the steps of:
determining likely changes in installed equipment; and
automatically querying a user as a result of said step of determining likely changes in installed equipment.

184. A method of universally assessing composite utility consumption as described in clause 179 or any other clause and further comprising the step of automatically self-checking a composite cost indication against an external calculation of cost for a similar period by retroactively comparing a composite cost indication against a utility provider bill.

185. A system, apparatuses, methods and also processes, substantially as herein described with reference to any one or more of the figures, examples, and description.

As can be easily understood from the foregoing, the basic concepts of the present invention may be embodied in a variety of ways. It involves both conversion techniques as well as devices to accomplish the appropriate conversion. In this application, the conversion techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements.

Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "comparator" should be understood to encompass disclosure of the act of "comparing"—whether explicitly discussed or not—and, conversely, were there effectively disclosure of the act of "comparing", such a disclosure should be understood to encompass disclosure of a "comparator" and even a "means for comparing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of references below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

REFERENCES TO BE INCORPORATED BY REFERENCE

U.S. PATENTS

| | | | |
|---|---|---|---|
| 9,569,804 | B2 | 2017 Feb. 14 | Stein et al. |
| 8,843,238 | B2 | 2014 Sep. 23 | Wenzel et al. |
| 7,555,365 | B2 | 2009 Jun. 30 | Bhakta |
| 8,095,243 | B2 | 2012 Jan. 10 | Bhakta |
| 9,172,275 | B2 | 2015 Oct. 27 | Bhakta |

U.S. PATENT APPLICATION PUBLICATIONS

| | | | |
|---|---|---|---|
| 20110035073 | A1 | 2011 Feb. 10 | Ozog |
| 20120083930 | A1 | 2012 Apr. 05 | Ilic et al. |
| 20100106342 | A1 | 2010 Apr. 29 | Ko et al. |
| 20150149122 | A1 | 2015 May 28 | Cipri |
| 20150323948 | A1 | 2015 Nov. 12 | Jeong et al. |
| 20100076613 | A1 | 2010 Mar. 25 | Imes |
| 20100283606 | A1 | 2010 Nov. 11 | Tsypin et al. |
| 20090287433 | A1 | 2009 Nov. 19 | Houston et al. |
| 20140129160 | A1 | 2014 May 08 | Tran |
| 20150220099 | A1 | 2015 Aug. 06 | Yoo et al. |

FOREIGN PATENT DOCUMENTS

| IP No. | Country | Date of Publication | Patentee |
|---|---|---|---|
| 1020100015626 | KR | 2012 Oct. 16 | Chung Ang |

NON PATENT LITERATURE

International Performance Measurement and Verification Protocol (IPMVP), retrieved Jun. 26, 2017. 4 pages.
http://evo-world.org/en/products-services-mainmenu-en/protocols/ipmvp
EVO, International Performance Measurement and Verification Protocol. Concepts and Options for Determining Energy and Water Savings Volume 1. January 2012. 143 pages.
http://www.eeperformance.org/uploads/8/6/5/0/8650231/ipmvp volume i 2012.pdf
http://www.nrel.gov/docs/fy02osti/31505.pdf
International Performance Measurement and Verification Protocol. Concepts and Options for Determining Energy and Water Savings Volume 1. January 2012. 4 pages.
https://seigrits-public-
assets.s3.amazonaws.com/IPMVP Options for Measurement and Verification.pdf
Donkelaar, Michael et al., Measurement and verification for energy services, IPMVP and other approaches. Public Report. Concerted Action, Energy Services Directive. 29 Jan. 2013. 37 pages.
https://www.google.com/url?sa=t&rct=j&q=&esrc=s&source=web&cd=7&ved=

| NON PATENT LITERATURE |
| --- |
| 0ahUKEwj5ucWRndTUAhUMzoMKHdTTDJ0QFghIMAY&url=http%3A%2F%2Fwww.esd-ca.eu%2FMedia%2FFiles%2Fmeasurement-and-verification-for-energy-services-ipmvp-and-other-approaches&usg=AFQjCNEstziHCaTTp97B1jTR2O6RUBv0wA<br>Clean Energy Ministerial, Energy Performance Measurement and Verification, Guidance on Data Quality. August 2014. 14 pages.<br>http://www.cleanenergyministerial.org/Portals/2/EasyDNNNewsDocuments/410/GSEP EM WG_DQ_Guidance.pdf.<br>International Performance Measurement and Verification Protocol. Concepts and Options for Determining Energy and Water Savings Volume 1. March 2002. 93 pages.<br>International Performance Measurement & Verification Protocol. Concepts and Options for Determining Energy and Water Savings Volume 1. January 2012. 93 pages.<br>U.S. Provisional Application No. 62/402,742, filed Sep. 30, 2016. First named Inventor: Kiziuk.<br>U.S. application Ser. No. 13/830,919 filed Mar. 14, 2013. First Named Inventor: Stein.<br>U.S. application Ser. No. 14/922,978 filed Oct. 26, 2015. First Named Inventor: Minesh Bhakta.<br>TransData, Inc., SSR-6000 Demand Recorder & Pulse Totalizer. © 2010 by TransData, Inc. 2 pages. |

Thus, the applicant(s) should be understood to have support to claim and make a statement of invention to at least: i) each of the power devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims, clauses, or concepts presented, and xiv) all inventions described herein.

In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, all priority filing(s), the claims set forth later in this specification, and any claims and any clauses set forth at any time are hereby incorporated by reference as part of this description of the invention, and the applicant expressly reserves the right to use all of or a portion of such incorporated content of such claims or such clauses as additional description to support any of or all of the claims or any element or component thereof, and the applicant further expressly reserves the right to move any portion of or all of the incorporated content of such claims or such clauses or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims initially presented are to be understood as also stating in this textual section of the specification, clauses and subject matter that are expressly designated by the applicant to be part of the description of embodiments of the invention. They may be used by the applicant to support any later claim(s) recited, amended, or reinserted in this patent application and may be used to support any claims recited in any subsequent continuation, continuation-in-part, or division patent application. Further, even if subsequently amended, cancelled, or otherwise altered, the claims originally set forth in this and the priority filing(s) are hereby incorporated by reference as part of this section, and the applicant expressly reserves the right to use all of or a portion of any of the content of such as additional description to support any claim or element, any amendment, and any component thereof. The content of this section (both listed and incorporated by reference) shall survive during the entire pendency of this application including any subsequent continuation, division, or continuation-in-part thereof or any reissue or extension thereon.

What is claimed is:

1. A system to universally assess composite utility consumption comprising:
    at least one utility-provided sensor that provides direct information on consumption of at least one particular consumption type;
    multiple disparate utility data inputs, each specific to sense consumption of a particular commodity type;
    at least one utility-provider independent redundant sensor that provides utility-provider-independent sensed utility data that is redundant as to said utility-provided sensor and that provides direct information on consumption of at least one particular commodity type as part of a local device;
    a utility data input consumption sensor cross check responsive to said at least one utility-provider independent redundant sensor that provides utility-provider-independent sensed utility data that is redundant as to said utility-provided sensor and that provides direct information on consumption of at least one particular commodity type as part of a local device for at least one utility data input and responsive to at least one of said multiple disparate utility data inputs;
    an automatic cross check alert that alerts a user if desired in response to said utility data input consumption sensor cross check that acts in response to said at least one utility-provider independent redundant sensor that provides utility-provider-independent sensed utility data for at least one utility data input to inform a user if existing utility-provided sensor information does not match said utility-provided independent redundant sensor information;

a local, on-site collected utility use information storage responsive to each of said multiple disparate utility data inputs;

a collected composite utility data information time correlator that correlates information from at least one of said multiple disparate utility data inputs to at least one of the other of said multiple disparate utility data inputs;

a collected composite utility data information data-frequency correlator having a new frequency-approximate data generation capability specifically configured to act automatically through processor programming that is configured to act in a way that generates missing utility sensor data for consumption of a particular commodity type to create a new data frequency that makes sensor data correspond even if data intervals are different, and that is not provided by at least one of said multiple disparate utility data inputs, and that is specifically configured in a way that accomplishes data-frequency correlation among the different sensors by generating approximate data for consumption of a particular commodity type in a way that accounts for differing sensor collection intervals so periods in between such data points are similar even among multiple disparate utility sensor data inputs having otherwise different utility data collection intervals, and wherein said collected composite utility data information data-frequency correlator is responsive to each of said multiple disparate utility data inputs;

a data approximation utility estimated cost generator responsive to said collected composite utility data information data-frequency correlator;

a superset format transformer that is specifically configured to act automatically through processor programming configured to act in a way that creates a standard formatted composite utility data in an output that includes consumption information, consumption units, and time of measurement information, and wherein said superset format transformer is responsive to said local, on-site collected utility use information storage, and wherein said superset format transformer that is specifically configured to act automatically through processor programming is also specifically configured to act in a way that provides said output in a format selected from a group consisting of: a comma separated value format, a tab-delimited format, an MS-XLS binary file format, an MS-XLSX binary file format, a delimiter separated format, a tab separated value format, and an open standard file data format, and wherein said superset format transformer is configured to act automatically through processor programming to automatically normalize said standard formatted composite utility data;

a composite utility cost indication storage responsive to said superset format transformer;

an automatic utility rate information locator;

a multiple access capability, disparate utility rate information acquisition capability that has a plurality of active capabilities, each corresponding to one of said multiple disparate utility data inputs and that is responsive to said automatic utility rate information locator;

a disparate utility rate information data storage responsive to said multiple access capability, disparate utility rate information acquisition capability;

a user settable, data frequency selector that is specifically configured to instruct processor programming to act automatically through said processor programming in a way to set a data frequency for each of said multiple disparate utility data inputs, each specific to consumption of a particular commodity type and which is specifically configured through processor programming to act automatically to re-generate approximate utility data to achieve a set desired data frequency for each sensor that senses consumption of a particular commodity type;

real-time current rate of composite utility estimated economic spend generator that provides current composite utility economic spend information across all of said multiple disparate utility data inputs and said at least one utility-provider independent redundant sensor that provides utility-provider-independent sensed utility data that is redundant as to said utility-provided sensor and that provides direct information on consumption of at least one particular commodity type as part of a local device for at least one utility data input, and in a way that generates a range totaled composite economic spend indication totaled across similar ranges for each of said multiple disparate utility data inputs and said at least one utility-provider independent redundant sensor that provides utility-provider-independent sensed utility data that is redundant as to said utility-provided sensor and that provides direct information on consumption of at least one particular commodity type as part of a local device for at least one utility data input, and that provides said real-time current rate of composite utility estimated economic spend in response to said local, on-site collected utility use information storage and said disparate utility rate information data storage and that is responsive to said user settable, data frequency selector, and that is configured through processor programming to automatically transform disparate sensor data to values that span comparable unit ranges and to automatically generate composite utility cost indications in real-time in response to all of said multiple disparate utility data inputs and said at least one utility-provider independent redundant sensor that provides utility-provider-independent sensed utility data that is redundant as to said utility-provided sensor and that provides direct information on consumption of at least one particular commodity type as part of a local device for at least one utility data input;

a visual composite utility cost display responsive to said composite utility cost indications storage; and an historical composite utility cost comparator responsive to said composite utility cost indication storage;

wherein said multiple disparate utility data inputs are selected from a group consisting of:
 a utility electrical voltage information input;
 a utility electrical current information input;
 a utility water flow information input;
 a utility gas flow information input; and
 any combination of the above, all without limiting other aspects, and wherein each of said multiple disparate utility data inputs are provided to a unitary collection device.

2. A system to universally assess composite utility consumption as described in claim 1 and further comprising:
 an abnormal cost occurrence identifier; and
 an abnormal cost occurrence user notification display responsive to said abnormal cost occurrence identifier.

3. A system to universally assess composite utility consumption as described in claim 1 and further comprising a discordantly fragmented information data approximation utility estimated cost generator selected from a group consisting of:
    data trend approximation utility estimated cost generator;
    historical information approximation utility estimated cost generator;
    any combination of the above, all without limiting other aspects,
and further comprising an estimated data indication display responsive to said discordantly fragmented information data approximation utility estimated cost generator.

4. A system to universally assess composite utility consumption as described in claim 1 wherein said multiple access capability, disparate utility rate information acquisition capability comprises a low activity utility rate information acquisition capability.

5. A system to universally assess composite utility consumption as described in claim 1 and further comprising:
    a collected composite utility data information equipment monitor; and
    an automatic user equipment change query responsive to said collected composite utility data information equipment monitor.

6. A system to universally assess composite utility consumption as described in claim 1 and further comprising a retroactive utility provider bill data comparator.

7. A system to universally assess composite utility consumption comprising:
    multiple disparate utility sensor data inputs, each specific to sense consumption of a particular commodity type;
    at least one utility-provider independent redundant sensor that provides a utility-provider-independent sensed utility data input that is redundant as to at least one of said multiple disparate utility sensor data inputs;
    a local, on-site collected utility use information storage responsive to each of said multiple disparate utility sensor data inputs;
    a collected composite utility data information correlator responsive to at least one of said multiple disparate utility sensor data inputs and having a new frequency approximate data generation capability specifically configured to act automatically through processor programming that is configured to act in a way that generates missing utility sensor data that is not provided by at least one of said multiple disparate utility data inputs, each specific to sense consumption of a particular commodity type to create a new data frequency that makes sensor data correspond even if data intervals are different, and that is specifically configured in a way that accomplishes data-frequency correlation by generating approximate data for consumption of a particular commodity type in a way that accounts for differing sensor collection intervals so periods in between such data points are similar even among multiple disparate utility sensor data inputs having otherwise different utility data collection intervals;
    a multiple access capability, disparate utility rate information acquisition capability that has a plurality of active capabilities, each corresponding to one of said multiple disparate utility sensor data inputs;
    a disparate utility rate information data storage responsive to said multiple access capability, disparate utility rate information acquisition capability;
    a real-time composite utility estimated economic spend generator that provides a composite utility cost indication across all of said multiple disparate utility sensor data inputs in response to said local, on-site collected utility use information storage and said disparate utility rate information data storage and that provides real-time composite utility estimated economic spend information in a way that generates a range totaled composite economic spend indication totaled across similar ranges for each of said multiple disparate utility sensor data inputs, and that is configured through processor programming to provide said real-time composite utility estimated economic spend information in a way that automatically transforms disparate data to values that span comparable unit ranges and to automatically generate composite utility cost indications in real-time in response to all of said multiple disparate utility data inputs;
    a composite utility cost indication storage responsive to said real-time composite utility estimated economic spend generator; and
    a visual composite utility cost display responsive to said composite utility cost indication storage.

8. A system to universally assess composite utility consumption as described in claim 7 and further comprising a plurality of different utility type sensors each to which at least one of said multiple disparate utility sensor data inputs is responsive.

9. A system to universally assess composite utility consumption as described in claim 8 wherein said real-time composite utility estimated economic spend generator comprises a discordantly fragmented information data approximation utility estimated cost generator.

10. A system to universally assess composite utility consumption as described in claim 9 wherein said discordantly fragmented information data approximation utility estimated cost generator comprises a discordantly fragmented information data approximation utility estimated cost generator selected from a group consisting of:
    data trend discordantly fragmented information data approximation utility estimated cost generator;
    historical information discordantly fragmented information data approximation utility estimated cost generator;
    any combination of the above, all without limiting other aspects.

11. A system to universally assess composite utility consumption as described in claim 9 and further comprising an estimated data indication display responsive to said discordantly fragmented information data approximation utility estimated cost generator.

12. A system to universally assess composite utility consumption as described in claim 7 and further comprising a collected composite utility data information equipment monitor for at least one specific item of equipment.

13. A system to universally assess composite utility consumption as described in claim 12 and further comprising an automatic user equipment change query responsive to said collected composite utility data information equipment monitor.

14. A system to universally assess composite utility consumption as described in claim 7 and further comprising an automatic composite cost indication self-check comparator responsive to at least some external information.

15. A method of universally assessing composite utility consumption comprising the steps of:
    sensing, by a utility-provided sensor, consumption of at least one particular commodity type;
    obtaining multiple disparate utility data inputs, each specific to sense consumption of a particular commodity type, selected from a group consisting of:

obtaining electrical voltage information for a utility and particular to consumption of an electrical commodity type;

obtaining electrical current information for a utility and particular to consumption of an electrical commodity type;

obtaining gas flow information for a utility and particular to consumption of a gas commodity type; and obtaining water flow information for a utility and particular to consumption of a water commodity type;

redundant sensing utility data, by a utility-provider-independent sensor, for at least one utility that is redundant as to said step of utility-provided sensing and that provides direct information on consumption of at least one a particular commodity type, and to provide utility-provider-independent redundant sensed utility data for at least one utility as part of a local device for at least one utility data input;

providing said multiple disparate utility data inputs to a unitary collection device;

on-site locally collecting information from each of said multiple disparate utility data inputs-at said unitary collection device;

cross checking by a cross check computer said utility-provider-independent redundant sensed utility data for at least one utility against data obtained from at least one of said steps of obtaining electrical voltage information for a utility, obtaining electrical current information for a utility, obtaining gas flow information for a utility, and obtaining water flow information for a utility;

automatically alerting a user by a user notification computer if desired if existing utility-provided sensing does not match said utility-provided independent redundant sensed utility data as a result of said step of cross checking by said cross check computer said utility-provider-independent redundant sensed utility data for at least one utility against data obtained from at least one of said steps of obtaining electrical voltage information for a utility, obtaining electrical current information for a utility, obtaining gas flow information for a utility, and obtaining water flow information for a utility;

user setting a desired data frequency for all of said multiple disparate utility data inputs;

automatically generating by a missing data computer approximate data to achieve said desired data frequency for at least one of said multiple disparate utility data inputs in response to said user setting said desired data frequency in a way that accounts for differing sensor collection intervals so periods in between such data points are similar even among multiple disparate utility sensor data inputs having otherwise different utility data collection intervals;

automatically generating by a missing data computer missing utility sensor data relative to consumption of at least one particular commodity type by a new frequency approximate data generation capability to create a new data frequency that makes sensor data correspond even if data intervals are different and that is not provided as a result of at least one of said steps of obtaining electrical voltage information for a utility, obtaining electrical current information for a utility, obtaining gas flow information for a utility, obtaining water flow information for a utility, and utility-provider-independent sensing utility data for at least one utility;

automatically data-frequency correlating by a correlation computer the information from each of said multiple disparate utility data inputs to achieve data frequency-correlated composite utility data information through processor programming in response to said step of automatically generating missing utility sensor data relative to consumption of at least one particular commodity type to create a new data frequency that makes sensor data correspond even if data intervals are different and that is not provided as a result of at least one of said steps of obtaining electrical voltage information for a utility, obtaining electrical current information for a utility, obtaining gas flow information for a utility, obtaining water flow information for a utility, and utility-provider-independent sensing utility data for at least one utility, and said step of automatically generating approximate data to achieve said desired data frequency for at least one of said multiple disparate utility data inputs in response to said user setting said desired data frequency in a way that accounts for differing sensor collection intervals so periods in between such data points are similar even among multiple disparate utility sensor data inputs having otherwise different utility data collection intervals;

transforming by a data transformation computer information from each of said multiple disparate utility data inputs to automatically create normalized utility spend data in a superset format that includes consumption information, consumption units, and time of measurement information;

automatically determining by a rate determination computer desired utility rate information for multiple disparate utilities corresponding to each of said multiple disparate utility data inputs;

automatically selecting by a rate determination computer resource locations at which said desired utility rate information can be accessed;

downloading said desired utility rate information from said resource locations;

storing said desired utility rate information to create a collection of disparate utility rate data;

applying said disparate utility rate data to at least a portion of said data frequency-correlated composite utility data information;

automatically generating by a composite utility information computer real-time composite utility cost indications in response to all of said steps of obtaining electrical voltage information for a utility, obtaining electrical current information for a utility, obtaining gas flow information for a utility, obtaining water flow information for a utility, and utility-provider-independent sensing utility data for at least one utility;

generating by said rate determination computer at least some estimated current rate of composite utility economic spend information for said user from said steps of applying said disparate utility rate data to at least a portion of said data frequency-correlated composite utility data information and composite utility cost indications in response to all of said steps of obtaining electrical voltage information for a utility, obtaining electrical current information for a utility, obtaining gas flow information for a utility, obtaining water flow information for a utility, and utility-provider-independent sensing utility data for at least one utility;

storing information developed from said step of generating at least some estimated current rate of composite utility economic spend information for later comparison;

transforming by a data transformation computer at least some of said estimated current rate of composite utility economic spend information into an open, standardized data exchange format to create a disparate utility data, common exchange format utility data file;

exporting said disparate utility data, common exchange format utility data file for subsequent use; and presenting said estimated current rate of composite utility economic spend information for visual display to a user by said user notification computer.

16. A method of universally assessing composite utility consumption as described in 15 and further comprising the steps of:
identifying by a user notification computer a potentially abnormal cost occurrence; and
advising by said user notification computer said user of the existence of said abnormal cost occurrence.

17. A method of universally assessing composite utility consumption as described in 15 wherein said step of automatically generating approximate data to achieve said desired data frequency for at least one of said multiple disparate utility data inputs in response to said user setting said desired data frequency comprises a step selected from a group consisting of:
applying trend information by said missing data computer to achieve a common data frequency for said multiple disparate utility inputs;
utilizing historical information by said missing data computer to achieve a common data frequency for said multiple disparate utility inputs; and
any combination of the above, all without limiting other aspects, and further comprising the step of tagging by said user notification computer a generated data indication for user awareness when said step of automatically generating approximate data to achieve said desired data frequency for at least one of said multiple disparate utility data inputs has occurred.

18. A method of universally assessing composite utility consumption as described in claim 15 wherein said step of downloading said desired utility rate information from said resource locations comprises the step of:
request-unnecessary acquiring utility rate information corresponding to at least one utility input.

19. A method of universally assessing composite utility consumption as described in claim 15 and further comprising the steps of:
determining by a signal processing computer likely changes in installed equipment; and
automatically querying a user by said user notification computer as a result of said step of determining likely changes in installed equipment.

20. A method of universally assessing composite utility consumption as described in claim 15 and further comprising the step of automatically self-checking by said cross check computer a composite cost indication against an external calculation of cost for a similar period by retroactively comparing a composite cost indication against a utility provider bill.

* * * * *